US012614726B2

(12) United States Patent
Barsoum et al.

(10) Patent No.: US 12,614,726 B2
(45) Date of Patent: Apr. 28, 2026

(54) DISPERSION AND STABILIZATION OF MXene MATERIALS AND MXene MATERIALS FOR ENERGY STORAGE APPLICATIONS

(71) Applicant: DREXEL UNIVERSITY, Philadelphia, PA (US)

(72) Inventors: Michel W. Barsoum, Moorestown, NJ (US); Michael S. Carey, Philadelphia, PA (US); Rahul Nagesh Pai, Philadelphia, PA (US); Vibha Kalra, Garnet Valley, PA (US); Varun R. Natu, Maharashtra (IN)

(73) Assignee: DREXEL UNIVERSITY, Philadelphia, PA (US)

( * ) Notice: Subject to any disclaimer, the term of this patent is extended or adjusted under 35 U.S.C. 154(b) by 723 days.

(21) Appl. No.: 17/781,924

(22) PCT Filed: Dec. 3, 2020

(86) PCT No.: PCT/US2020/063106
§ 371 (c)(1),
(2) Date: Jun. 2, 2022

(87) PCT Pub. No.: WO2021/113509
PCT Pub. Date: Jun. 10, 2021

(65) Prior Publication Data
US 2023/0034579 A1 Feb. 2, 2023

Related U.S. Application Data

(60) Provisional application No. 63/089,761, filed on Oct. 9, 2020, provisional application No. 62/942,924, filed on Dec. 3, 2019.

(51) Int. Cl.
*H01M 4/58* (2010.01)
*C01B 32/907* (2017.01)
(Continued)

(52) U.S. Cl.
CPC ......... *H01M 4/5815* (2013.01); *C01B 32/907* (2017.08); *H01M 4/0421* (2013.01);
(Continued)

(58) Field of Classification Search
CPC . H01M 4/5815; H01M 4/0421; C01B 32/907; C01P 2002/72
See application file for complete search history.

(56) References Cited

U.S. PATENT DOCUMENTS

2015/0321147 A1* 11/2015 Fleming ............. B01D 71/0211 156/60
2016/0336088 A1 11/2016 Barsoum et al.
(Continued)

FOREIGN PATENT DOCUMENTS

CN 109879278 A * 6/2019
CN 111900355 A 11/2020
(Continued)

OTHER PUBLICATIONS

Ghidiu et al. (Ghidiu, Alkylammonium Cation Intercalation into Ti3C2 (MXene): Effects on Properties and lon-Exchange Capacity Estimation, Chemistry of Materials 2017 29 (3), 1099-1106 (Year: 2017).*
(Continued)

*Primary Examiner* — Allison Bourke
*Assistant Examiner* — Verita E Grannum
(74) *Attorney, Agent, or Firm* — BakerHostetler

(57) ABSTRACT

Provided are methods of effecting cation exchange in MXene materials so as to stabilize the materials. Also provided are compositions, comprising layered MXene materials that comprise an organic cation between layers. Also provided are MXene compositions comprising a chal-
(Continued)

Figure 1:
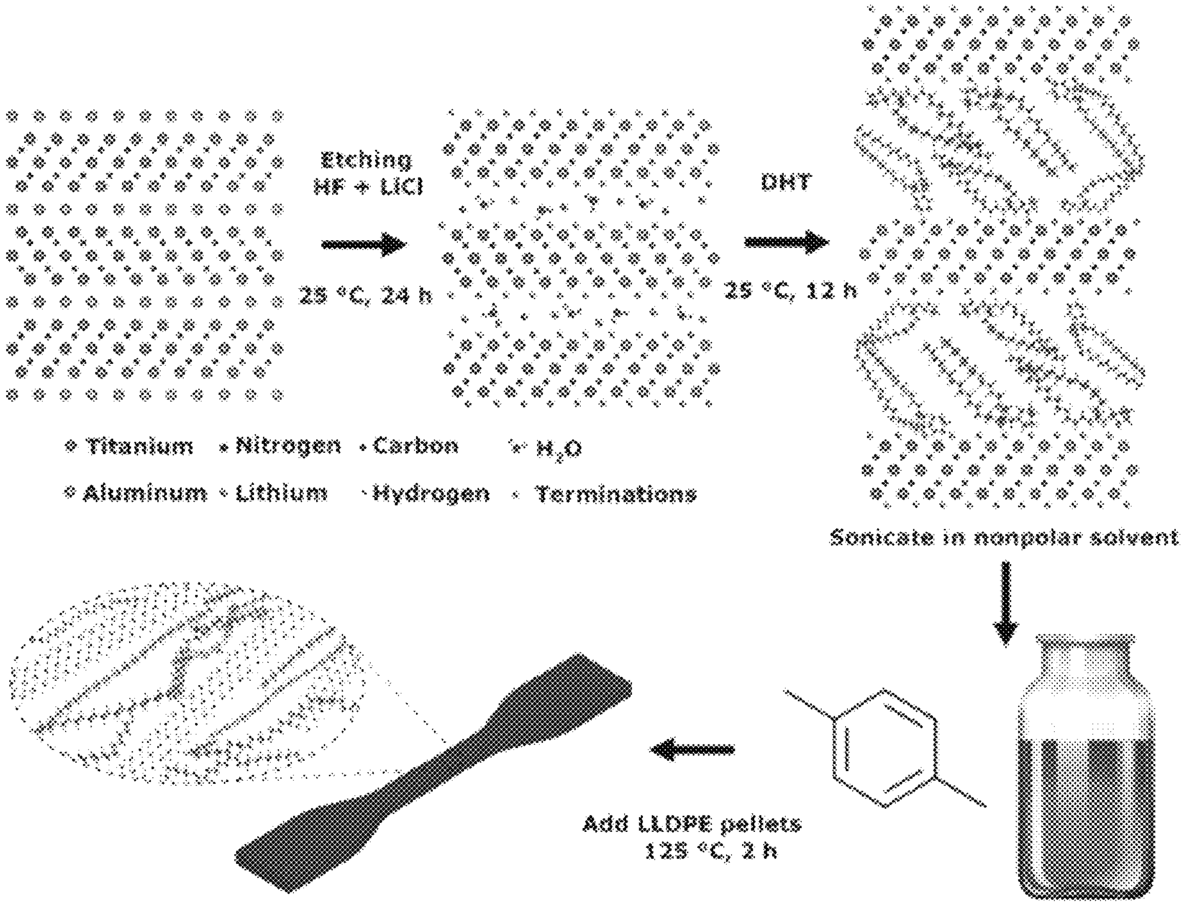

cogen disposed thereon, the MXene composition further optionally comprising a quaternary ammonium halide disposed thereon.

4 Claims, 39 Drawing Sheets

(51) Int. Cl.
*H01M 4/02* (2006.01)
*H01M 4/04* (2006.01)
*H01M 4/36* (2006.01)
*H01M 4/62* (2006.01)

(52) U.S. Cl.
CPC ........... *H01M 4/366* (2013.01); *H01M 4/623* (2013.01); *C01P 2002/72* (2013.01); *C01P 2002/77* (2013.01); *C01P 2002/78* (2013.01); *C01P 2002/82* (2013.01); *C01P 2002/88* (2013.01); *C01P 2004/03* (2013.01); *C01P 2004/04* (2013.01); *C01P 2004/20* (2013.01); *C01P 2006/40* (2013.01); *H01M 2004/021* (2013.01); *H01M 2004/028* (2013.01)

(56) References Cited

U.S. PATENT DOCUMENTS

2018/0108910 A1 4/2018 Barsoum et al.
2021/0155766 A1 5/2021 Zhang et al.

FOREIGN PATENT DOCUMENTS

WO 2015/131132 A1 9/2015
WO 2016/012275 A1 1/2016
WO 2021/113509 A1 6/2021

OTHER PUBLICATIONS

Carey et al. (Carey et al. "Water Transport and Thermomechanical Properties of Ti3C2Tz MXene Epoxy Nanocomposites." ACS Applied Materials & Interfaces. Sep. 20, 2019. (Year: 2019) (Year: 2019).*
Akuzum et al., "Rheological characteristics of 2D titanium carbide (MXene) dispersions: a guide for processing MXenes", ACS Nano 12, 2018, 2685-2694.
Anasori. B. et al., "2D metal carbides and nitrides (MXenes) for energy storage," Nature Reviews Materials, vol. 2 2017, 16098.
Armand. M. et al, "Building better batteries," Nature, vol. 451, 2008, pp. 652-657.
Bao. W. et al, "Confined Sulfur in 3?D MXene/Reduced Graphene Oxide Hybrid Nanosheets for Lithium-Sulfur Battery," Chemistry, vol. 23, Issue 51, 2017, pp. 12613-12619.
Bao. W. et al, "Facile Synthesis of Crumpled Nitrogen-Doped MXene Nanosheets as a New Sulfur Host for Lithium-Sulfur Batteries," Advanced Energy Materials, vol. 8, Issue 13, 2018, 1702485.
Bruce, P.G., et al. , "Li—O2 and Li—S batteries with high energy storage," Nature Materials, vol. 11, No. 1, Dec. 15, 2011, pp. 19-29.
Cao et al., "Alkyl-functionalized graphene nanosheets with improved lipophilicity", Carbon, N.Y., 2010, 48, 1683-1685.
Carey et al. Dispersion and Stabilization of Aikylated 20 MXene in Nonpolar Solvents and Their Pseudocapacitive Behavior, Cell Reports Physical Science, Apr. 22, 2020, pp. 1-17.
Carey et al., "Nylon-6/Ti3C2Tz MXene Nanocomposites Synthesized by In Situ Ring Opening Polymerization of 8-caprolactam and their Water Transport Properties", ACS Appl. Mater. Interfaces, 2019, 11, 20425-20436.
Carey et al., "Water Transport and Thermomechanical Properties ofTi3C2Tz MXene Epoxy Nanocomposites", ACS Appl. Mater. Interfaces In Press, 2019.
Carey. M. et al., "Dispersion and Stabilization of Alkylated 2D MXene in Nonpolar Solvents and Their Pseudocapacitive Behavior," Cell Reports Physical Science, vol. 1, Issue 4, 2020, 100042.
Cheng. X.B et al, "Review—Li Metal Anode in Working Lithium-Sulfur Batteries," Journal of The Electrochemical Society, vol. 165, 2017, pp. A6058-A6072.
Cheng. X.B. et al, "Toward Safe Lithium Metal Anode in Rechargeable Batteries: A Review," Chem Rev, vol. 117, Issue 15, 2017, pp. 10403-10473.
Chevigny et al., "Polymer-grafted-nanoparticles nanocomposites: dispersion, grafted chain conformation, and rheological behavior", Macromolecules, vol. 44, 2010, pp. 122--133.
Choudhary et al., "Dispersion of alkylated graphene in organic solvents and its potential for lubrication applications", J. Mater. Chem., 2012, 22, 21032-21039.
Chung S.H. et al., "Current Status and Future Prospects of Metal-Sulfur Batteries," Adv Mater, vol. 31, Issue 27, 2019, 1901125.
Coleman, "J. N. Liquid-phase exfoliation of nanotubes and graphene", Adv. Funct. Mater., 2009, 19, 3680-3695.
Fan et al., Mechanism and Kinetics of Li2S Precipitation in Lithium-Sulfur Batteries, Adv. Mater., vol. 27, Issue 35, 2015, pp. 5203-5209.
Fantauzzi M. et al, "Exploiting XPS for the identification of sulfides and polysulfides," RSC Advances, vol. 5, 2015, pp. 75953-75963.
Ghidiu et al., "Conductive two-dimensional titanium carbide 'clay' with high volumetric capacitance", Nature, 2014, 516, 78-81.
Ghidiu et al., "Ion-exchange and cation solvation reactions in Ti3C2 MXene", Chem. Mater., 2016, 28, 3507-3514.
Ghidiu et al., "Pressure-induced shear and interlayer expansion in Ti3C2 MXene in the presence of water", Sci. Adv., 2018, 4, eaao6850-eaao6850.
Ghidlu et al., "Alkylammonium Cation Intercalation into Ti3C2 (MXene): Effects on Properties and Ion-Exchange Capacity Estimation", Chemistry of Materials, vol. 29, Jan. 10, 2017, 1099-1106.
Halim et al., "Variable range hopping and thermally activated transport in molybdenum-based MXenes", Phys. Rev. B, 98, 2018, 104202.
Halim et al., "X-ray photoelectron spectroscopy of select multilayered transition metal carbides (MXenes)", Appl. Surf. Sci., 362, 2016, 406-417.
Hamilton. C. E. et al., "High-yield organic dispersions of unfunctionalized graphene," Nano Lett, vol. 9, 2009, pp. 3460-3462.
Hantanasirisakul. K. et al., "Fabrication of Ti3C2Tx MXene Transparent Thin Films with Tunable Optoelectronic Properties," Advanced Electronic Materials, vol. 2, Issue 6, 2016, 1600050.
He. G. et al., "Tailoring Porosity in Carbon Nanospheres for Lithium-Sulfur Battery Cathodes," ACS Nano, vol. 7, Issue 12, 2013, pp. 10920-10930.
Jayaprakash. N. et al., "Porous Hollow Carbon@Sulfur Composites for High-Power Lithium-Sulfur Batteries," Angew Chem Int Ed Engl, vol. 50, Issue 26, 2011, pp. 5904-5908.
Ji. L. et al., "Porous carbon nanofiber-sulfur composite electrodes for lithium/sulfur cells," Energy Environ. Sci., vol. 4, 2011, pp. 5053-5059.
Jiao. L. et al., "Capture and Catalytic Conversion of Polysulfides by In Situ Built TiO2-MXene Heterostructures for Lithium-Sulfur Batteries," Advanced Energy Materials, vol. 9, Issue 19, 2019, 1900219.
Konios, D. et al., "Dispersion behaviour of graphene oxide and reduced graphene oxide," J. Colloid Interface Sci, vol. 430, 2014, pp. 108-112.
Li. G. et al., "Three-dimensional porous carbon composites containing high sulfur nanoparticle content for high-performance lithium-sulfur batteries," Nature Communications, vol. 7, 2016, 10601.
Liang et al., "Sulfur cathodes based on conductive MXene nanosheets for high-performance lithium-sulfur batteries," Angew Chem Int Ed Engl., vol. 54, 2015, pp. 3907-3911.
Liang. X. et al, "Interwoven MXene Nanosheet/Carbon-Nanotube Composites as Li—S Cathode Hosts," Adv Mater, vol. 29, Issue 3, 2017, 1603040.
Lim. S. et al, "Stable colloidal dispersion of octylated Ti3C2-MXenes in a nonpolar solvent," Colloids and Surfaces A: Physicochemical and Engineering Aspects, vol. 579, 2019, 123648.

(56) References Cited

OTHER PUBLICATIONS

Ling. Z. et al., "Flexible and conductive MXene films and nanocomposites with high capacitance," PNAS, vol. 111, Issue 47, 2014, pp. 16676-16681.
Liu. D. et al., "Catalytic Effects in Lithium-Sulfur Batteries: Promoted Sulfur Transformation and Reduced Shuttle Effect," Adv Sci, vol. 5, Issue 1, 2018, 1700270.
Lukatskaya, M. R. et al., "Cation intercalation and high volumetric capacitance of two-dimensional titanium carbide," Science, vol. 341, Issue 163, 2013, pp. 1502-1505.
Maleski, K. et al, "Dispersions of Two Dimensional Titanium Carbide MXene in Organic Solvents," Chem. Mater, vol. 29, 2017, pp. 1632-1640.
Manthiram A. et al, "Rechargeable Lithium-Sulfur Batteries," Chem Rev., vol. 114, Issue 23, 2014, pp. 11751-11787.
Mashtalir, O. et al., "Intercalation and delamination of layered carbides and carbonitrides," Nat. Commun, vol. 4, 2013, 1716.
Meyer et al., "Solubility of sulfur in liquid sulfur dioxide, carbon disulfide, and carbon tetrachloride," Journal of Chemical & Engineering Data, vol. 16, Issue 3, 1971, pp. 364-366.
Naguib, M. et al, "Large-scale delamination of multi-layers transition metal carbides and carbonitrides MXenes," Dalt. Trans, vol. 44, 2015, pp. 9353-9358.
Naguib. M. et al, "Two-Dimensional Nanocrystals Produced by Exfoliation of Ti3AlC2," Adv Mater, vol. 23, Issue 37, 2011, pp. 4248-4253.
Natu V. et al, "Effect of Edge Charges on Stability and Aggregation ofTi3C2Tz MXene Colloidal Suspensions," J. Phys. Chem. C, vol. 122, 2018, pp. 27745-27753.
Natu, V. et al. "Edge Capping of 2D-MXene Sheets with Polyanionic Salts to Mitigate Oxidation in Aqueous Colloidal Suspensions," Angew. Chemie Int. Ed. In Press, vol. 131, Issue 36, 2019, pp. 12785-12790.
Natu. V. et al., "2D Ti3C2Tz MXene Synthesized by Water-free Etching of Ti3AlC2 in Polar Organic Solvents," Chem, vol. 6, Issue 3, 2020, pp. 616-630.
Pang Q et al, "Advances in lithium-sulfur batteries based on multifunctional cathodes and electrolytes," Nature Energy, vol. 1, 2016, 16132.
Peng et al., "Enhanced Electrochemical Kinetics on Conductive Polar Mediators for Lithium-Sulfur Batteries," Angew Chem Int Ed Engl, vol. 55, issue 42, 2016, pp. 12990-12995.
Peng et al., "High-Quality Graphene Microflower Design for High-Performance Li—S and Al-Ion Batteries," Advanced Energy Materials, vol. 7, Issue 17, 2017, 1700051.
Sokol M. et al, "On the chemical diversity of the MAX phases," Trends in Chemistry, vol. 1, Issue 2, 2019, pp. 210-223.
Song et al., "Rational design of free-standing 3D porous MXene/rGO hybrid aerogels as polysulfide reservoirs for high-energy lithium-sulfur batteries," Journal of Materials Chemistry A, vol. 7, 2019, pp. 6507-6513.
Song. J. et al, "Immobilizing Polysulfides with MXene-Functionalized Separators for Stable Lithium-Sulfur Batteries," ACS Appl Mater Interfaces, vol. 8, 2016, pp. 29427-29433.
Stretz H. A. et al, "Intercalation and exfoliation relationships in melt-processed poly (styrene-coacrylonitrile)/montmorillonite nanocomposites," Polymer, vol. 46, Issue 8, 2005, pp. 2621-2637.
Tao. X. et al, "Strong Sulfur Binding with Conducting Magne Ii-Phase TinO2n-1 Nanomaterials for Improving Lithium-Sulfur Batteries," Nano Lett, vol. 14, Issue 9, 2014, pp. 5288-5294.
Tessonnier J.-P. et al., "Dispersion of alkyl-chain-functionalized reduced graphene oxide sheets in nonpolar solvents," Langmuir, vol. 28, 2012, pp. 6691-6697.
Verger. L. et al, "Effect of Cationic Exchange on the Hydration and Swelling Behavior ofTi3C2Tz MXenes," J. Phys. Chem. C, vol. 123, 2019, pp. 20044-20050.
Verger. L. et al., "MXenes: An Introduction of Their Synthesis, Select Properties, and Applications," Trends Chem. In Press, vol. 1, Issue 7, 2019, pp. 656-669.
Voigt. C. A. et al, "Anion Adsorption, Ti3C2Tz MXene Multilayers, and Their Effect on Clay-like Swelling," J. Phys. Chem. C, vol. 122, 2018, pp. 23172-23179.
Wild M., "Lithium sulfur batteries, a mechanistic review," Energy & Environmental Science, vol. 8, 2015, pp. 3477-3494.
Xiao et al., "Ultrafine Ti3C2 MXene Nanodots-Interspersed Nanosheet for High-Energy-Density Lithium-Sulfur Batteries," ACS Nano, vol. 13, 2019, pp. 3608-3617.
Yang. Y. et al , "Electrocatalysis in Lithium Sulfur Batteries under Lean Electrolyte Conditions," Angew Chem Int Ed Engl, vol. 57, 2018, pp. 15775-15778.
Yin Y.X et al, "Lithium-Sulfur Batteries: Electrochemistry, Materials, and Prospects," Angew Chem Int Ed Engl, vol. 52, 2013, pp. 13186-13200.
Yoder. L., "Adaptation of the Mohr Volumetric Method to General Determinations of Chlorine," Ind. Eng. Chem, vol. 11, 1919, p. 755.
Zhang D. et al., "Catalytic Conversion of Polysulfides on Single Atom Zinc Implanted MXene toward High-Rate Lithium-Sulfur Batteries," Advanced Functional Materials, vol. 30, Issue 30, 2020, 2002471.
Zhang J. et al, "Oxidation Stability of Colloidal Two-Dimensional Titanium Carbides (MXenes)," Adv Mater, vol. 29, Issue 11, 2017, pp. 4848-4856.
Zhao, X. et al. "Antioxidants Unlock Shelf-Stable Ti3C2T (MXene) Nanosheet Dispersions," Matter, vol. 1, Issue 2, 2019, pp. 513-526.
Zhou et al., "Catalytic oxidation of Li2S on the surface of metal sulfides for Li—S batteries," PNAS, vol. 114, Issue 5, 2017, pp. 840-845.

* cited by examiner

DISPERSION AND STABILIZATION OF MXene MATERIALS AND MXene MATERIALS FOR ENERGY STORAGE APPLICATIONS

CROSS-REFERENCE TO RELATED APPLICATIONS

The present application is the National Stage Application of International Patent Application No. PCT/US2020/063106 (filed Dec. 3, 2020), which claims priority to and the benefit of U.S. patent application Ser. No. 62/942,924, "Dispersion And Stabilization Of MXene Materials In Nonpolar Solvents" (filed Dec. 3, 2019) and U.S. patent application Ser. No. 63/089,761, "Surface Modified MXenes And Composites For Energy Storage Applications" (filed Oct. 9, 2020), the entireties of which applications are incorporated herein by reference for any and all purposes.

TECHNICAL FIELD

The present disclosure relates to the field of MXene materials and to methods of dispersing such materials.

BACKGROUND

MXene materials have been found to be stable in polar solvents (protic & aprotic), such as water, dimethylformamide, dimethylsulfoxide, and others. This can limit the use of MXene in systems where these solvents are not suitable, and nonpolar solvents such as linear alkanes and aromatic hydrocarbons are required or desired. For example, many polymerization reactions require such solvents. Additionally, nonpolar solvents typically have lower boiling points and higher vapor pressure, which makes them useful in numerous laboratory and industrial processes.

The ever-increasing demand and reliability of portable electronic devices and electric vehicles require advanced rechargeable batteries that are cheap, lightweight, and durable[31]. Among several possible options, lithium-sulfur (Li—S) battery is a promising candidate to satisfy the aforementioned requirements and has the potential to replace the traditional lithium-ion batteries[32]. Elemental S is earth-abundant, environmentally benign, low cost, and possesses a high theoretical capacity of 1675 $mAh \cdot g^{-1}$[33, 34]. However, the practicality has been largely hindered due to the shuttle effect leading to rapid capacity loss and low Coulombic efficiency (CE)[34]. During the charge-discharge cycles, solid S converts to solid $Li_2S$ and vice versa via the formation of soluble lithium polysulfides (LiPs) intermediates. These LiPs dissolved in the electrolyte shuttle back and forth between the sulfur cathode and lithium anode leading to a loss of active material that in turn reduces capacity[35, 36]. Furthermore, the dissolution results in the chemical reduction of LiPs on the surface of Li, forming a layer of insulating $Li_2S$, leading to polarization, and hampering the accessibility of $Li^+$ ions[36]. Efforts in the past have focused on mitigating the shuttle effect via the development of high surface area carbonaceous materials to physically contain the LiPs in the cathode hosts[37]. However, the long term cycling of such cells remains a prominent issue due to poor interfacial contact of the polar LiPs with weakly polar carbon surfaces[38].

Accordingly, there is a long-felt need in the art for methods of dispersing MXene materials in nonpolar solvents and for improved sulfur-based battery materials.

SUMMARY

MXenes—extensively studied in a wide variety of research fields, have been typically used as colloidal, aqueous suspensions. Their use in other solvents has been limited to protic or aprotic polar solvents. As an illustrative, non-limiting example, $Li^+$-intercalated, $Ti_3C_2T_z$ MXene was cation exchanged with di(hydrogenated tallow)benzyl methyl ammonium chloride, a low-cost, long shelf life and biocompatible, quaternary alkylammonium compound, resulting in organophilic $Ti_3C_2T_z$ that remains stable in nonpolar solvents such as hexane, cyclohexane, toluene, p-xylene, decahydronaphthalene and chloroform for more than 10 days. Scanning and transmission electron microscopy, infrared spectroscopy and X-ray diffraction all indicate that the nature of $Ti_3C_2T_z$ was preserved with no signs of oxidation, implying that this technique could be also used to store and handle MXene, as well as allow for the use of MXene in new applications—thereby extending their chemical horizons and relevancy to multiple research and industrial fields. The fact that this stability is achieved without the aid of emulsifying agents renders our approach readily scalable to industrial processes. This method was used to produce solution processed linear, low density polyethylene nanocomposites, where the tensile strength and modulus were increased by 10.9% and 31.9% with a loading of 1.12 vol. % DHT-$Ti_3C_2T_z$. Specimens made without this treatment had a 1.9% decrease in modulus and 9.2% increase in tensile strength.

Lithium-Sulfur (Li—S) batteries are one of the most promising next-generation energy-storage systems. However, the practicality of such a system is largely hindered by problems occurring at the cathode, namely, shuttling of polysulfides and host compatibility with sulfur/polysulfides during redeposition. These issues aggravate with improvement in sulfur loading via rapid capacity fade and lower utilization of active material. Herein, we present a facile strategy to combine hydrophobic sulfur and hydrophilic, conductive, $Ti_3C_2T_z$ MXene in a one-step functionalization of $Ti_3C_2T_z$ sheets using di(hydrogenated tallow)benzyl methyl ammonium chloride (DHT). The latter renders the $Ti_3C_2T_z$ surface hydrophobic, making it readily dispersible in sulfur dissolved in a carbon disulfide ($CS_2$) solvent. By merely evaporating the solvent, we readily conformally coat the DHT-$Ti_3C_2T_z$ nanosheets (DMX) with sulfur. The developed composite with higher available active area enables the effective trapping of LiPs on the electroactive sites within the cathode, leading to improvement in electrochemical performance at higher sulfur loadings. This novel DMX/S cathode delivers a high initial reversible capacity of 1220 $mAh \cdot g^{-1}$ at 0.1 C. At a higher rate of 0.5 C, these cathodes stabilize at 880 mAh/g after the first 5 cycles, 85% of which is retained post 500 cycles. Additionally, we developed cathodes with high sulfur loading of ~10.7 $mg \cdot cm^{-2}$ that exhibits an initial capacity of ~1000 $mAh \cdot g^{-1}$ and a stable areal capacity of ~7 mAh $cm^{-2}$ for 150 cycles at 0.1 C. Ex-situ studies after electrochemical testing elucidated the nature of the LiPs-MXene interaction and the effect of surface functionalization contributing towards improved performance.

In meeting the described needs, the present disclosure first provides methods, comprising: with a layered MXene material that comprises an exchangeable first cation between layers, effecting cation exchange so as to replace the first cation with a second cation and give rise to an enhanced MXene material, the second cation being characterized as an organic cation.

Also provided are compositions, comprising: a layered MXene material that comprises an organic cation between layers.

Further provided are methods, comprising forming a coating of a composition according to the present disclosure.

Additionally provided are articles, comprising a composition according to the present disclosure.

In meeting the described long-felt needs, the present disclosure provides a composite, comprising: a MXene composition comprising a chalcogen disposed thereon, the MXene composition further optionally comprising a quaternary ammonium halide disposed thereon.

Also provided is a cathode, the cathode comprising a composite according to the present disclosure (e.g., any one of Embodiments 1-6, the cathode optionally comprising a binder material, the binder material optionally comprising a carboxy methyl cellulose, (CMC), styrene-butadiene rubber (SBR), polyacrylic acid (PAA), polyvinyl alcohol (PVA), polyethylene glycol (PEG), sodium carboxymethyl chitosan (CCTS), sodium alginate (SA), styrene-butadiene rubber (SBR), polyvinylidene fluoride (PVDF), or any combination thereof.

Further provided is an electrochemical cell, the electrochemical cell comprising a cathode according to the present disclosure (e.g., Embodiment 7) and comprising an anode, the anode optionally comprising an alkali metal, an alkaline metal, a transition metals, graphite, an alloy, and a composite.

Also disclosed is a method, the method comprising operating an electrochemical cell according to the present disclosure (e.g., any one of Embodiments 8-9).

Further provided is an electronic device, the electronic device comprising a composite according to the present disclosure (e.g., any one of Embodiments 1-6).

Additionally disclosed is a hydrophobic MXene composite, the composite comprising a MXene composition having a quaternary ammonium halide disposed thereon.

Also provided is a method, comprising contacting a MXene composition with a quaternary ammonium halide so as to dispose a coating of the quaternary ammonium halide on the MXene composition to form a hydrophobic MXene composite. Suitable quaternary ammonium halides are described elsewhere herein, and will be known to those of ordinary skill in the art.

BRIEF DESCRIPTION OF THE DRAWINGS the drawings, which are not necessarily drawn to scale, like numerals may describe similar components in different views. Like numerals having different letter suffixes can represent different instances of similar components. The drawings illustrate generally, by way of example, but not by way of limitation, various aspects discussed in the present document. In the drawings:

FIG. 1—Schematic illustration of $Ti_3AlC_2$ etching, treatment of obtained $Ti_3C_2T_z$ multilayers with DHT, dispersion in nonpolar solvent and use in solution processing of linear low density polyethylene nanocomposite specimens.

FIGS. 2A-2D—Photographs of (FIG. 2A) DHT treated $Ti_3C_2T_z$ suspensions just after sonication and (FIG. 2B) DHT-$Ti_3C_2T_z$ suspensions after 10 days, (FIG. 2C) Untreated $Ti_3C_2T_z$ suspensions just after sonication, and (FIG. 2D) untreated $Ti_3C_2T_z$ suspensions after 10 days. The reduced liquid level in some of the containers is due to solvent evaporation.

Figure 3:
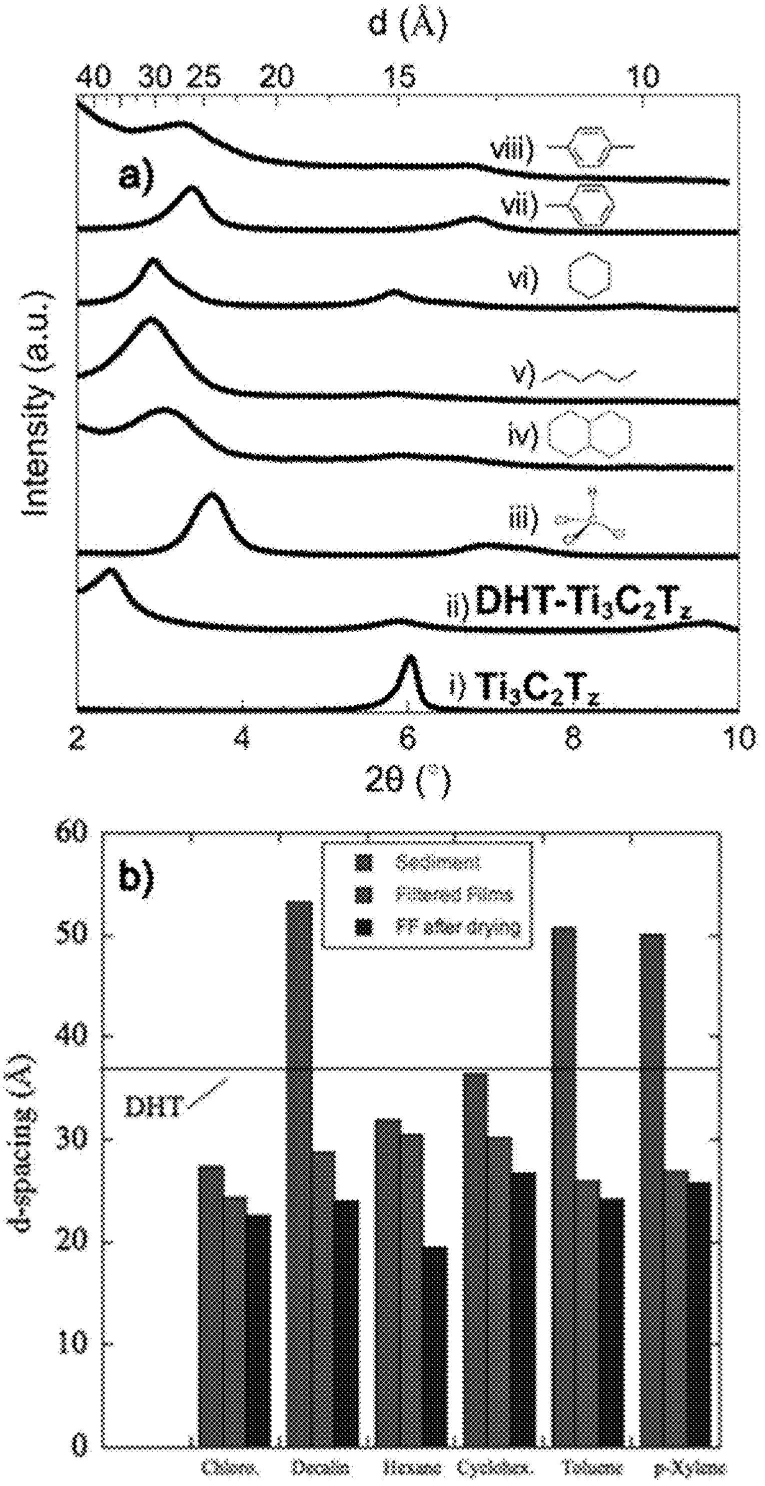

FIG. 3A—Low angle XRD patterns of, i) MLs after etching/washing, ii) DHT treated MLs, and filtered films of suspensions in, iii) chloroform, iv) decalin, v) hexane, vi) cyclohexane, vii) toluene and viii) p-xylene. Top x-axis shows the spacing between layers in A. Structure of the solvent molecules are shown as insets, (FIG. 3B) d-spacing as a function of solvent for sediment (red—left columns), filtered films (green—middle columns) and the latter after drying (blue—right columns) at 200° C. for 24 h. Horizontal line is d-spacing after treatment with DHT.

Figure 4:
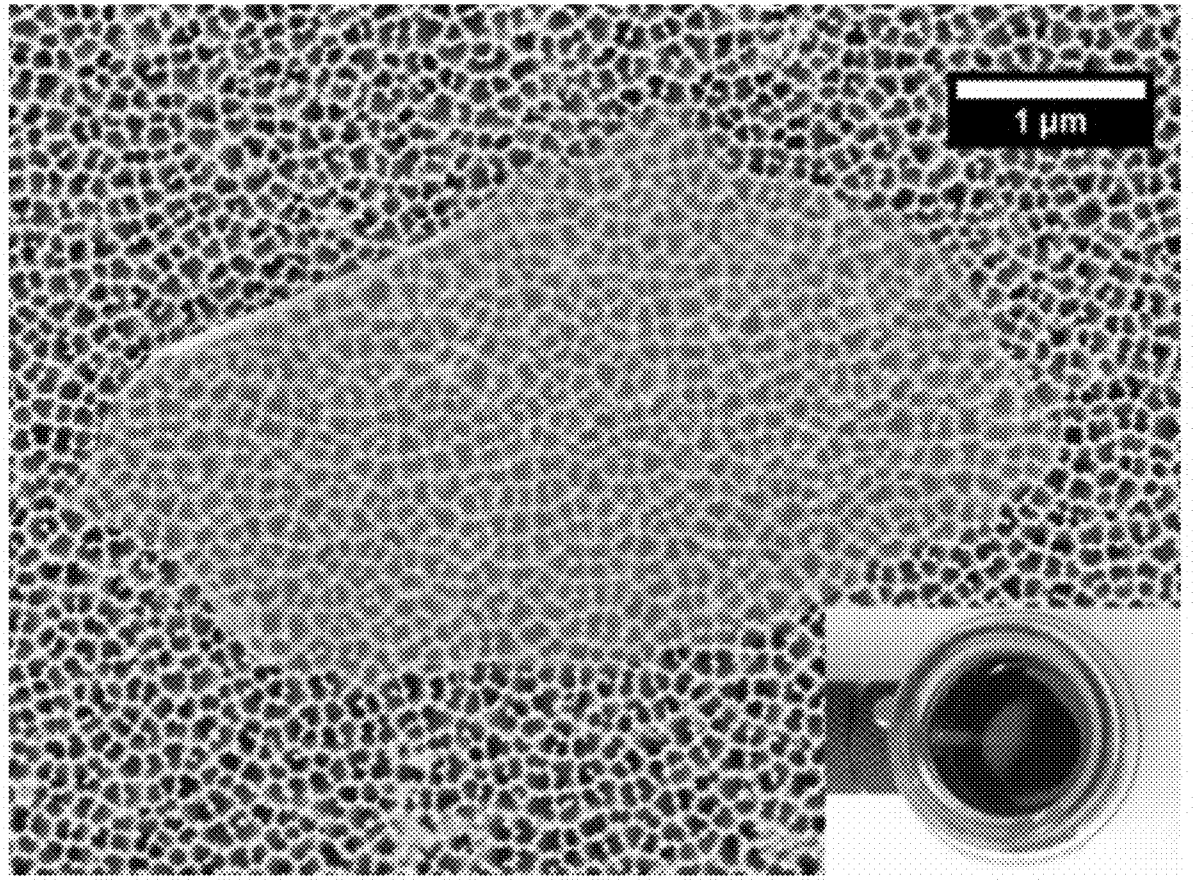

FIG. 4—Typical SEM micrograph of a drop of DHT-treated $Ti_3C_2T_z$ dispersed in a cyclohexane suspension cast on a porous alumina substrate. Inset shows Tyndall effect.

Figure 5:
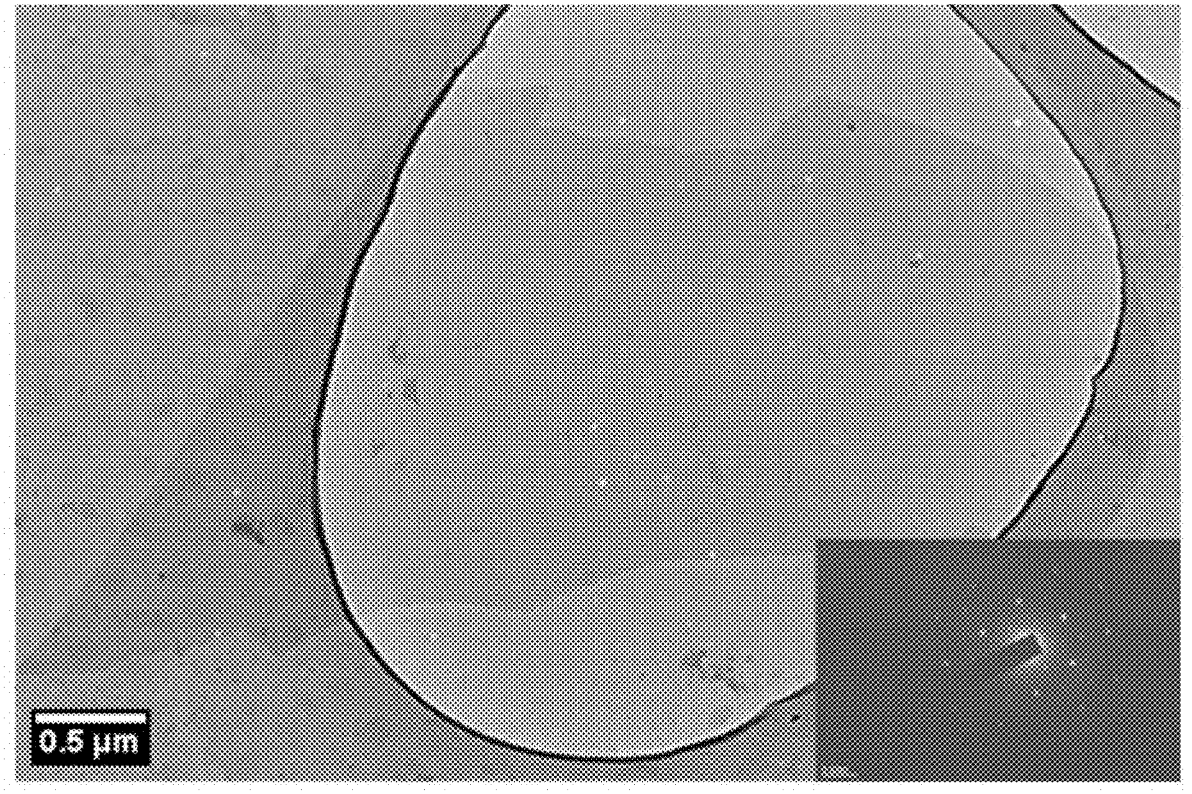

FIG. 5—TEM micrograph of a drop of a DHT-MXene/decalin suspension after 10 days. Inset shows selected area diffraction pattern.

Figure 6:
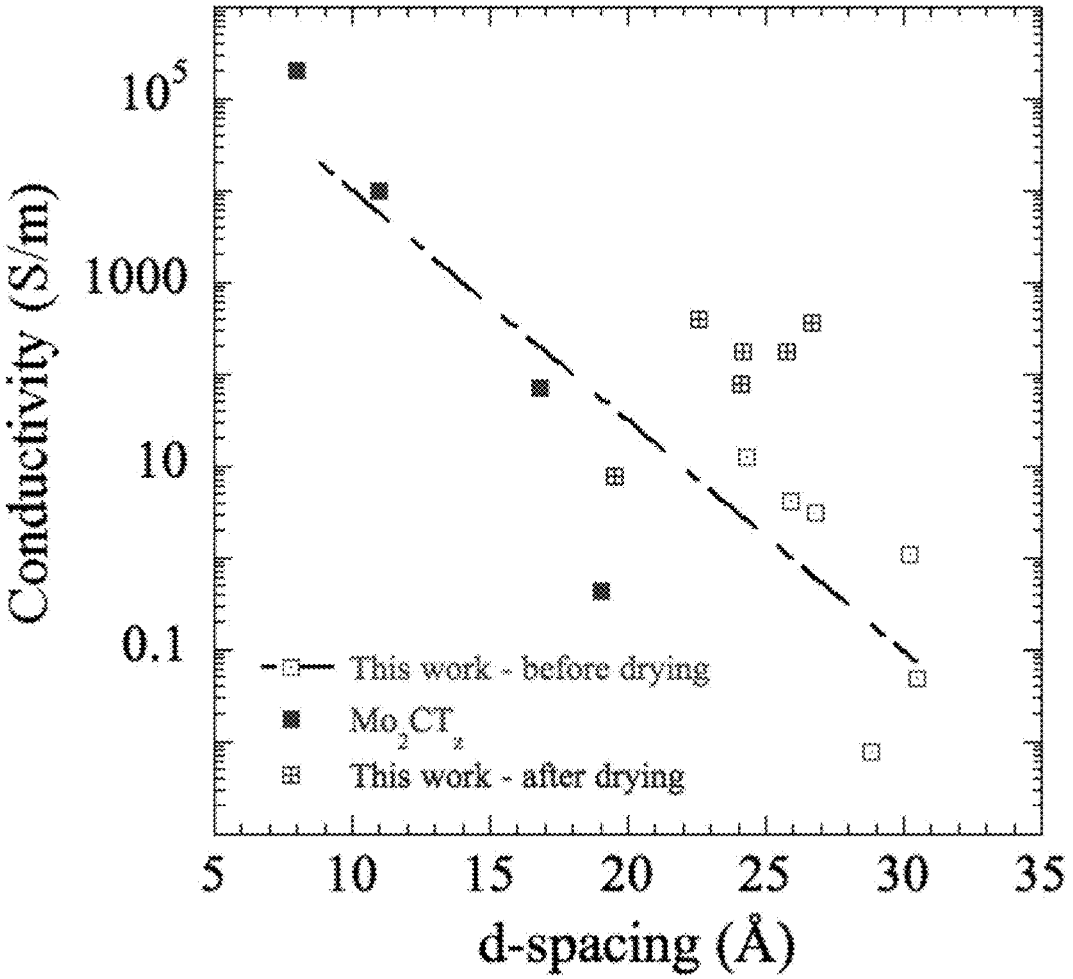

FIG. 6—Effect of solvent and d-spacing on conductivity of filtered films (before drying (red) and after drying (blue). Also plotted are the results for $Mo_2CT_z$ films taken from 2.

Figure 7:
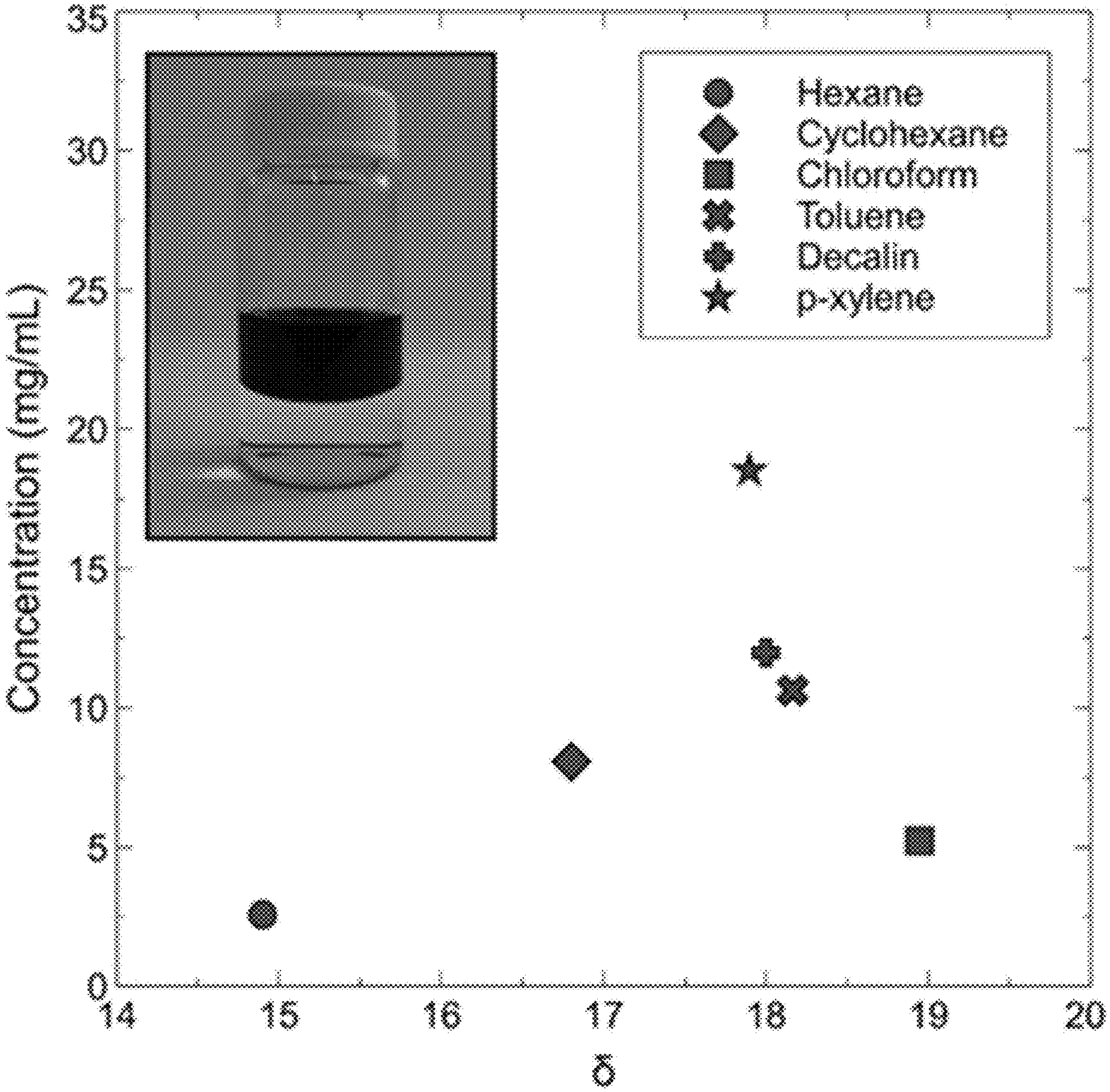

FIG. 7—Cconcentration of DHT-$Ti_3C_2T_z$ in nonpolar suspensions as a function of the Hildebrand solubility parameter; inset is a photo of 10 mL of DHT-$Ti_3C_2T_z$ in decalin on top of 10 mL of deionized water, demonstrating the liquid liquid interface. This sample remained unchanged after 30 d.

Figure 8:
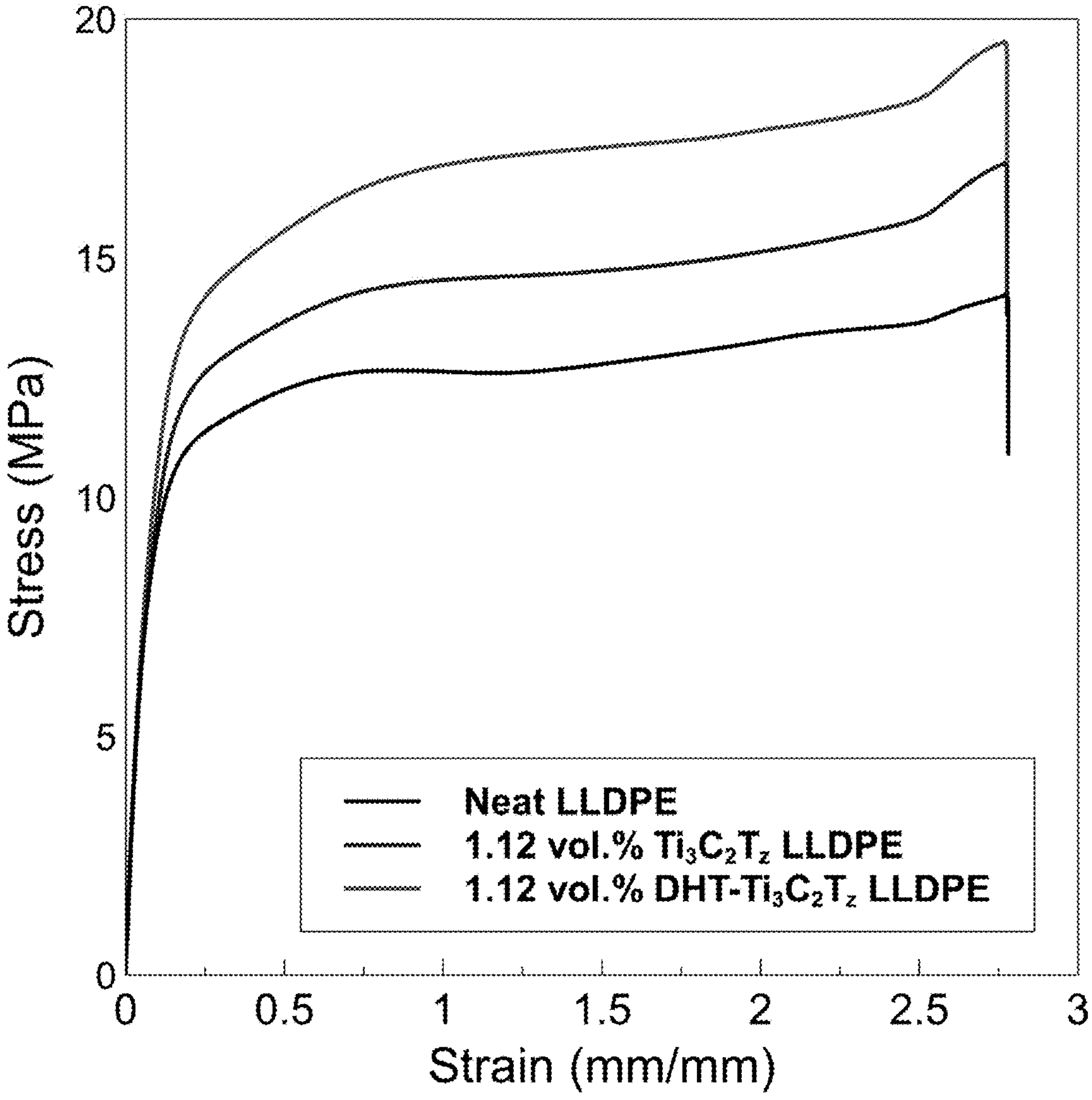

FIG. 8. Representative stress-strain curves for neat LLDPE (black—lowest line) and composite samples with 1.12 vol. % DHT-$Ti_3C_2T_z$ (red—top line) and untreated $Ti_3C_2T_z$ (blue—middle line).

Figure 9:
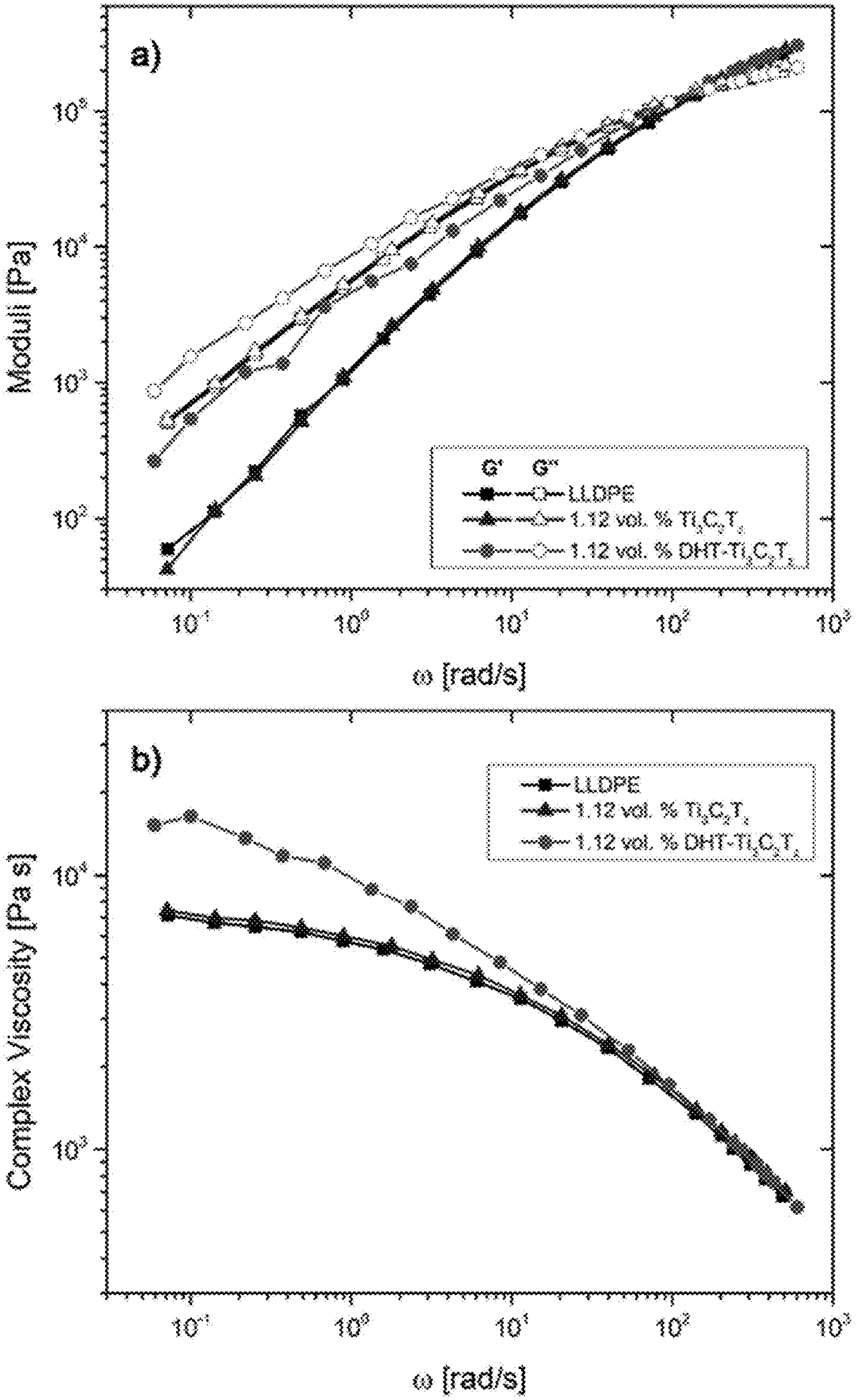

FIGS. 9A-9B—Shear moduli (FIG. 9A) and complex viscosity (FIG. 9B) of the three melts represented as master curves at Tref=200° C.\

Figure 10:
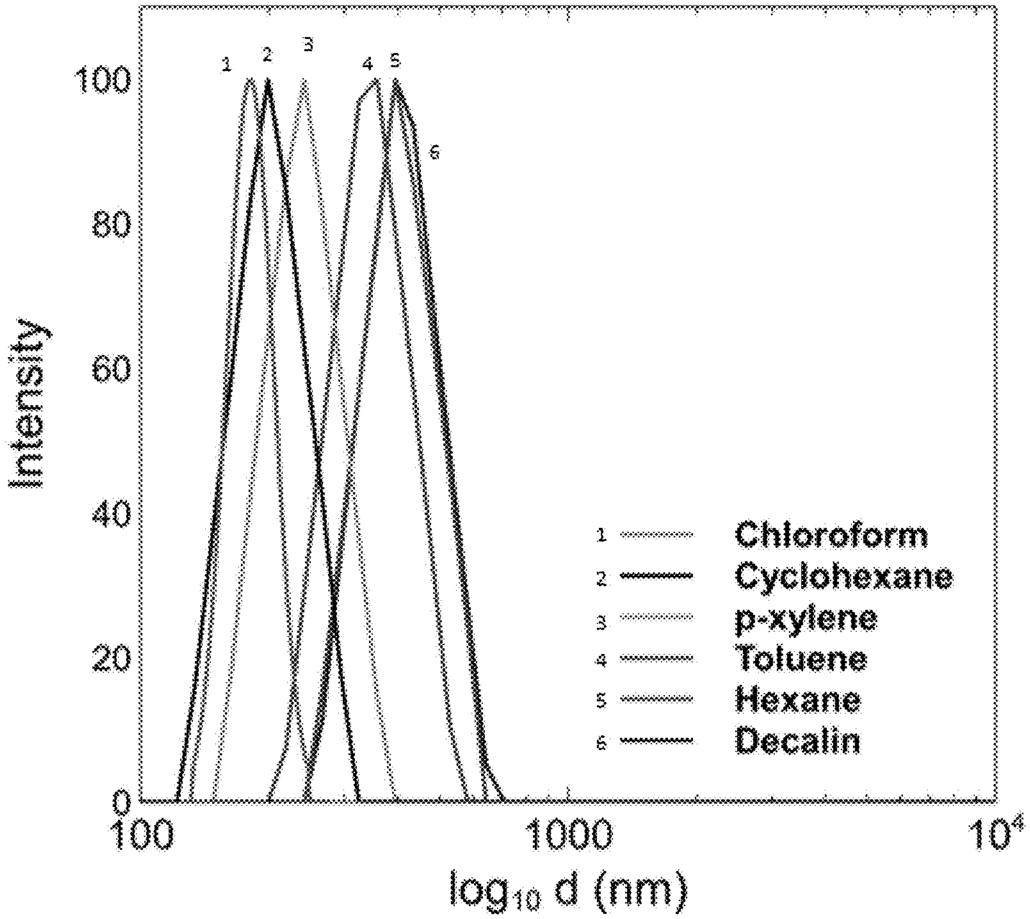

FIG. 10—Dynamic light scattering results for DHT-$Ti_3C_2T_z$ MXene in nonpolar solvents after sonication.

Figure 11:
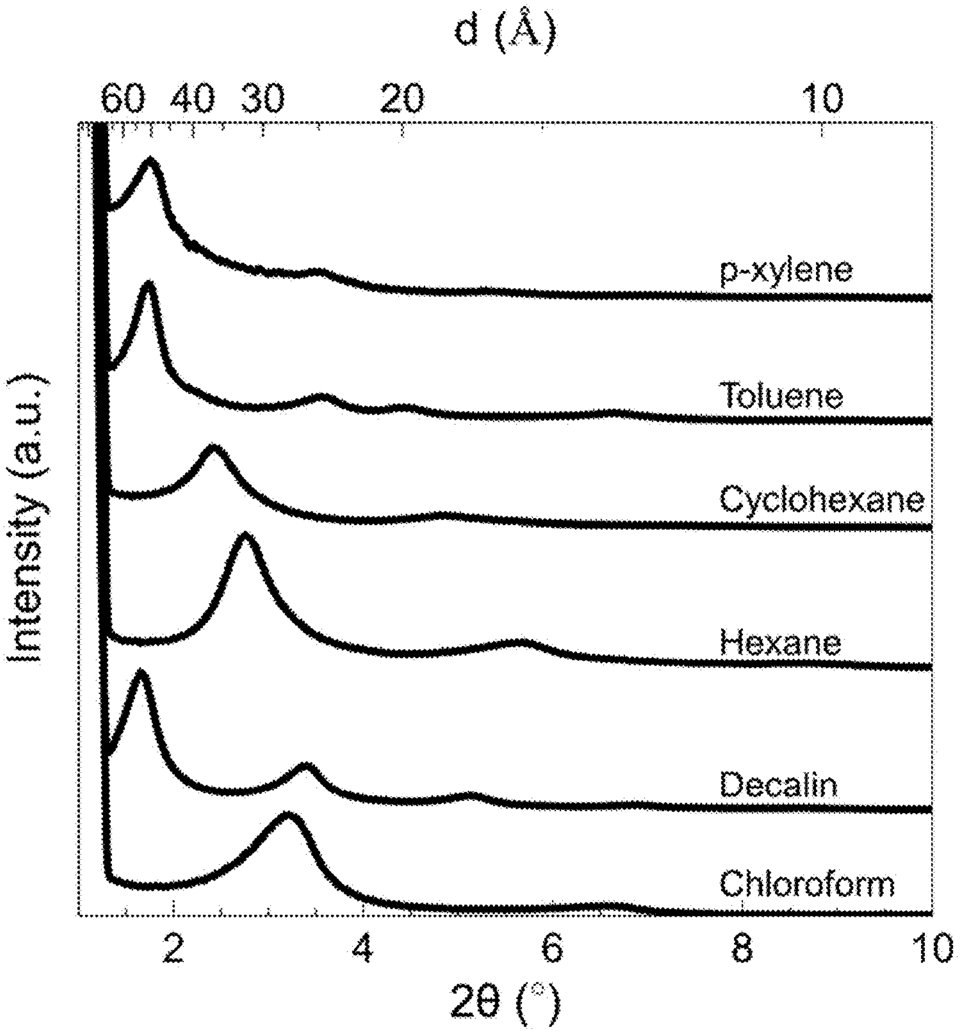

FIG. 11—XRD of isolated wet sediments.

Figure 12:
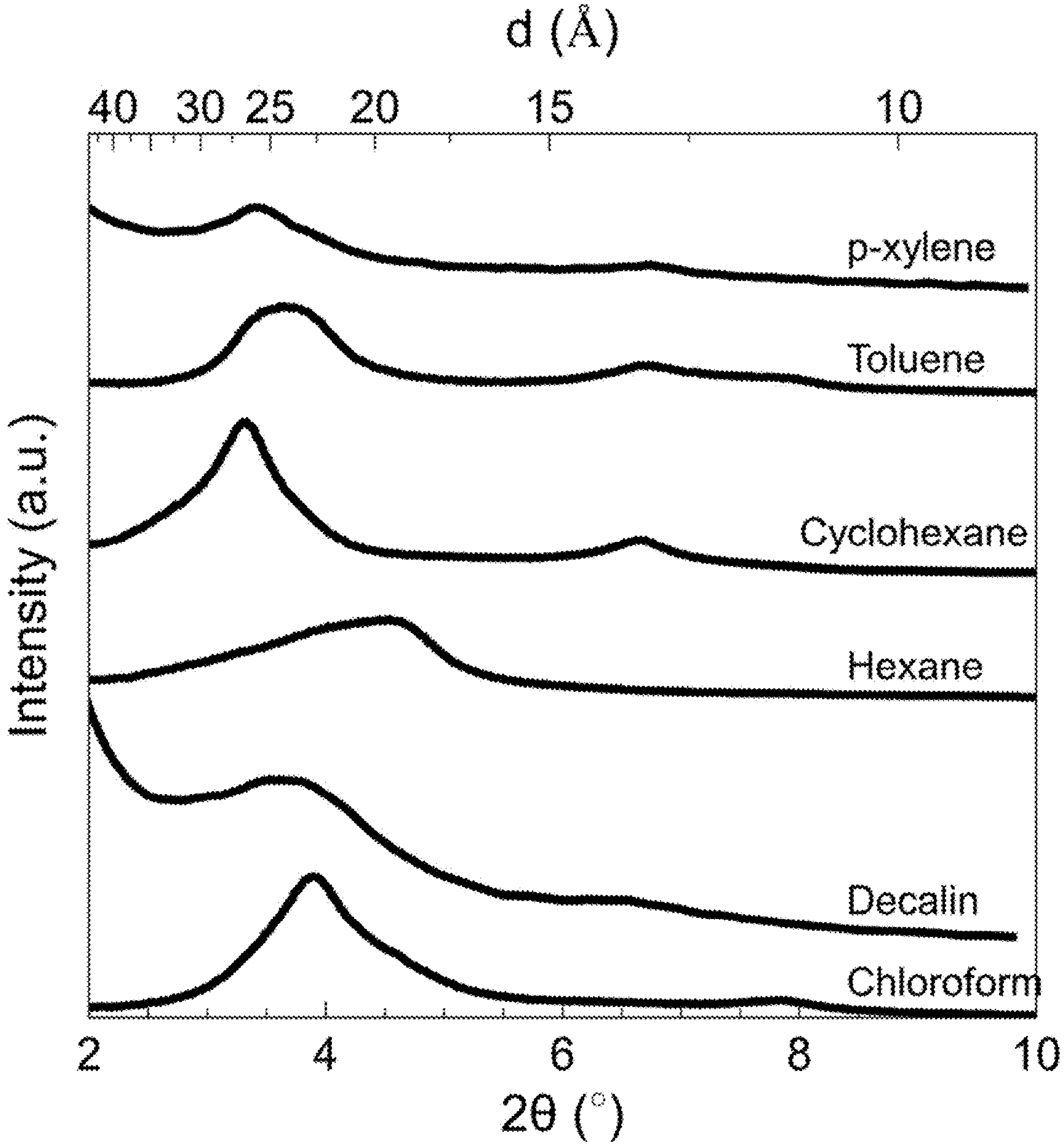
Figure 13:
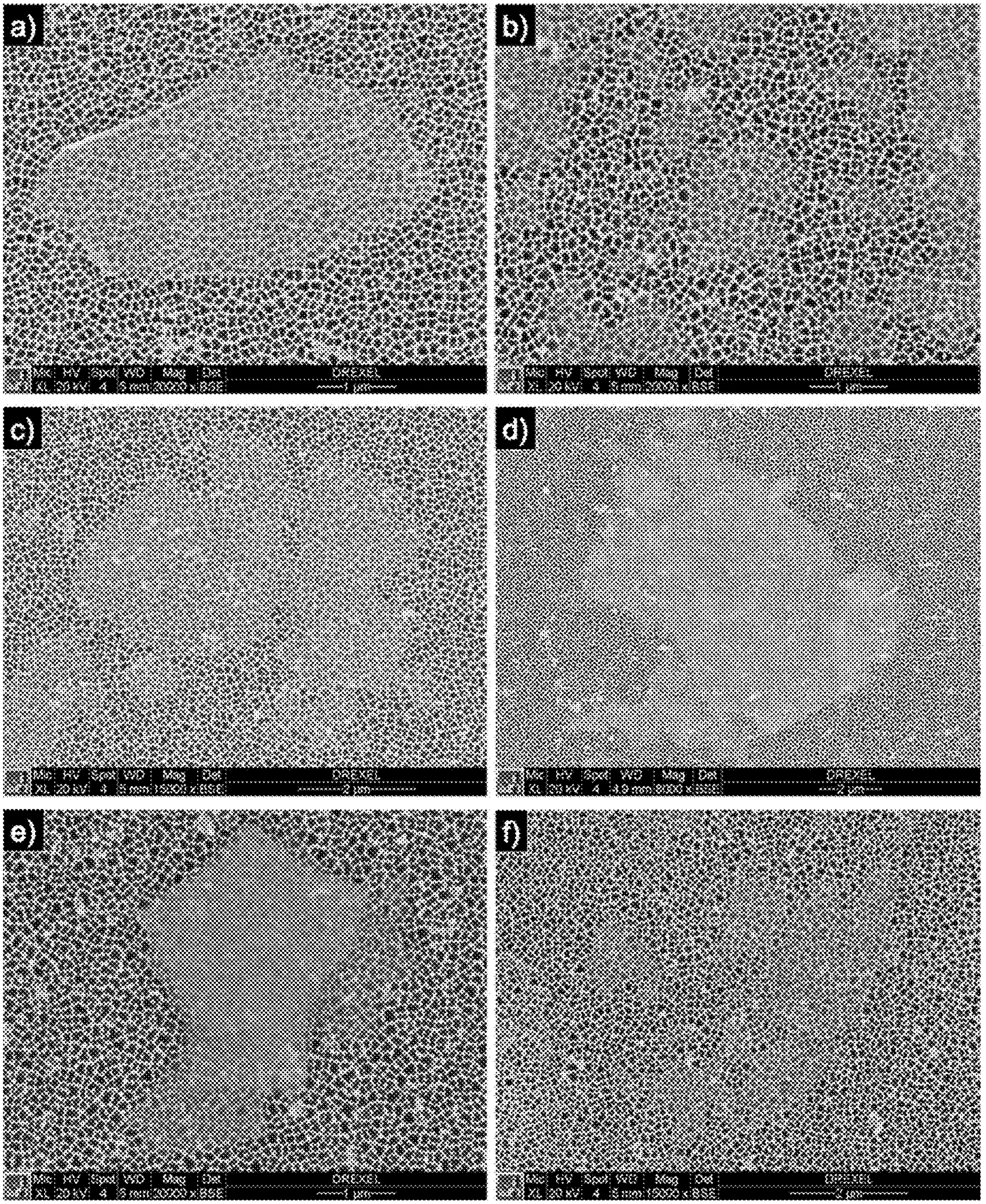
Figure 14:
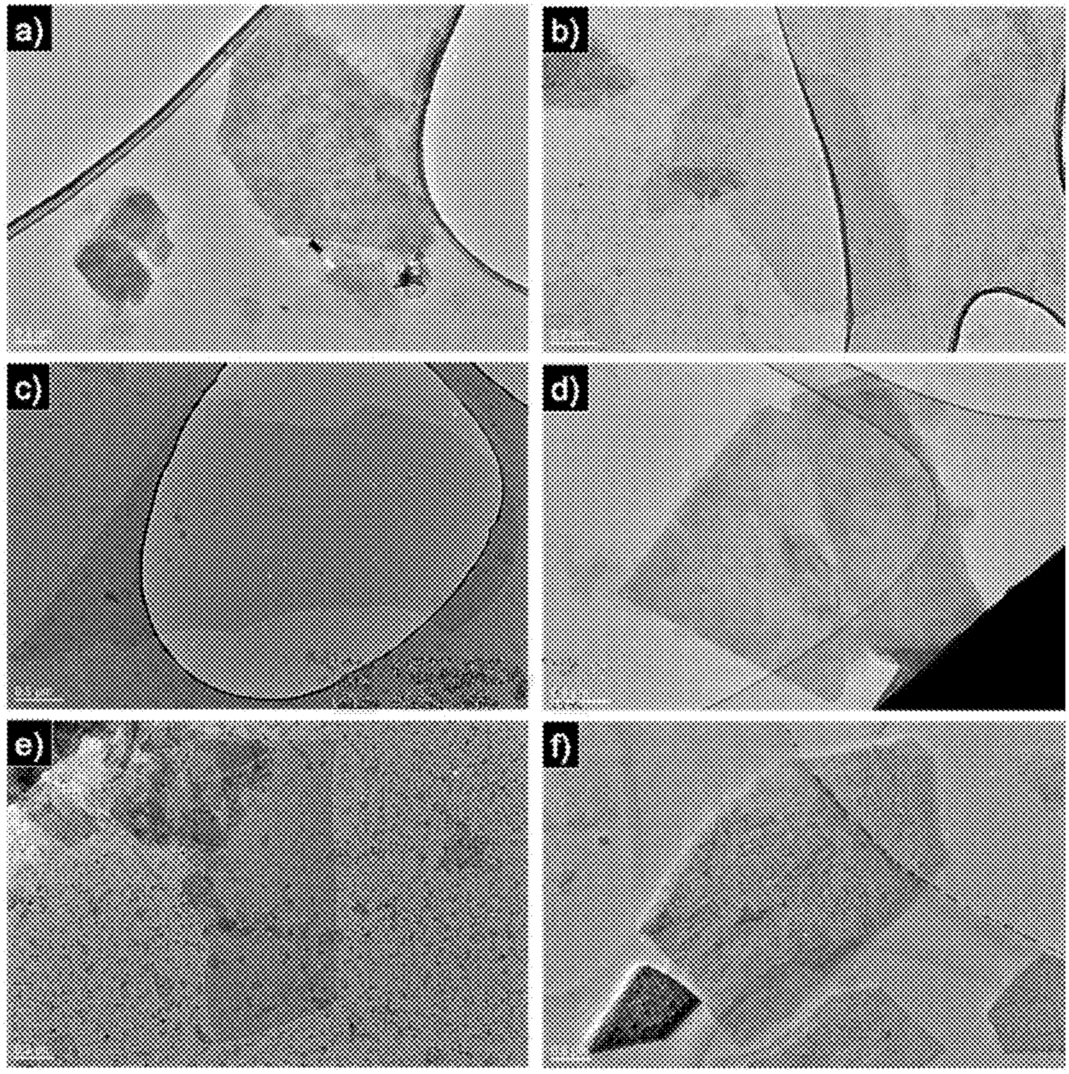

FIG. 12—RD of filtered films after annealing under vacuum at 200° C. for 24 h.

FIGS. 13A-13F—SEM micrographs of a drop of DHT-treated $Ti_3C_2T_z$ in solvents drop cast on a porous alumina substrate. Solvents are (FIG. 13A) cyclohexane, (FIG. 13B) chloroform, (FIG. 13C) decalin, (FIG. 13D) hexane, (FIG. 13E) toluene and (FIG. 13F) p-xylene.

FIGS. 14A-14F—TEM micrographs of a drop of a DHT-MXene/solvent suspension after 10 days, dropcast onto a TEM grid. Solvents are (FIG. 14A) cyclohexane, (FIG. 14B) chloroform, (FIG. 14C) decalin, (FIG. 14D) hexane, (FIG. 14E) toluene and (FIG. 14F) p-xylene.

Figure 15:
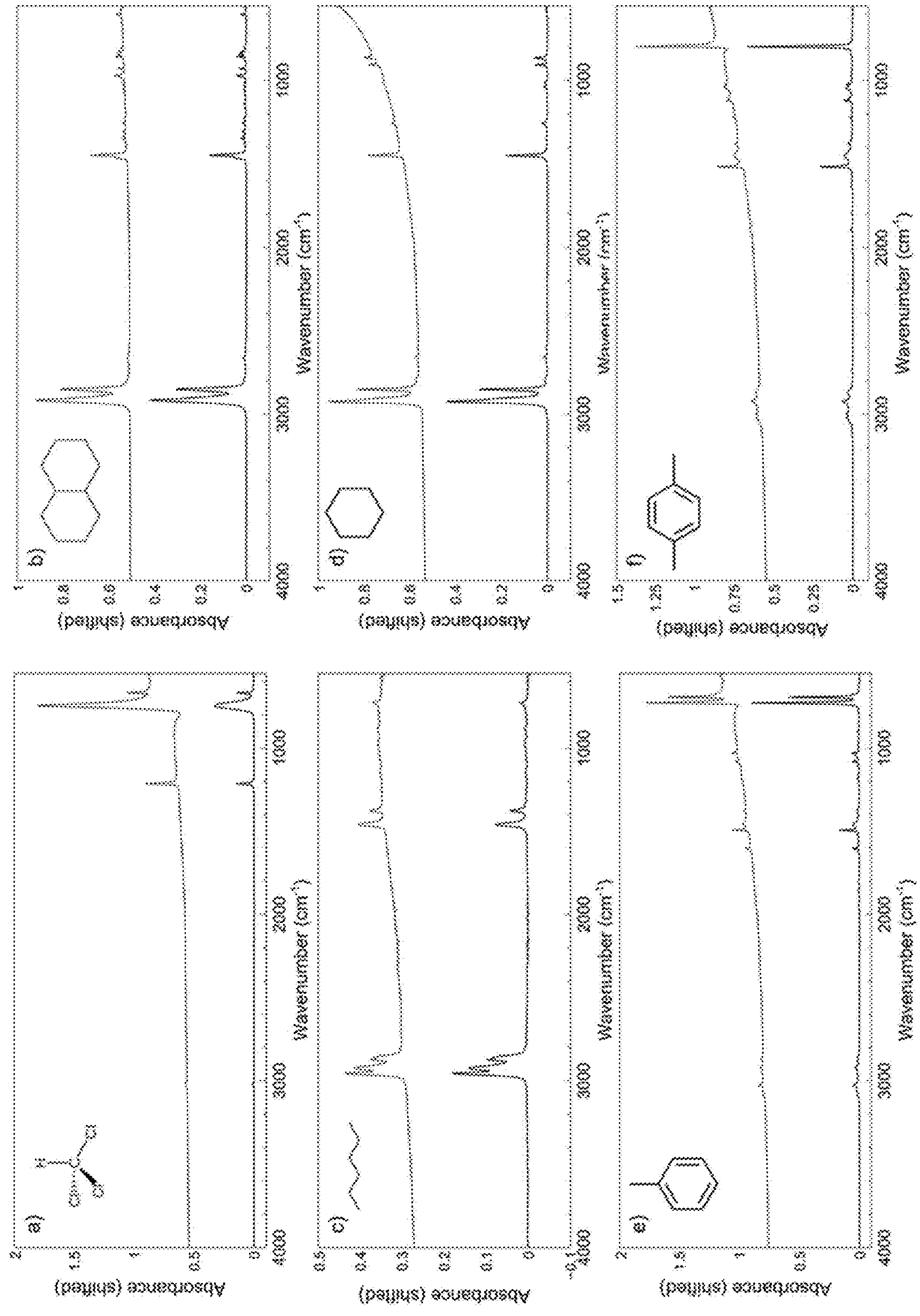

FIG. 15—ATR-FTIR spectra pairs of solvents (black) and DHT-$Ti_3C_2T_z$ containing suspensions (red) of a) chloroform, b) decalin, c) hexane, d) cyclohexane, e) toluene and f) p-xylene.

Figure 16:
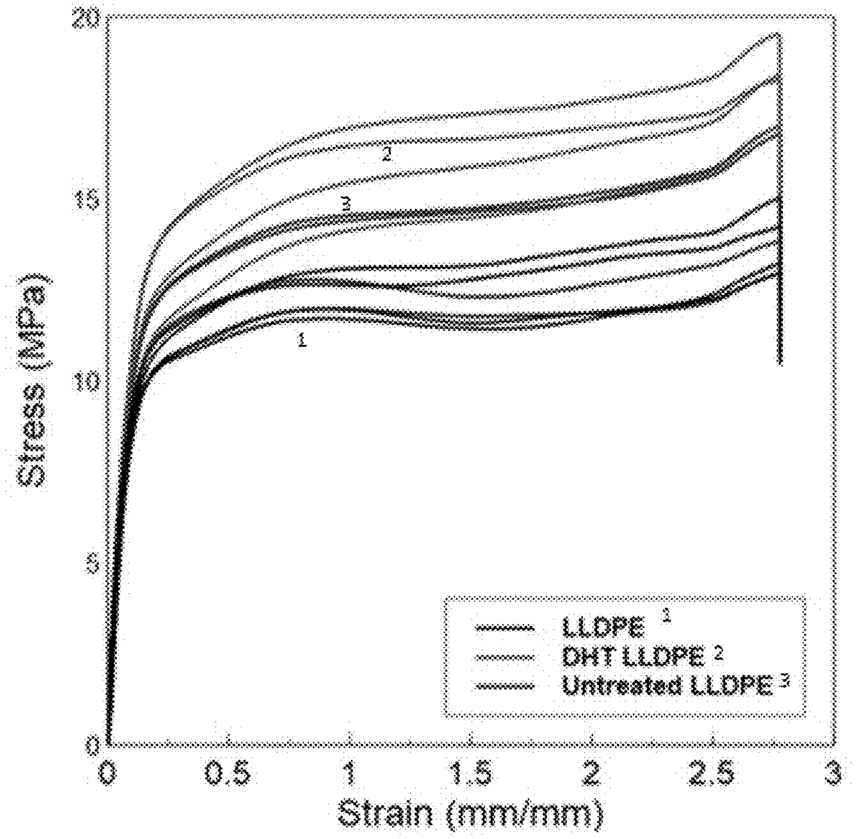

FIG. 16—Stress strain plots will all samples shown for neat LLDPE (black), untreated MXene (blue) and DHT-treated MXene (red).

Figure 17:
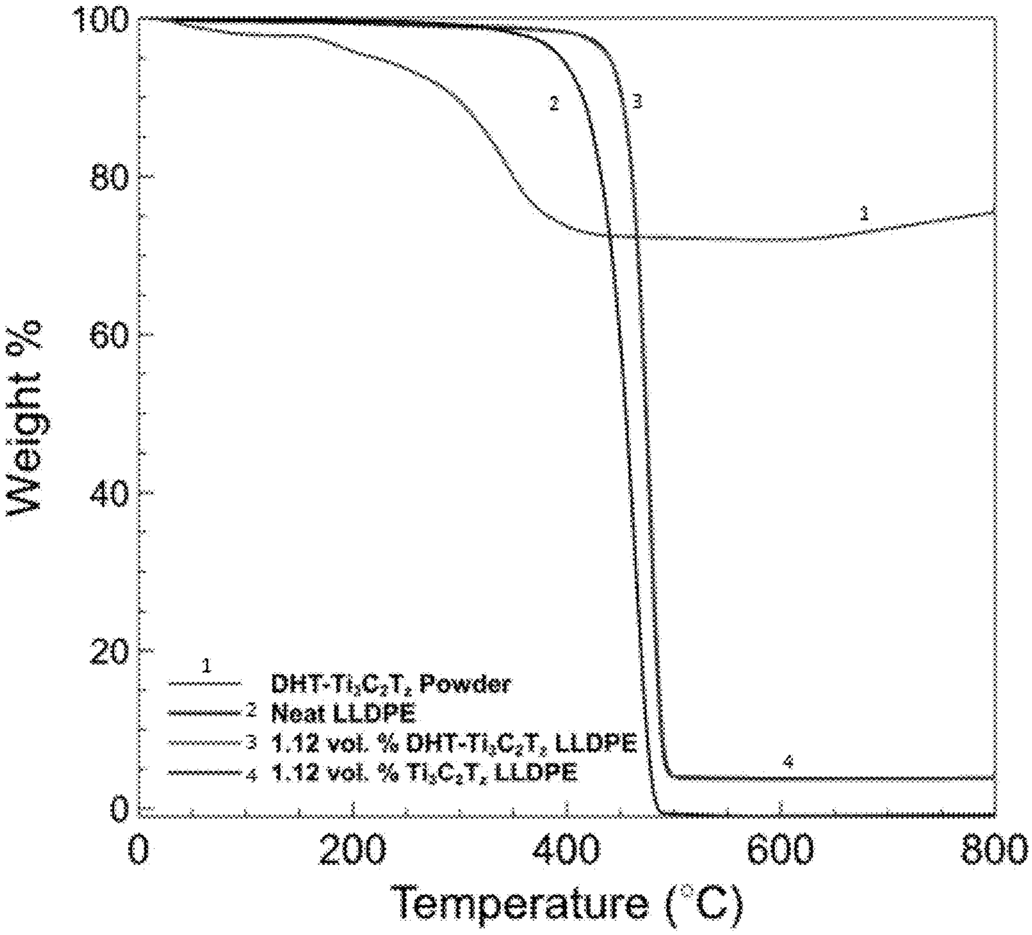

FIG. 17—Thermogravimetric weight loss of DHT-$Ti_3C_2T_z$ powder as well as LLDPE and composite samples.

Figure 18:
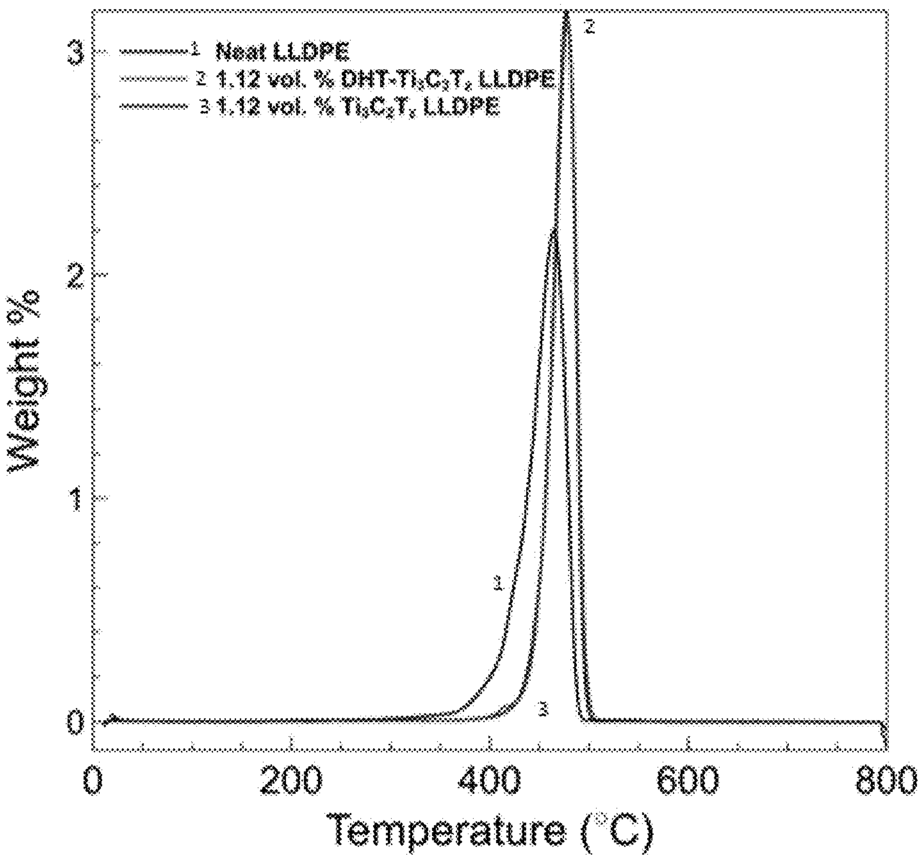

FIG. 18—Derivative weight percent as a function of temperature for LLDPE and composite samples.

Figure 19:
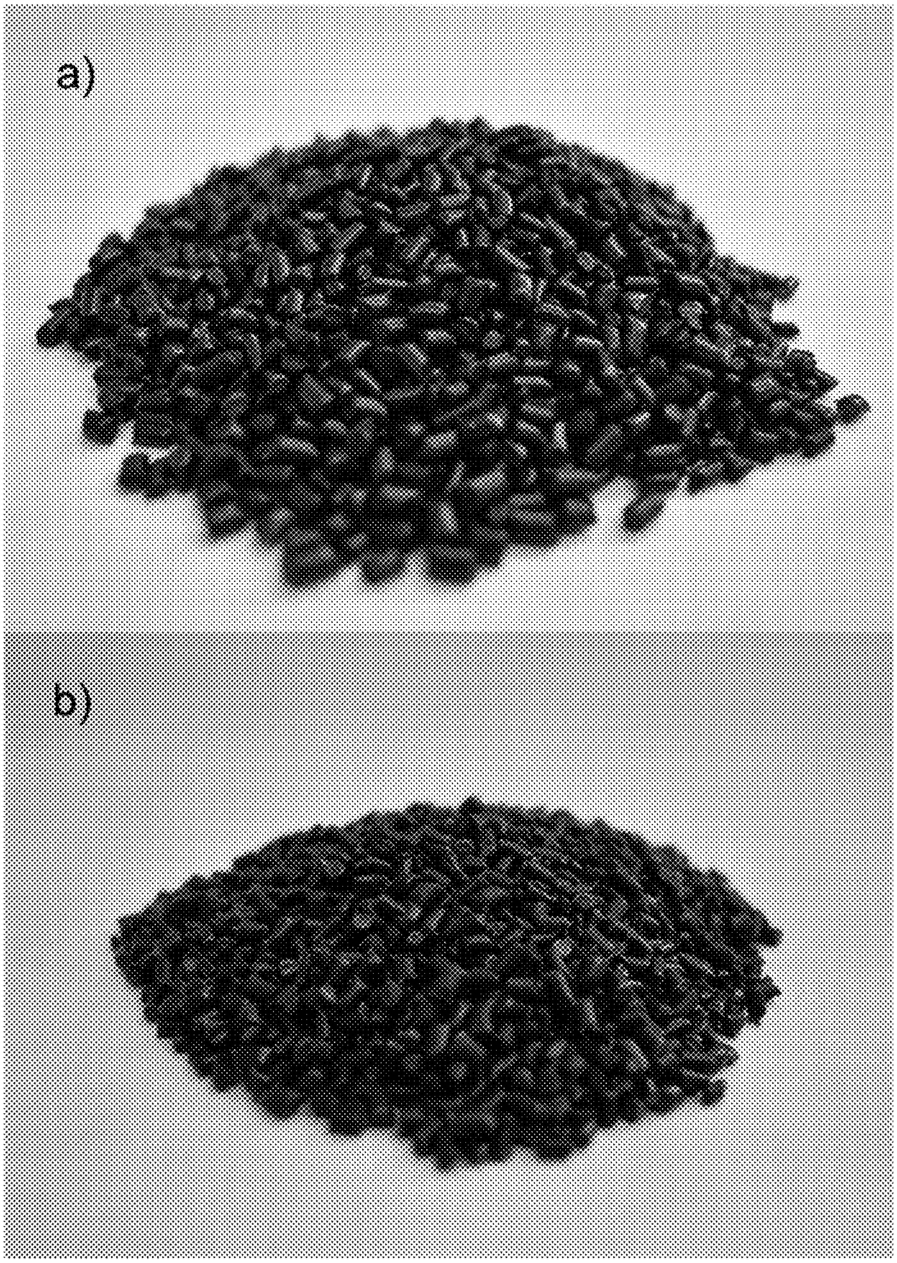

FIGS. 19A-19B—Digital photographs of (FIG. 19A) 1.12 vol. % DHT-$Ti_3C_2T_z$ LLDPE pellets and (FIG. 19B) 1.12 vol. % untreated $Ti_3C_2T_z$ LLDPE pellets.

FIGS. 20A-20C—SEM images and corresponding Ti Ka EDS spectra of (FIG. 20A) Neat LLDPE, (FIG. 20B) 1.12 vol. % DHT-$Ti_3C_2T_z$ LLDPE and (FIG. 20C) 1.12 vol. % untreated $Ti_3C_2T_z$ LLDPE injection moulded tensile sample surfaces.

Figure 21:
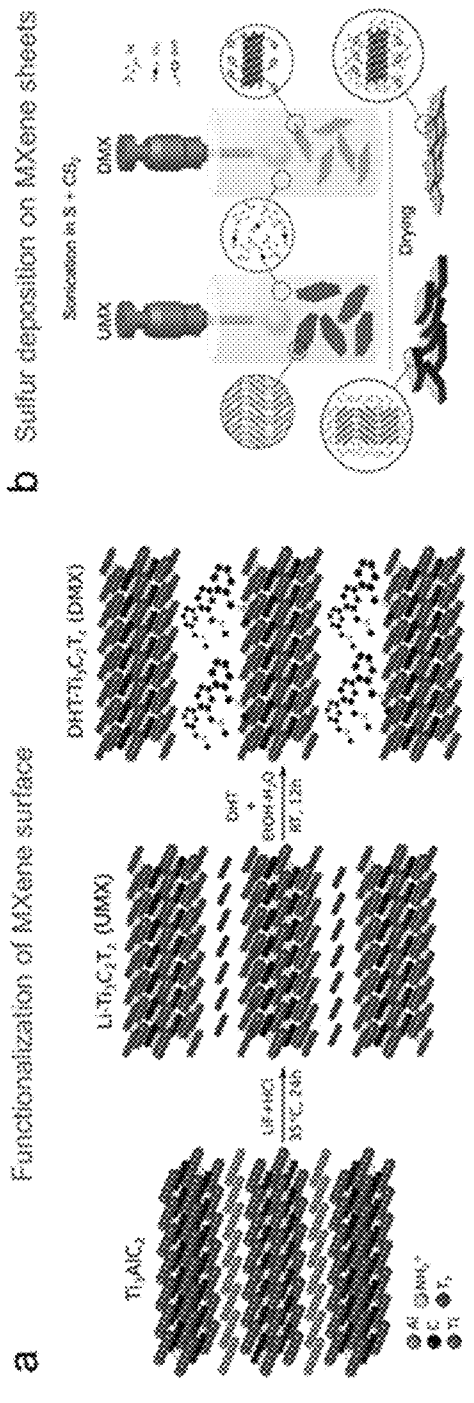
Figure 22:
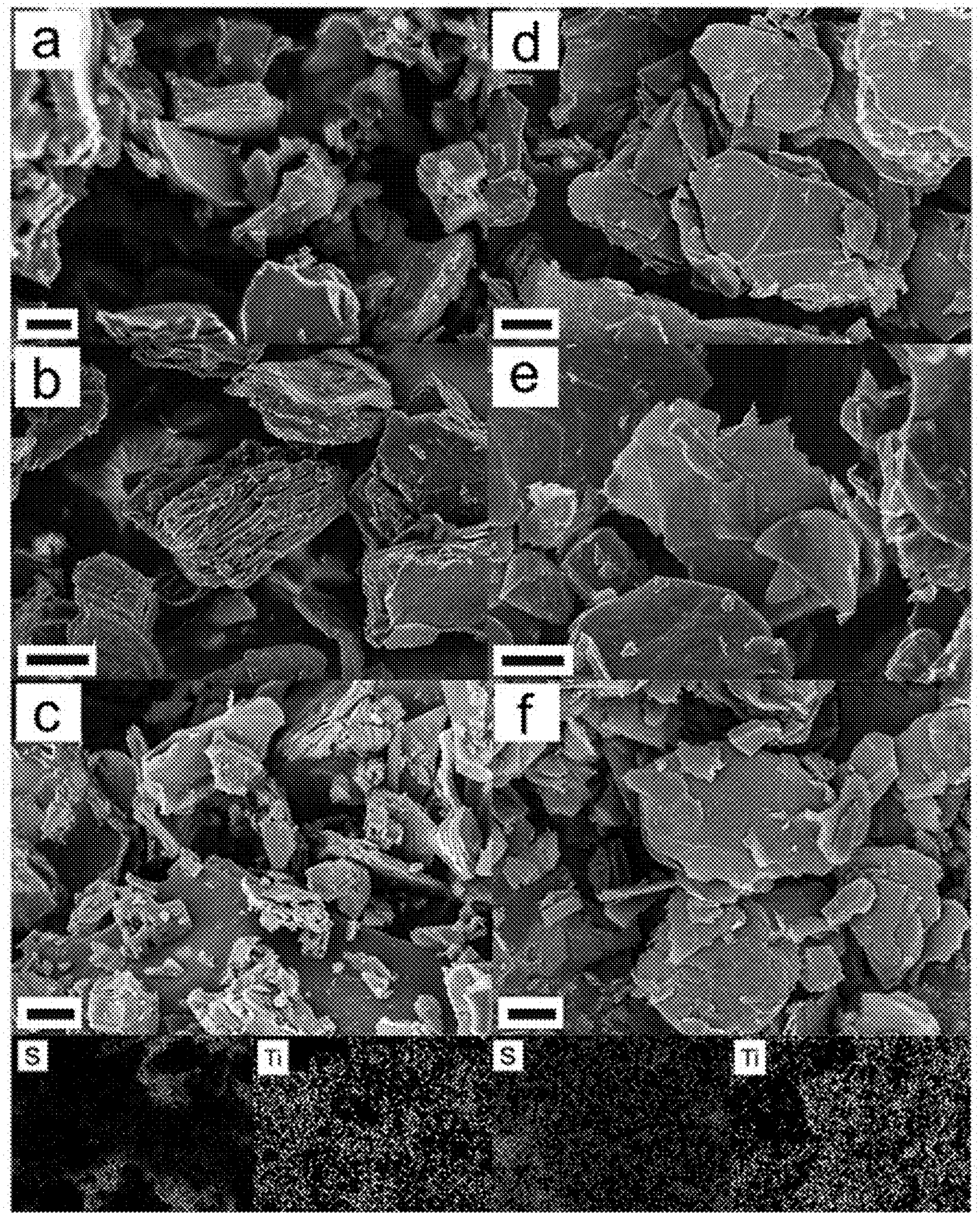

FIG. 21A—etching $Ti_3AlC_2$ phase to yield UMX and subsequent functionalization using DHT to yield DMX, FIG. 21B—Fabrication procedure of MXene and sulfur composites (UMX/S and DMX/S) using probe ultrasonication and drying FIGS. 22A-22F—SEM micrographs of UMX/S (FIGS. 22A-22B), DMX/S (FIGS. 22C-22D). EDS images and mapping of UMX/S (FIG. 22E), DMX/S (FIG. 22F). Scale bar 2 micron.

Figure 23:
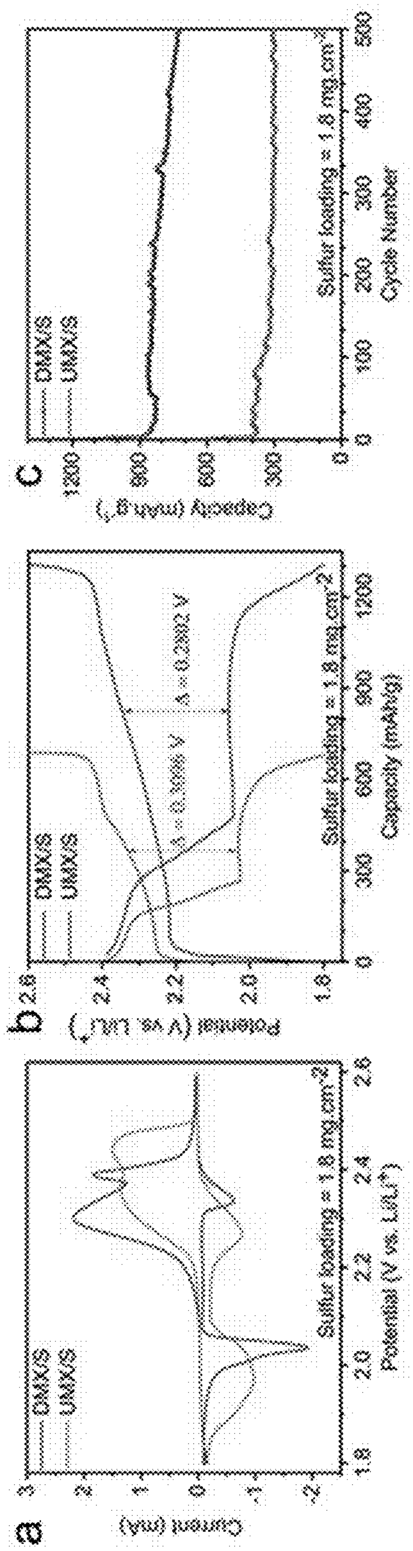

FIG. 23A-23C—Electrochemical analysis of DMX/S and UMX/S. FIG. 23A comparison between CV curves of DMX/S and UMX/S, FIG. 23B—Charge-Discharge curves DMX/S and UMX/S, FIG. 23C—cycling stability curves at 0.5 C of DMX/S and UMX/S.

Figure 24:
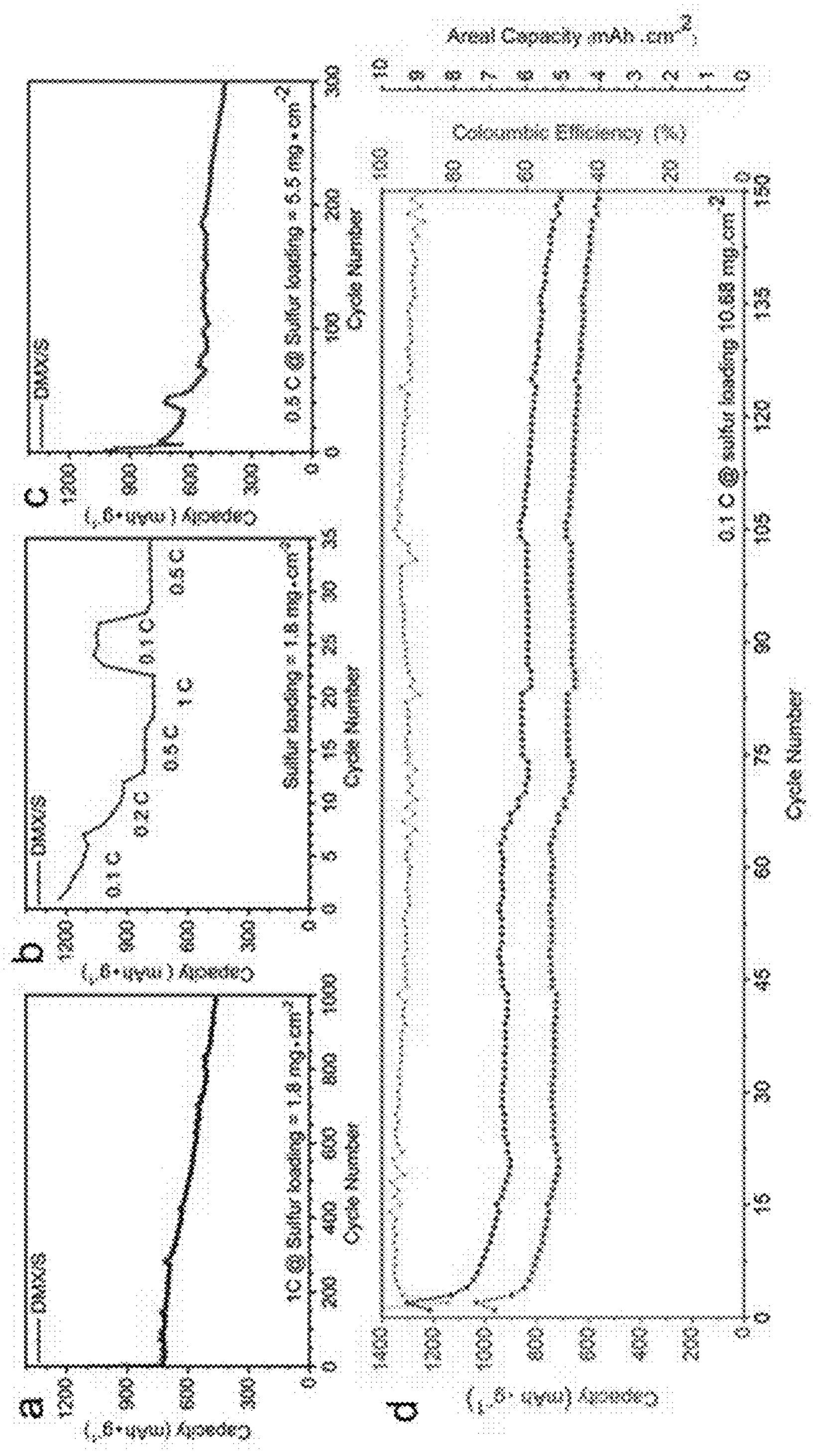
Figure 25:
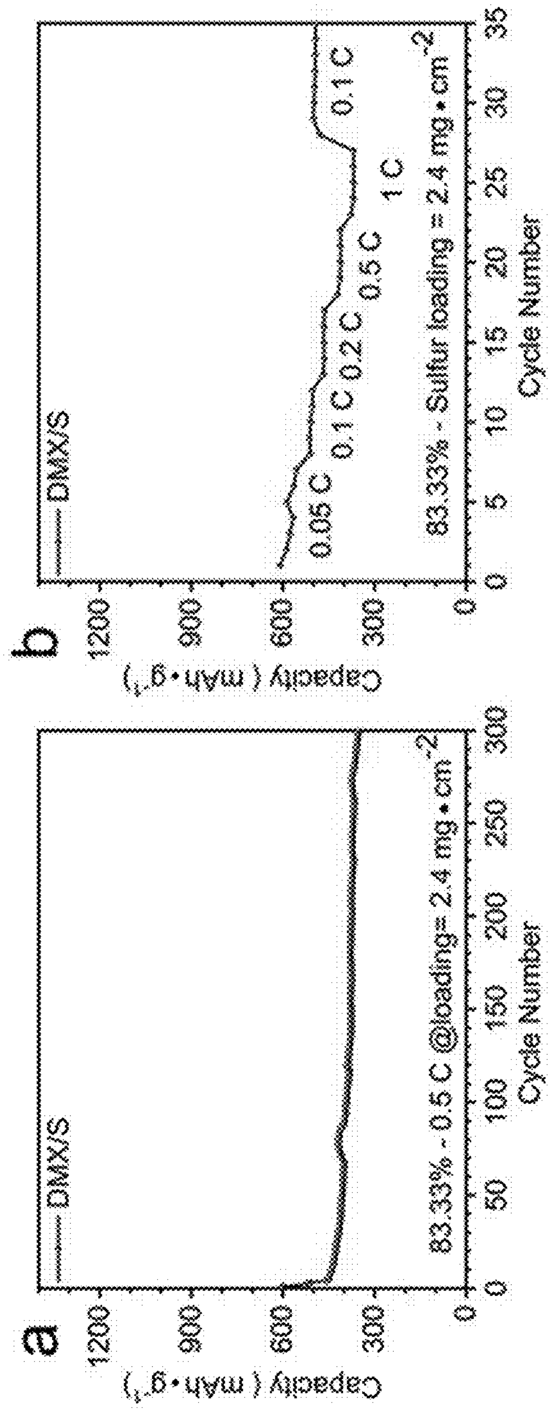

FIG. 24A—Cycling stability curve of DMX/S at 1 C, FIG. 24B—Rate characteristics of DMX/S, FIG. 24C—Cycling stability curve at high loading and moderate current rate of 5.5 mg·cm$^{-2}$ at 0.5 C, FIG. 24D—cycling performance of DMX/S cathode at high loading of 10.68 mgcm$^{-2}$.c FIG. 25A—Cycling stability at 83.33% loading with 2.4 mg·cm$^{-2}$ sulfur loading at 0.5 C, FIG. 25B—Rate characteristics of DMX/S at 83.33% sulfur loading.

Figure 26:
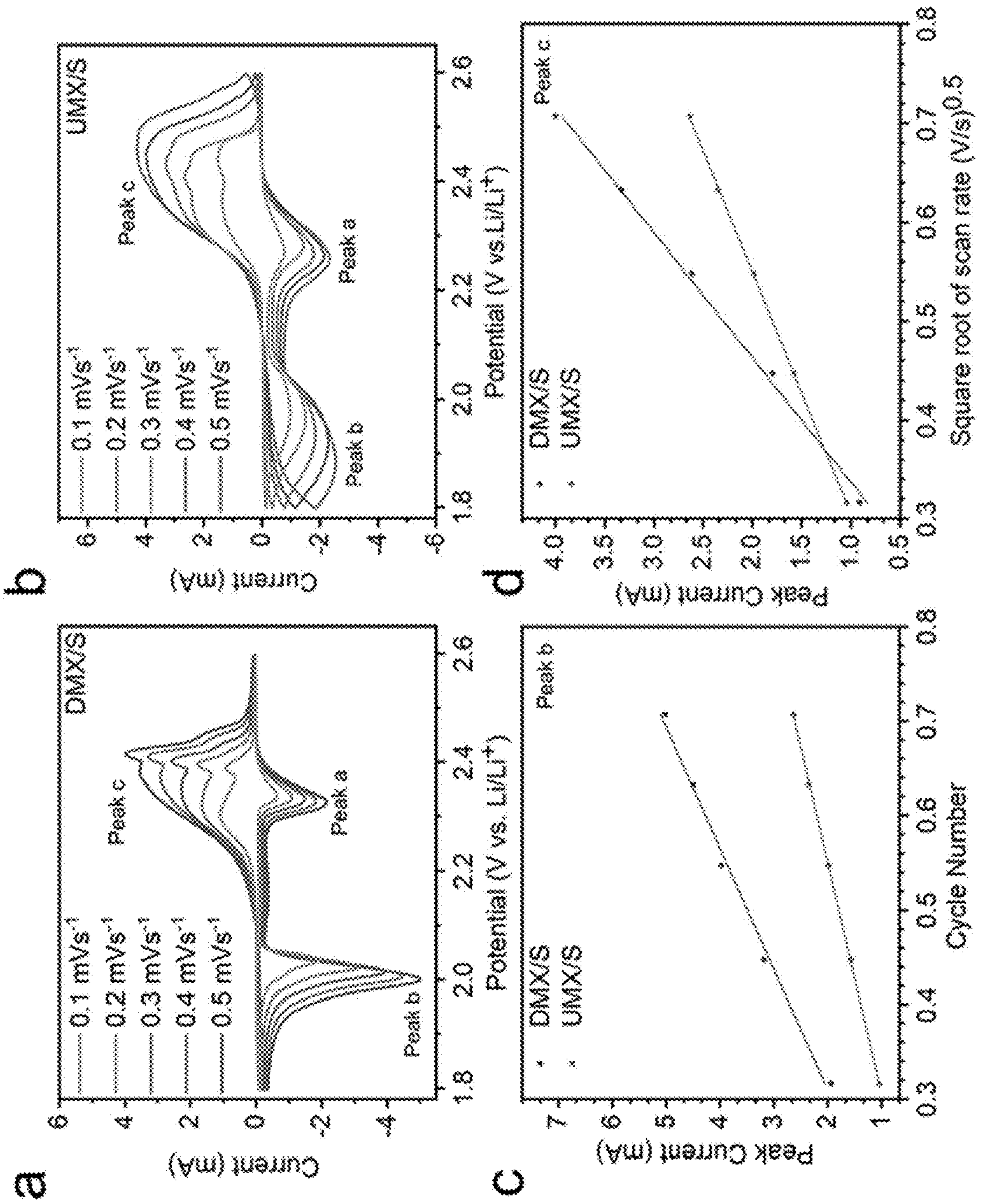

FIG. 26A-26B—CV curves of DMX/S and UMX/S at various scan rates (0.5 mVs$^{-1}$ top line, 0.1 mVs$^{-1}$ bottom line); FIG. 26C-26D—relationships between the peak current and scan rate (0.5 mVs$^{-1}$ top line, 0.1 mVs$^{-1}$ bottom line) for different reaction processes in the DMX/S and UMX/S composites. FIG. 26C—Peak b: $Li_2Sx \rightarrow Li_2S2/Li_2S$, FIG. 26D—Peak c: $Li_2Sx \rightarrow S_8$ (4≤x≤8).

Figure 27:
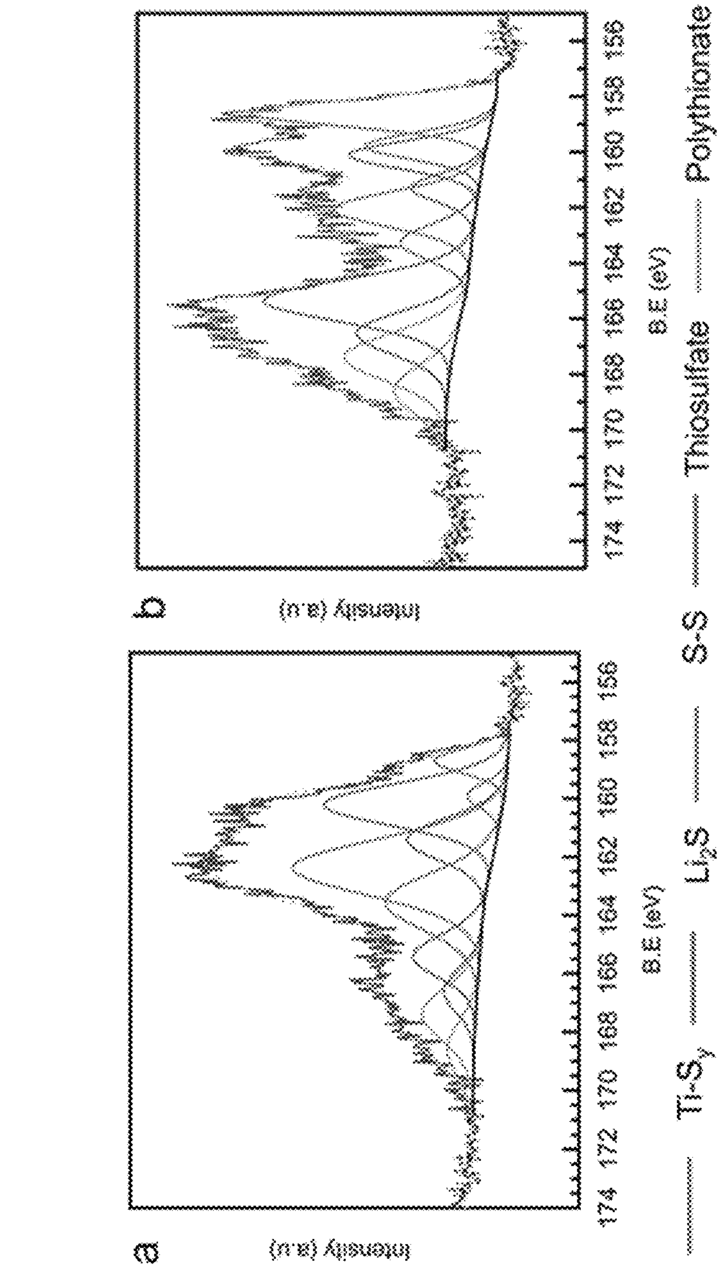

FIG. 27A-27B—XPS analysis of chemical interactions between host materials and soluble LiPs after cycling. S2p core level spectra of (FIG. 27A) UMX/S, (FIG. 27B) DMX/S.

Figure 32:
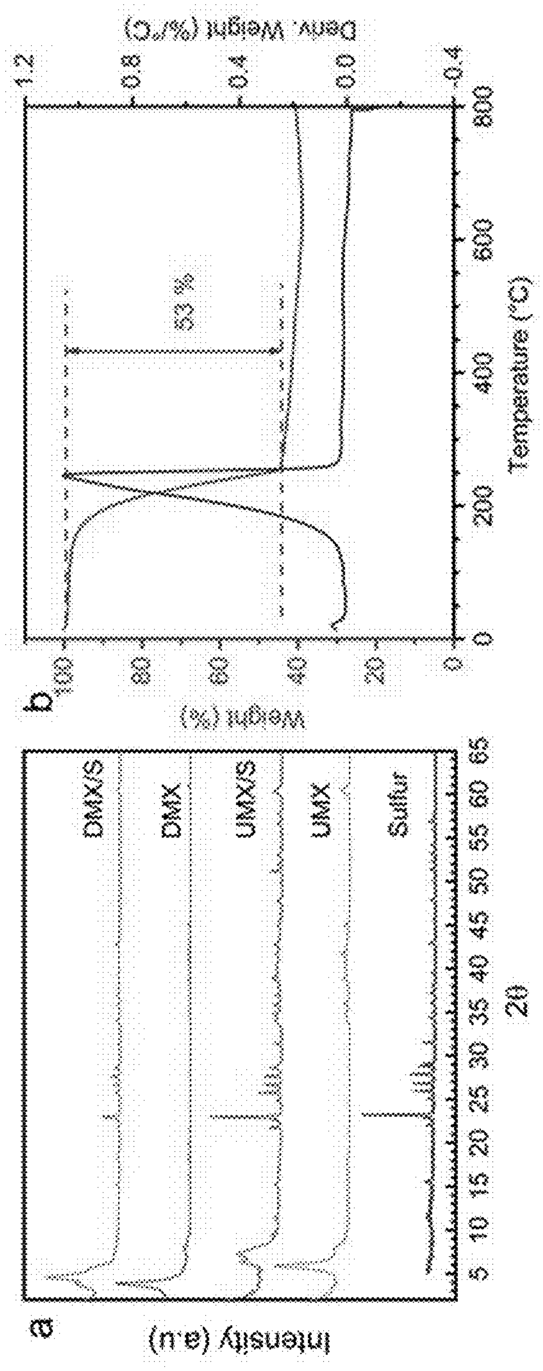

FIG. 32A—XRD patterns of UMX, DMX, Sulfur and its composites, FIG. 32B—TGA curve of DMX/S FIGS. 28A-28D—Time dependent colloidal stability of, UMX and DMX in CS$_2$ (FIGS. 28A and 28B), UMX/S and DMX/S in sulfur saturated CS$_2$ (FIGS. 28C and 28D).

Figure 29:
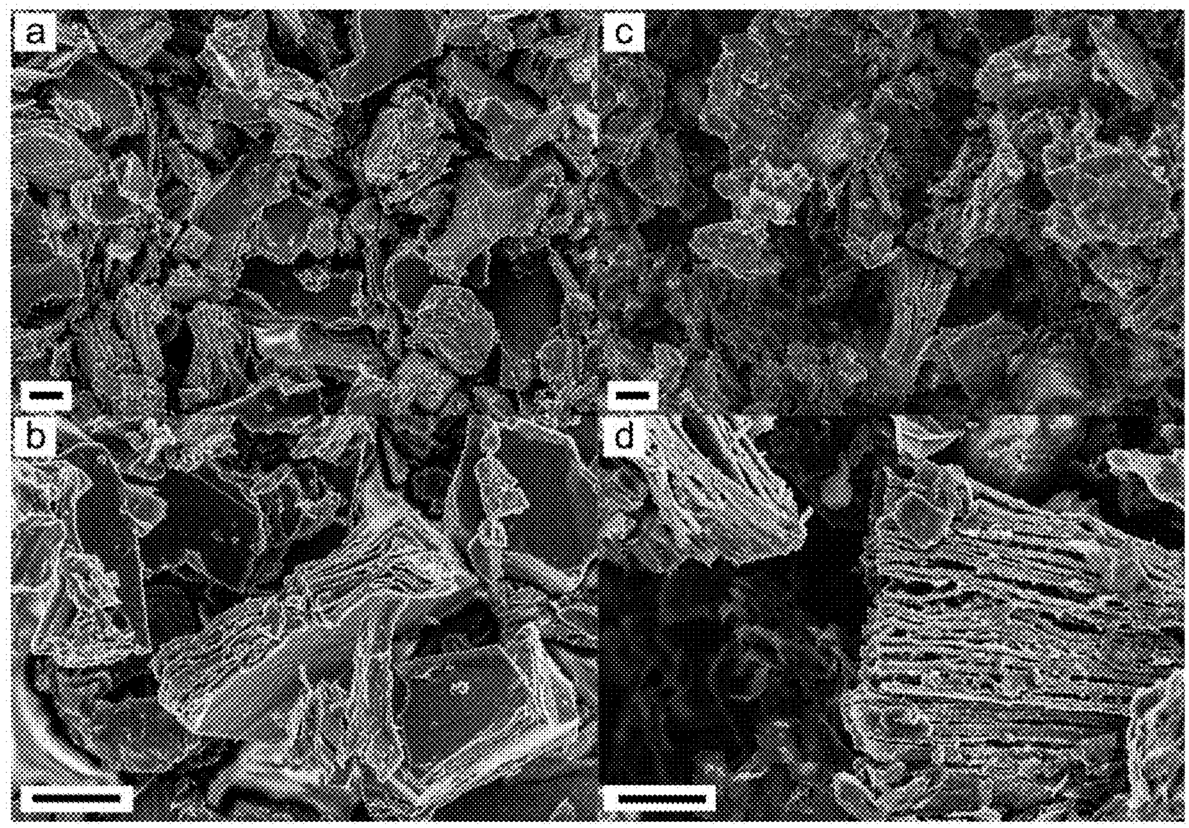

FIG. 29A-29D—SEM micrographs of composites without sulfur, UMX (FIGS. 29A-29B) and DMX (FIGS. 29C-29D). Scale bar 2 micron.

Figure 30:
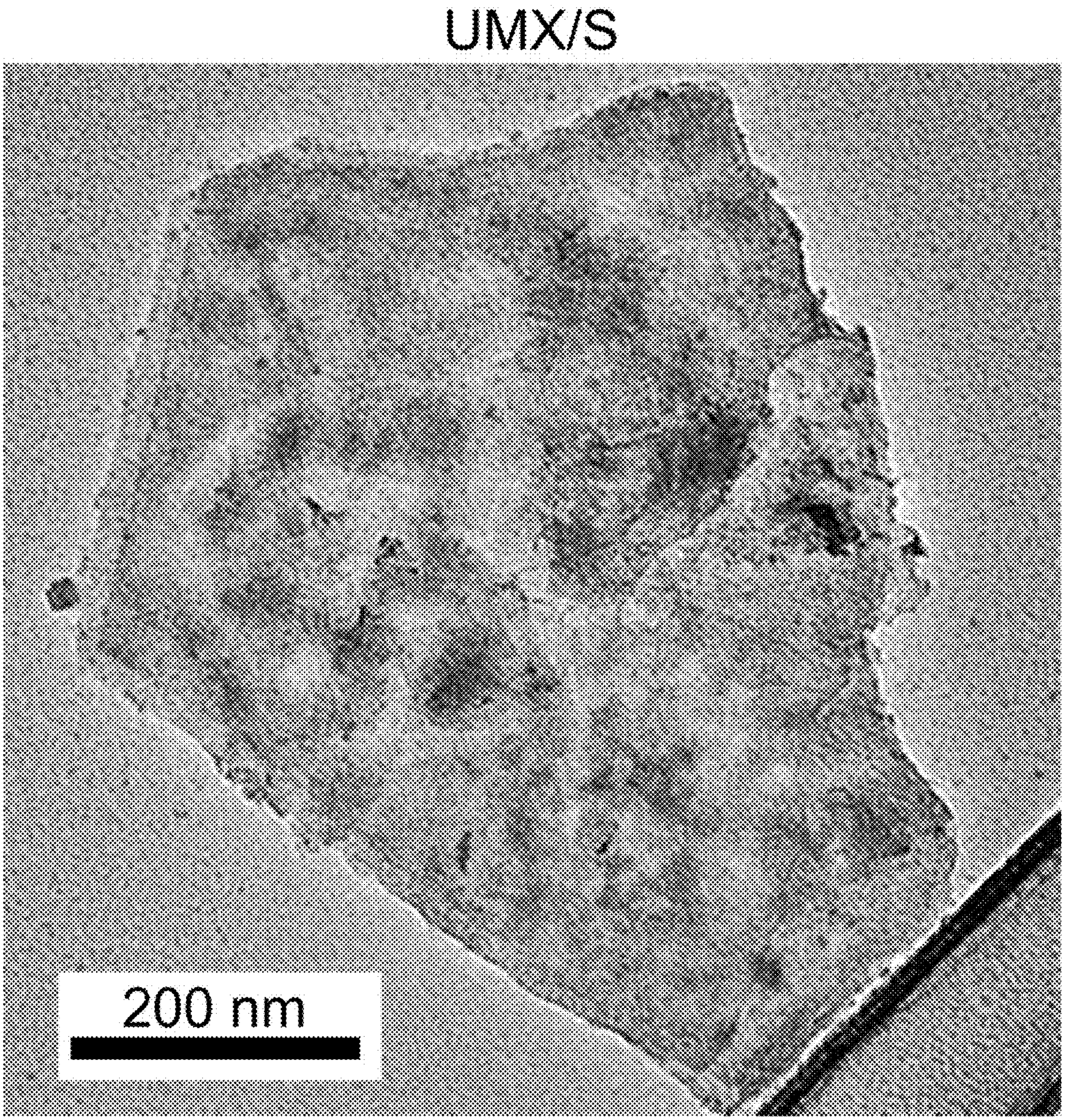

FIG. 30—TEM micrograph of UMX/S.

Figure 31:
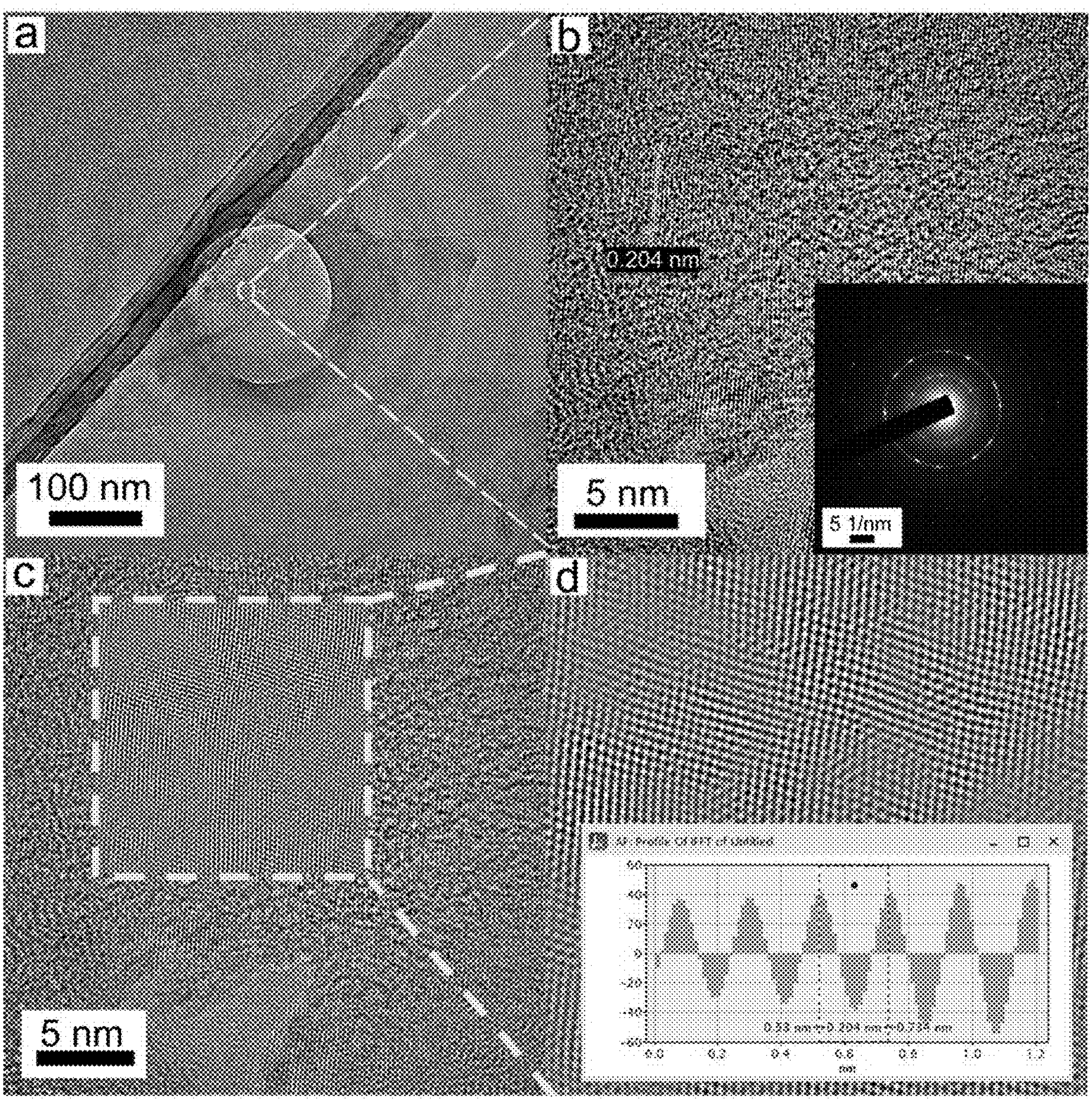

FIG. 31A—TEM micrograph of DMX/S, FIG. 31B—High-resolution TEM image of DMX/S (Inset-SAED pattern of DMX/S, FIGS. 31C-31D—Interfringe distance analysis after FFT filter of DMX/S.

Figure 33:
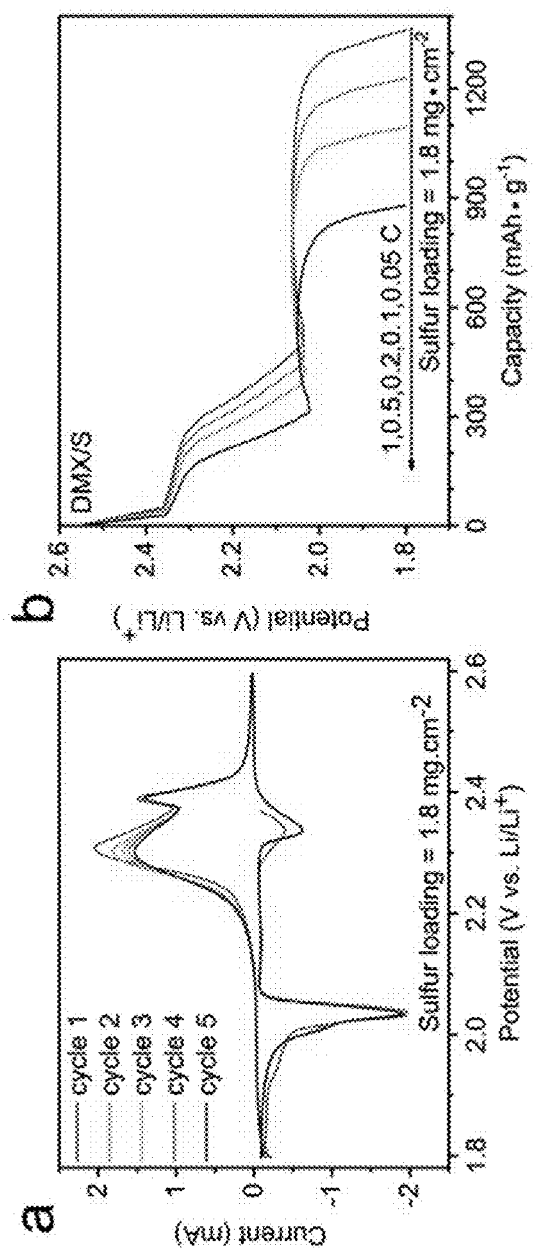
Figure 34:
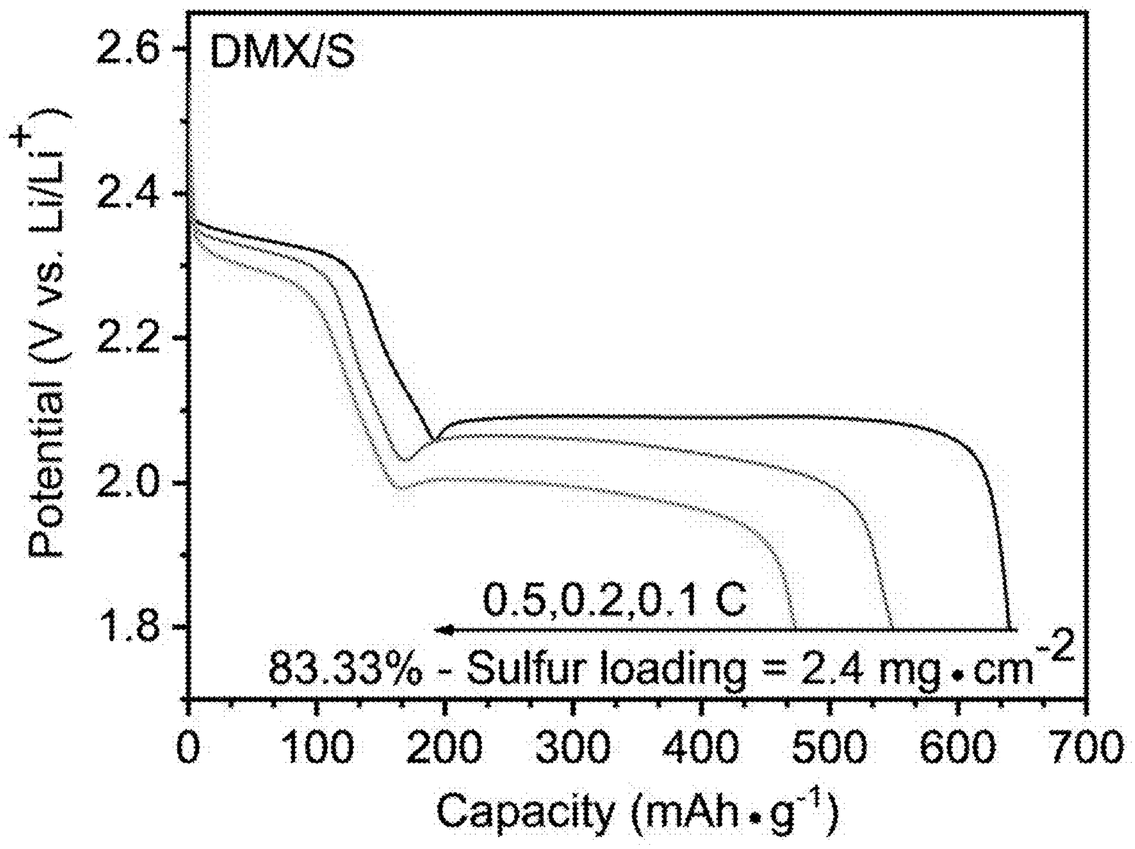
Figure 35:
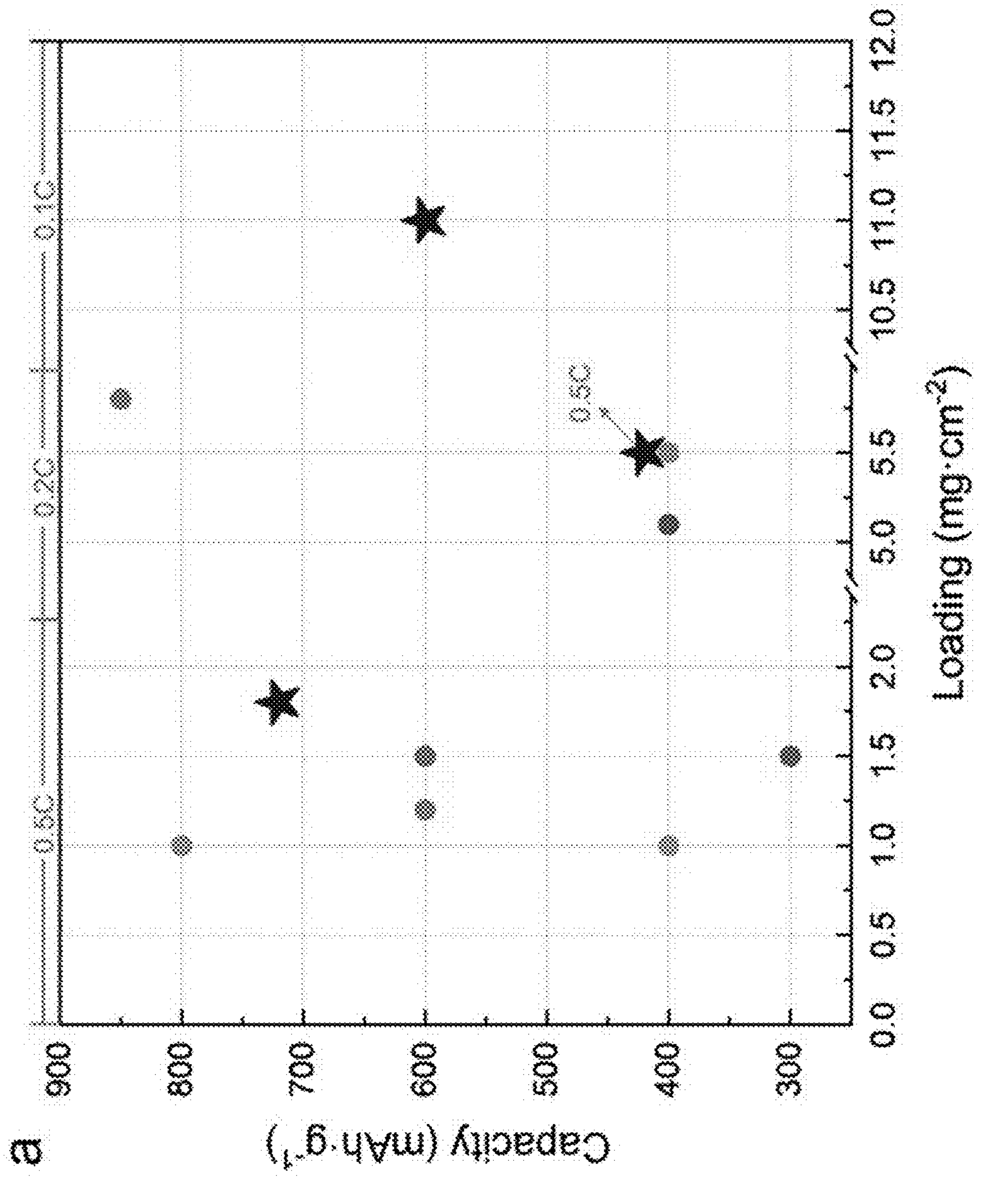
Figure 36:
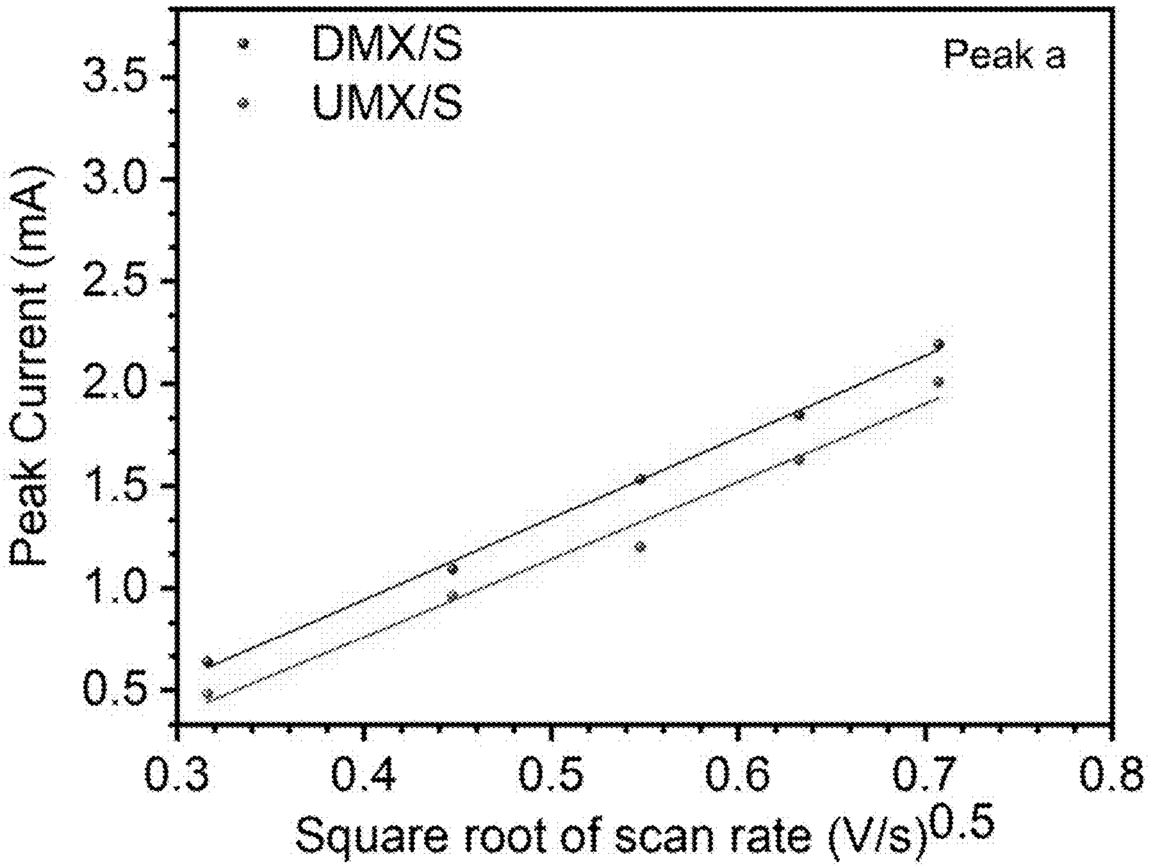

FIG. 33A—First 5 cycles of DHT-MXene/S cathode, FIG. 33B—Charge-discharge curves of DMX/S at various current rates, FIG. 34—Charge-discharge curves of DMX/S at various current rates at 83.33% sulfur loading FIG. 35—Comparison of capacity vs areal sulfur loading characteristics at various current rates of DMX/S with MXene hosts in literature FIG. 36—Relationships between the peak current and scan rate for (Peak a: $S_8 \rightarrow Li_2Sx$) reaction in the DMX/S and UMX/S composites.

Figure 37:
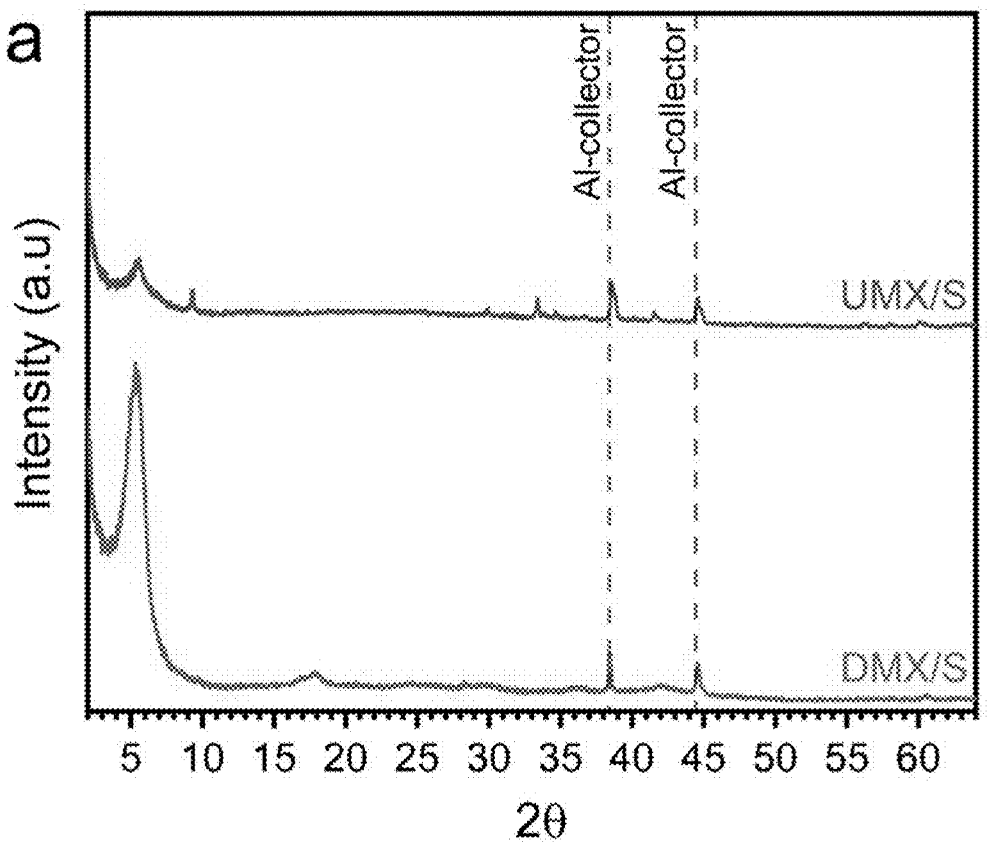

FIG. 37—XRD pattern of cycled UMX/S and DMX/S cathodes

Figure 38:
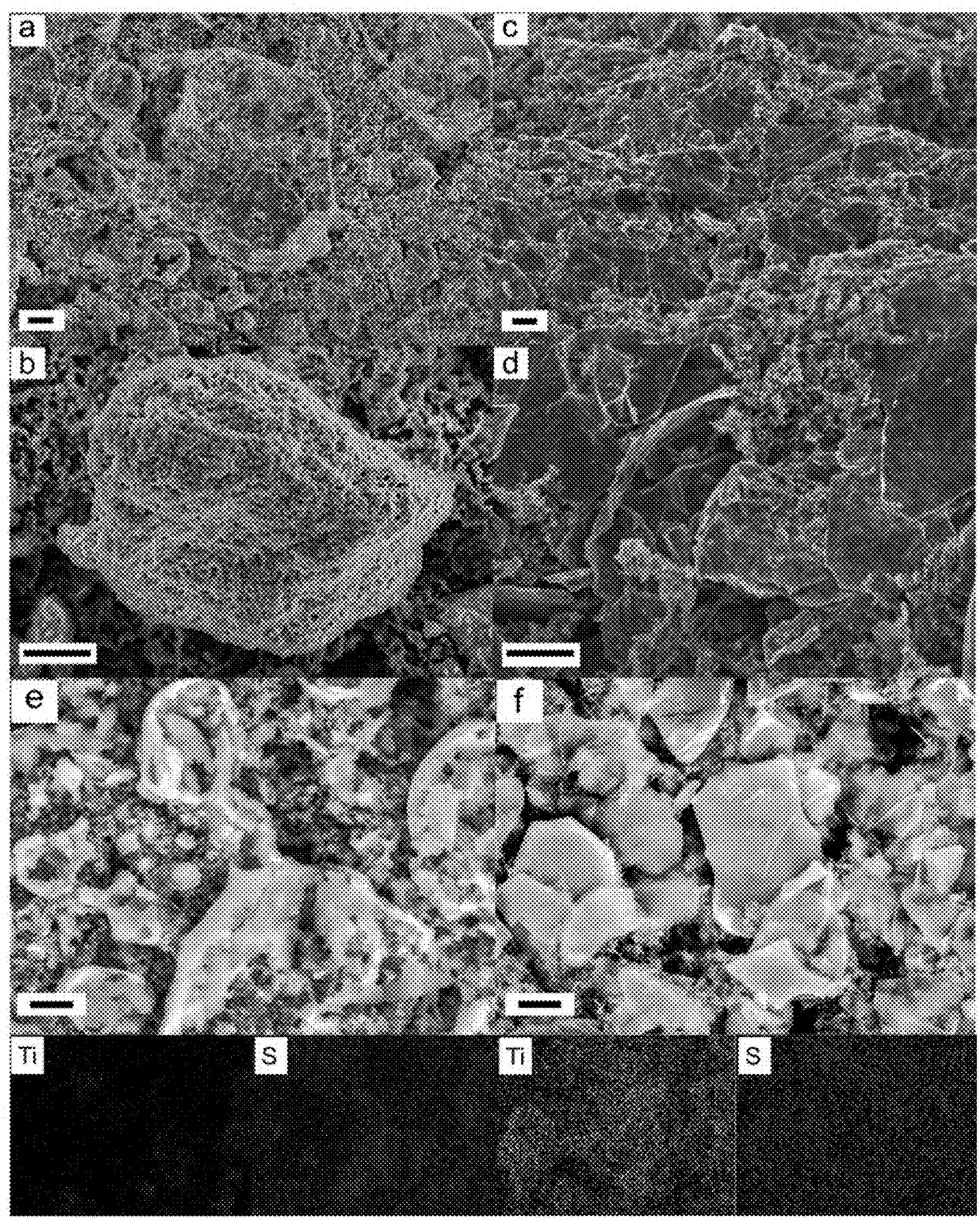

FIGS. 38A-38D—SEM micrographs of cycled cathodes, (FIG. 38A-38B). UMX/S, (FIG. 38C-38D). DMX/S, EDS images, and mapping of cycled cathodes, (FIG. 38E) UMX/S, (FIG. 38F) DMX/S.

FIGS. 39A-39D—Material characterization of DMX/S, (FIGS. 39A-39B) SEM micrographs of DMX/S, (FIG. 39C) XRD pattern of DMX/S, (FIG. 39D) TGA curve of DMX/S in argon.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed technology.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

Preferred and/or optional features of the invention will now be set out. Any aspect of the invention can be combined with any other aspect of the invention unless the context demands otherwise. Any of the preferred and/or optional features of any aspect can be combined, either singly or in combination, with any aspect of the invention unless the context demands otherwise.

MXenes have been previously been described in several publications, and a reference to MXenes in this disclosure contemplates at least all of the compositions described therein:

Compositions comprising free-standing two-dimensional nanocrystal, PCT/US2013/072733;

Two-dimensional, ordered, double transition metals carbides having a nominal unit cell composition M'2 M"nXn+1, PCT/US2016/028354;

Physical Forms of MXene Materials Exhibiting Novel Electrical and Optical Characteristics, US20170294546A1

Additionally, the MXene compositions may comprise any of the compositions described elsewhere herein. Exemplary MXene compositions include those comprising:

(a) at least one layer having first and second surfaces, each layer described by a formula $M_{n+1}X_n \, T_x$ and comprising:

substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal or Mn, wherein each X is C, N, or a combination thereof;

n=1, 2, or 3; and wherein $T_x$ (which can also be represented by $T_z$) represents surface termination groups (note that the subscript x in $T_x$ refers to a number and does not refer to C or N or a combination thereof); or (b) at least one layer having first and second surfaces, each layer comprising:

a substantially two-dimensional array of crystal cells, each crystal cell having an empirical formula of $M'_2M''_nX_{n+1}T_x$, such that each X is positioned within an octahedral array of M' and M'', and where M''n are present as individual two-dimensional array of atoms intercalated between a pair of two-dimensional arrays of M' atoms, wherein M' and M'' are different Group IIIB, IVB, VB, or VIB metals, wherein each X is C, N, or a combination thereof;

n=1 or 2; and wherein $T_x$ represents surface termination groups. In certain of these exemplary embodiments, the at least one of said surfaces of each layer has surface termination groups ($T_x$) comprising alkoxide, carboxylate, halide, hydroxide, hydride, oxide, sub-oxide, nitride, sub-nitride, sulfide, thiol, or a combination thereof. In certain preferred embodiments, the MXene composition has an empirical formula of $Ti_3C_2$.

While the instant disclosure describes the use of certain example MXene materials (e.g., $Ti_3C_2$), because of the convenient ability to prepare larger scale quantities of these materials, it is believed and expected that all other MXenes will perform similarly, and so all such MXene compositions are considered within the scope of this disclosure. In certain embodiments, the MXene composition is any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), PCT/US2016/028,354 (filed Apr. 20, 2016), preferably where the MXene composition comprises titanium and carbon (e.g., $Ti_3C_2$, $Ti_2C$, $Mo_2TiC_2$, etc.), or PCT/US2020/054912 (filed Oct. 9, 2020).

While MXene compositions include any and all of the compositions described in the patent applications and issued patents mentioned elsewhere herein, in some embodiments, MXenes are materials comprising or consisting essentially of a $M_{n+1}X_n(T_s)$ composition having at least one layer, each layer having a first and second surface, each layer comprising a substantially two-dimensional array of crystal cells.

each crystal cell having an empirical formula of $M_{n+1}X_n$, such that each X is positioned within an octahedral array of M, wherein M is at least one Group 3, 4, 5, 6, or 7, wherein each X is C and/or N, and n=4;

wherein at least one of said surfaces of the layers has surface terminations, $T_s$, independently comprising alkoxide, alkyl, carboxylate, halide, hydroxide, hydride, oxide, sub-oxide, nitride, sub-nitride, sulfide, sulfonate, thiol, or a combination thereof;

As described elsewhere within this disclosure, the $M_{n+1}X_n(T_s)$ materials produced in these methods and compositions have at least one layer, and sometimes a plurality of layers, each layer having a first and second surface, each layer comprising a substantially two-dimensional array of crystal cells; each crystal cell having an empirical formula of $M_{n+1}X_n$, such that each X is positioned within an array of M, wherein M is at least one Group 3, 4, 5, 6, or 7 metal (corresponding to Group IIIB, IVB, VB, VIB or VIIB metal), wherein X is C and/or N and n=4; wherein at least one of said surfaces of the layers has surface terminations, $T_s$, comprising alkoxide, alkyl, carboxylate, halide, hydroxide, hydride, oxide, sub-oxide, nitride, sub-nitride, sulfide, sulfonate, thiol, or a combination thereof.

As described elsewhere within this disclosure, the $M_{n+1}X_n(T_s)$ materials produced in these methods and compositions have at least one layer, and sometimes a plurality of layers, each layer having a first and second surface, each layer comprising a substantially two-dimensional array of crystal cells; each crystal cell having an empirical formula of $M_{n+1}X_n$, such that each X is positioned within an array of M, wherein M is at least one Group 3, 4, 5, 6, or 7 metal (corresponding to Group IIIB, IVB, VB, VIB or VIIB metal), wherein X is C and/or N and n=4; wherein at least one of said surfaces of the layers has surface terminations, $T_s$, comprising alkoxide, alkyl, carboxylate, halide, hydroxide, hydride, oxide, sub-oxide, nitride, sub-nitride, sulfide, sulfonate, thiol, or a combination thereof.

Supplementing the descriptions above, $M_{n+1}X_n(T_s)$, compositions may be viewed as comprising free standing and stacked assemblies of two dimensional crystalline solids. Collectively, such compositions are referred to herein as "$M_{n+1}X_n(T_s)$," "MXene," "MXene compositions," or "MXene materials." Additionally, these terms "$M_{n+1}X_n(T_s)$," "MXene," "MXene compositions," or "MXene materials" also refer to those compositions derived by the chemical exfoliation of MAX phase materials, whether these compositions are present as free-standing 2-dimensional or stacked assemblies (as described further below). Reference to the carbide equivalent to these terms reflects the fact that X is carbon, C, in the lattice. Such compositions comprise at least one layer having first and second surfaces, each layer comprising: a substantially two-dimensional array of crystal cells; each crystal cell having an empirical formula of $M_{n+1}X_n$, where M, X, and n are defined above. These compositions may be comprised of individual or a plurality of such layers. In some embodiments, the $M_{n+1}X_n(T_s)$ MXenes comprising stacked assemblies may be capable of, or have atoms, ions, or molecules, that are intercalated between at least some of the layers. In other embodiments, these atoms or ions are lithium. In still other embodiments, these structures are part of an energy-storing device, such as a battery or supercapacitor. In still other embodiments these structures are added to polymers to make polymer composites.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein, "a substantially two-dimensional array of crystal cells" refers to an array which preferably includes a lateral (in x-y dimension) array of crystals having a thickness of a single cell, such that the top and bottom surfaces of the array are available for chemical modification.

Metals of Group 3, 4, 5, 6, or 7 (corresponding to Group IIIB, IVB, VB, VIB, or VIIB), either alone or in combination, said members including, e.g., Ti, Zr, Hf, V, Nb, Ta, Cr, Mo, and W. For the purposes of this disclosure, the terms "M", or "M'", or "M"", or "M atoms," "M elements," or "M metals" may also include Mn. Also, for purposes of this disclosure, compositions where M comprises Ti, Zr, Hf, V, Nb, Ta, Cr, Mo, W, or mixtures thereof constitute independent embodiments. Similarly, the oxides of M may comprise any one or more of these materials as separate embodiments. For example, M may comprise any one or combination of Hf, Cr, Mn, Mo, Nb, Sc, Ta, Ti, V, W, or Zr. In other preferred embodiments, the transition metal is one or more of Ti, Zr, V, Cr, Mo, Nb, Ta, or a combination thereof. In even more preferred embodiments, the transition metal is Ti, Ta, Mo, Nb, V, Cr, or a combination thereof.

The range of compositions available can be seen as extending even further when one considers that each M-atom position within the overall $M_{n+1}X_n$ matrix can be represented by more than one element. That is, one or more type of M-atom can occupy each M-position within the respective matrices. In certain exemplary non-limiting examples, these can be $(M'_a M''_b)X_4$, where M' and M" are different metals (e.g., members of the same group), and a+b=5; or $(M'_a M''_b)_5X_4T_x$, where M' and M" are different metals (e.g., members of the same group), and a+b=1. As some non-limiting examples, such a composition can be $(V_{1/2}Nb_{1/2})_5C_4$ or $(V_{1/3}Nb_{2/3})_5N_4$.

In the same way, one or more type of X-atom can occupy each X-position within the matrices, for example solid solutions of the formulae $M_5(C_jN_k)_4$ (where j+k=1); $(M'_a M''_b)(C_jN_k)_4$ (where a+b=5 and j+k=1); and $(M'_a M''_b)_5(C_jN_k)_4$ (where a+b=1 and j+k=1).

Each of these compositions is considered an independent embodiment. Similarly, MXene carbides, nitrides, and carbonitrides are also considered independent embodiments. Various MXene compositions are described elsewhere herein, and these and other compositions, including coatings, stacks, laminates, molded forms, and other structures, described in the above-mentioned references are all considered within the scope of the present disclosure.

Where the MXene material is present as a coating on a conductive or non-conductive substrate, that MXene coating may cover some or all of the underlying substrate material. Such substrates may be virtually any conducting or non-conducting material, though preferably the MXene coating is superposed on a non-conductive surface. Such non-conductive surfaces or bodies may comprise virtually any non-electrically conducting organic polymer, inorganic material (e.g., glass or silicon). Since MXene can be produced as a free-standing film, or applied to any shaped surface, in principle the MXene can be applied to almost any substrate material, depending on the intended application, with little dependence on morphology and roughness. In independent embodiments, the substrate may be a non-porous, porous, microporous, or aerogel form of an organic polymer, for example, a fluorinated or perfluorinated polymer (e.g., PVDF, PTFE) or an alginate polymer, a silicate glass, silicon, GaAs, or other low-K dielectric, an inorganic carbide (e.g., SiC) or nitride ($Al_3N_4$) or other thermally conductive inorganic material wherein the choice of substrate depends on the intended application. Depending on the nature of the application, low-k dielectrics or high thermal conductivity substrates may be used.

In some embodiments, the substrate is rigid (e.g., on a silicon wafer). In other embodiments, substrate is flexible (e.g., on a flexible polymer sheet). Substrate surfaces may be organic, inorganic, or metallic, and comprise metals (Ag, Au, Cu, Pd, Pt) or metalloids; conductive or non-conductive metal oxides (e.g., $SiO_2$, ITO), nitrides, or carbides; semiconductors (e.g., Si, GaAs, InP); glasses, including silica or boron-based glasses; or organic polymers.

The coating may be patterned or unpatterned on the substrate. In independent embodiments, the coatings may be applied or result from the application by spin coating, dip coating, roller coating, compression molding, doctor blading, ink printing, painting or other such methods. Multiple coatings of the same or different MXene compositions may be employed.

Flat surface or surface-patterned substrates can be used. The MXene coatings may also be applied to surfaces having patterned metallic conductors or wires. Additionally, by combining these techniques, it is possible to develop patterned MXene layers by applying a MXene coating to a photoresist layer, either a positive or negative photoresist, photopolymerize the photoresist layer, and develop the photopolymerized photoresist layer. During the developing stage, the portion of the MXene coating adhered to the removable portion of the developed photoresist is removed. Alternatively, or additionally, the MXene coating may be applied first, followed by application, processing, and development of a photoresist layer. By selectively converting the exposed portion of the MXene layer to an oxide using nitric acid, a MXene pattern may be developed. In short, these MXene materials may be used in conjunction with any appropriate series of processing steps associated with thick or thin film processing to produce any of the structures or devices described herein (including, e.g., plasmonic nanostructures).

The methods described in PCT/US2015/051588 (filed Sep. 23, 2015), incorporated by reference herein at least for such teachings, are suitable for such applications.

In independent embodiments, the MXene coating can be present and is operable, in virtually any thickness, from the nanometer scale to hundreds of microns. Within this range, in some embodiments, the MXene may be present at a thickness ranging from 1-2 nm to 1000 microns, or in a range defined by one or more of the ranges of from 1-2 nm to 25 nm, from 25 nm to 50 nm, from 50 nm to 100 nm, from 100 nm to 150 nm, from 150 nm to 200 nm, from 200 nm to 250 nm, from 250 nm to 500 nm, from 500 nm to 1000 nm, from 1000 nm to 1500 nm, from 1500 nm to 2500 nm, from 2500 nm to 5000 nm, from 5 μm to 100 μm, from 100 μm to 500 μm, or from 500 μm to 1000 μm.

Typically, in such coatings, the MXene is present as an overlapping array of two or more overlapping layers of MXene platelets oriented to be essentially coplanar with the substrate surface. In specific embodiments, the MXene platelets have at least one mean lateral dimension in a range of from about 0.1 micron to about 50 microns, or in a range defined by one or more of the ranges of from 0.1 to 2 microns, from 2 microns to 4 microns, from 4 microns to 6 microns, from 6 microns to 8 microns, from 8 microns to 10 microns, from 10 microns to 20 microns, from 20 microns to 30 microns, from 30 microns to 40 microns, or from 40 microns to 50 microns.

Again, the substrate may also be present such that its body is a molded or formed body comprising the MXene composition. While such compositions may comprise any of the MXene compositions described herein, exemplary methods of making such structures are described in PCT/US2015/051588 (filed Sep. 23, 2015) and PCT/US2020/054912 (filed Oct. 9, 2020), which are incorporated by reference herein at least for such teachings.

To this point, the disclosure(s) have been described in terms of the methods and derived coatings or compositions themselves, the disclosure also contemplates that devices incorporating or comprising these thin films are considered within the scope of the present disclosure(s). Additionally, any of the devices or applications described or discussed elsewhere herein are considered within the scope of the present disclosure(s)

Among two-dimensional, 2D, materials, MXenes have garnered significant interest lately due to their unique combination of properties, particularly hydrophilicity and conductivity. The name MXene arises as they are derived from MAX phases, and their 2D nature and conductivity liken them to graphene. Unlike graphene, MXenes offer a greater range of chemical compositions, and to date over 30 different MXenes have been synthesized.[1] MXenes have found use in research fields including electronics, composites, energy storage and catalysis.[1] However many practical challenges associated with their synthesis, handling, and storage remain. For example, their hydrophilicity limits their use in a broader chemical sense, as only polar solvents such as water, ethanol, dimethylsulfoxide, DMSO, dimethylformamide, DMF and others are suitable. And indeed, to date, for the most part, only water and other polar solvents have been used.[2] Additionally, MXenes are susceptible to oxidation, limiting their ability to be stored for any meaningful amounts of time, especially in aqueous suspensions. However, this is an ongoing field of research and recent breakthroughs have allowed for long term stability in aqueous media.[3,4]

MXenes, for the most part, come in two main physical forms, multilayer (ML) powders or colloidal suspensions comprised of single to few flakes. The latter are typically obtained by sonicating the former in solution and subsequently separating the colloidal supernatant, containing the single to few flakes from the ML sediment by centrifugation. This results in a dark suspension with MXene concentrations anywhere between 1-20 $g\ L^{-1}$.[1] To date most, if not all, of this work has been carried out in polar solvents including water.

However, many chemical processing techniques such as liquid-liquid extractions, polymerization reactions, reagent or product purification, as well as storage and handling require the use of nonpolar solvents. For example, the stability of graphene and graphene oxide in non-polar solvents has also been extensively studied, namely by the reduction of graphene oxide[5], selective use of solvent[6], alkyl functionalization,[7-9] or through a combination of these techniques. Given the unique properties of MXenes, that combine those of layered silicate clays and graphene, viz. conductive and hydrophilic, they may also find use in these fields if they can be dispersed in nonpolar solvents. Lim et al. were able to form suspensions of silanized $Ti_3C_2T_z$ in n-hexane, however this method required the use of very high molecular weight emulsifying agents like poly(2-acrylamido-2-methyl-1-propanesulfonic acid) (MW: 800,000 $g\cdot mol^{-1}$) in addition to the surface agent octyltriethoxysilane, so the final alkylsilane mass content was 45.1 wt. %. This process utilized already sonicated and delaminated $Ti_3C_2T_z$ colloidal suspensions, elevated temperatures, use of ammonia, and several sonication steps.[10]

Over the past 5 years, it has been shown that MXenes and clays share many commonalities.[11-15] Like clays, MXenes form stable aqueous colloidal suspensions around neutral pH[16] and can contain exchangeable cation which can expand the interlayer space upon their introduction. The interlayer space also can contain water, and the spacing of these layers is a function of humidity.[14,16-18] This disclosure provides MXene multilayer (ML) clay which can be produced in a much larger scale than delaminated, colloidal suspensions.

Layered silicates such as montmorillonite, kaolinite, or mica do not readily disperse in nonpolar solvents. However, when the clay layers are intercalated by n-alkyl ammonium cations they disperse readily and remain stable. Such suspensions have been found to be rather useful in many practical applications such as oil-based drilling fluids, lubricating greases, inks and paints where the clay acts as a rheological control agent.[19] Unlike clays, however, the charges in MXene are due to the average oxidation states of the transition metal and X element, whereas charges in clays are due to the substitution of Si by aliovalent cations, typically Al.[20]

With regards to the use of MXenes in polymer based composites, we have shown that the cations present in-between MXene sheets can be exchanged with organic ions such as 12-aminolauric acid (ALA) or di(hydrogenated tallow)benzyl methyl ammonium chloride (DHT), in order to disperse $Ti_3C_2T_z$ MLs in nylon-6[21] and epoxy matrices.[22]

This disclosure provides a simple strategy to disperse and stabilize $Ti_3C_2T_z$ flakes in nonpolar solvents. Without being bound to any particular theory, one can replace the cations present between the MXene MLs after the etching/washing steps with DHT, a common, inexpensive, and industrially relevant quaternary alkyl ammonium surfactant.

Results and Discussion

Figure 2:
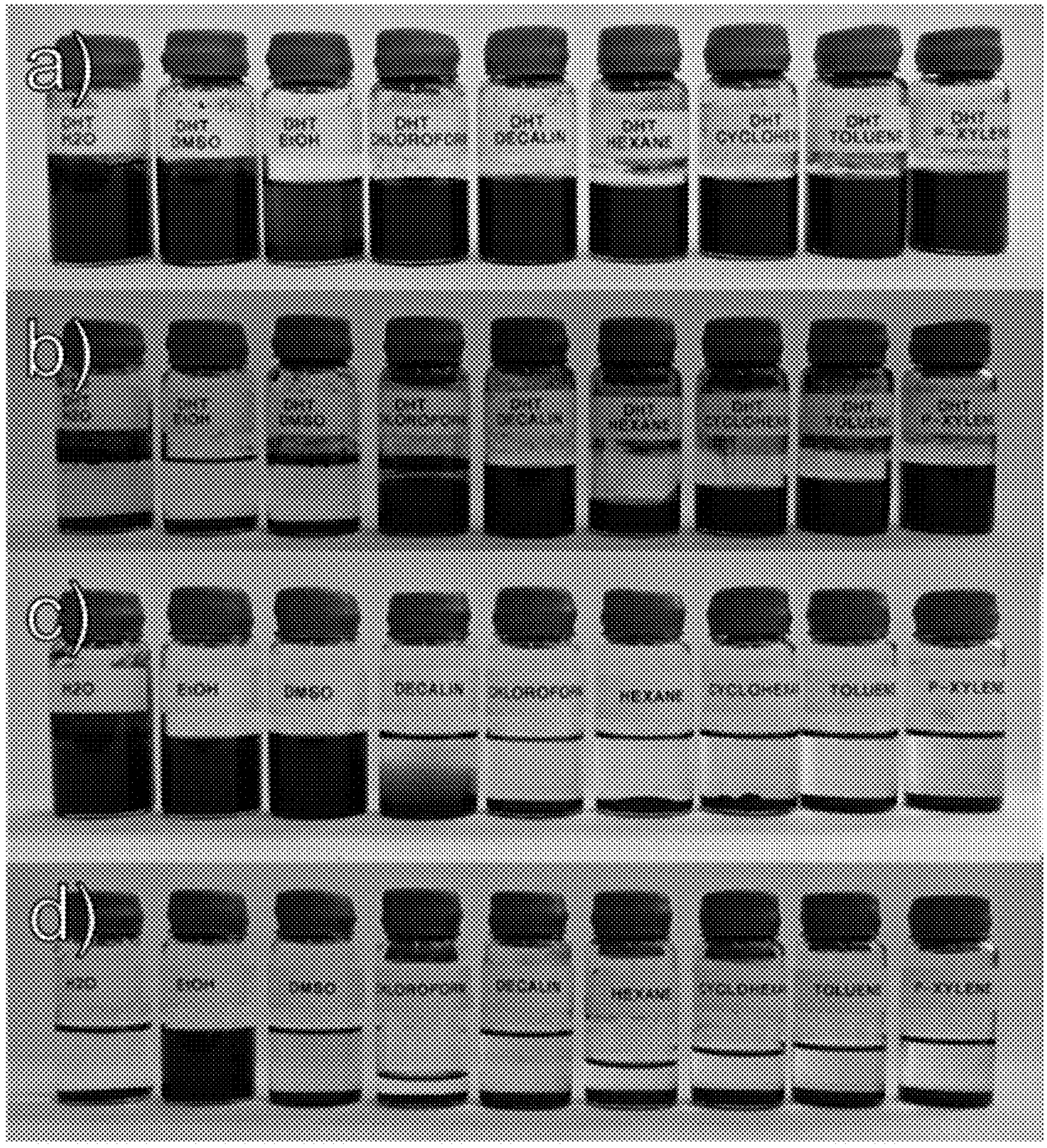

The details of synthesizing DHT modified $Ti_3C_2T_z$ and their subsequent dispersion in de-ionized (DI) water, ethanol, DMSO, decahydronaphthalene (decalin), chloroform, hexane, cyclohexane, toluene and p-xylene can be found in the experimental section and are illustrated in FIG. 1. In short, $Li^+$ ions present in the ML intergallery space are ion exchanged with DHT. The resulting MLs are then readily dispersible in nonpolar solvents. Once dispersed, the suspensions were monitored over the course of 10 d. The MLs treated with DHT not only dispersed readily in the aforementioned nonpolar solvents but these suspensions were stable for at least 10 d (FIG. 2). Not surprisingly, the non-treated MLs, on the other hand, were only dispersible in polar solvents (FIG. 2C, 2D)

After several hours, the suspension containing the untreated MXene in DI water and DMSO became more transparent, indicating that some settling had begun, which continued until the suspension was completely transparent less than 12 h later. In that respect the fact that DHT-MXene suspensions in the nonpolar solvents are stable even after 10 d is noteworthy. In one case, MLs were dispersed in a water/decalin solution and shaken before allowing the system to rest. After a few rest minutes, the MLs were found exclusively in the decalin that floated over the water (inset FIG. 6). This configuration remained stable for more than 31 d. It follows that the dispersion of DHT-treated $Ti_3C_2T_z$ MLs in at least decalin is highly stable. Dynamic light scattering results indicate that the average MXene particle size is between 180-395 nm (FIG. 10). This stability is attributed to the organophilic nature of DHT-$Ti_3C_2T_z$, as the long alkyl chains of DHT enhance the chemical compatibility in these solvents.

After this time, suspensions were isolated via centrifugation at 3500 rpm (2301 rcf) for 1 min and vacuum filtered to obtain filtered films (FF). XRD patterns of these films (FIG. 3A) are compared to pristine as-synthesized MXene, DHT-MX and FF after dispersing in chloroform, decalin, hexane, cyclohexane, toluene and p-xylene. We also obtained the XRD patterns of the sediments after centrifugation (FIG. 11) and after drying the FF in vacuum at 200° C. for 24 h (FIG. 12). All basal spacings are listed in Table 1 and plotted in FIG. 2B. From these results the following is salient:

After the HF/LiCl etching step, the basal spacing, d, is 14.6 Å (FIG. 3A). Replacing the Li+ with DHT increases d to 36.7 Å (FIG. 3B), which agrees with the basal spacings of n-alkylammonium treated nanoclays.[23]

The d-spacings of the sediments depend on solvent (red columns in FIG. 2*b*). For chloroform and hexane, d drops, for cyclohexane it stays the same and for decalin, toluene and p-xylene the d-spacings expand to over 50 Å.

The d-spacings of the FF (green columns in FIG. 3*b*) are all less than those of the sediments. In some cases, the drops are quite large. For example for decalin, the spacing drops from >50° to <30 Å. This drop is due to evaporation of the solvent.

Not surprisingly, drying the FF at 200° C. for 24 h reduces the d-spacings (blue columns in FIG. 3*b*) to their minimal values that hover between 19 to 27 Å. This decrease is also attributable to further evaporation of the solvents.

SEM micrographs of DHT-MX/cyclohexane drop-cast on porous alumina substrates confirm that at least some of these flakes are comprised of a few layers (FIG. 4). This colloidal nature is evidenced by the Tyndall effect observed in the DHT-MXene/cyclohexane suspension (inset FIG. 4). SEM micrographs for other solvents can be found in FIG. 13.

A typical TEM micrograph of an aliquot of the DHT-MXene/cyclohexane suspension, drop-cast on a TEM grid (FIG. 5) clearly shows that the suspension contains few-flake MXenes which retain the hexagonal crystal structure of their parent MAX phase $Ti_3AlC_2$ as evidenced by the selected area diffraction of the MXene flake (inset FIG. 5), and show no signs of oxidation, despite being in suspension for over 10 d. TEM micrographs for other solvents can be found in FIG. 14.

The room temperature 4-point DC conductivities, 6, of the FF before and after drying in vacuum at 200° C. for 24 h are listed in Table 1. When these values are plotted on a semi-log plot vs. d-spacing (FIG. 6), one can conclude that 6: i) is a strong function of d-spacing before annealing and less so after annealing. ii) is function of what is between the layers; iii) greatly enhanced by a mild heating in a mechanical vacuum at 200° C. for 24 h (blue squares in FIG. 5). Also plotted in FIG. 6 are previous results (green squares) on $Mo_2CT_z$ filtered films.[24] A least squares fit of all these results (excluding the annealed films) yields the following relationship:

$$\log_{10}\sigma(S/m)=6.5\text{-}0.25\cdot d_{002}(\text{Å}),R^2=0.78 \quad (1)$$

Fitting the Log Plot Yields:

$$\sigma(S/m)=3.2\times10^6\cdot\exp^{-0.6\cdot d}{}_{002} \quad (2)$$

This exponential dependence on d has been observed before in $Mo_2CT_z$ FF and clearly implicates inter-particle transport as being rate limiting.

Upon drying, the response (blue squares in FIG. 2*b* becomes a much weaker function of d-spacing suggesting that percolation paths develop between the flakes. This is not surprising since it is reasonable to assume that upon drying the d-spacings are no longer uniform.

The concentration of MXene in these suspensions was measured by vacuum filtration. A plot of concentration as a function of the Hildebrand solubility parameter (d) of the respective solvents is shown in FIG. 7. The Hildebrand solubility parameter is defined as the square root of the cohesive energy density, and can also be described by the square root of the sum of squares of the dispersive, hydrogen bonding and polar Hansen solubility parameters, $d_D$, $d_H$, and $d_P$ as $$\delta=\sqrt{\frac{\Delta H_v-RT}{V_m}}=\sqrt{\delta_D^2+\delta_H^2+\delta_P^2} \quad (3)$$

where $DH_v$, R and T, $V_m$ are the heat of vaporization, gas law constant, temperature and molar volume of the condensed phase, respectively.

A Gaussian trend (FIG. 7) can be established, with p-xylene yielding the highest concentration, suggesting that DHT-$Ti_3C_2T_z$ is most stable in solvents with a d of ~18 $MPa^{1/2}$, as opposed to the ~27 $MPa^{1/2}$ that is optimal for untreated $Ti_3C_2T_z$ in polar solvents.[2] Interestingly, carbon nanotubes are most stable in solvents with d~23 $MPa^{1/2}$, which reduces to ~19.5 $MPa^{1/2}$ upon functionalization of these nanotubes with octadecylamine.[25]

Comparison of ATR-FTIR spectra of solvents and DHT-MX suspensions indicate that all functional groups and vibrations of the respective solvent remain, however, slight redshifts suggest weak interactions between DHT-MX and the solvents (FIG. 15).

In order to demonstrate an application of this technique, we fabricated MXene linear low-density polyethylene, LLDPE, nanocomposites (NCs) by solution processing in p-xylene. Three batches were produced: neat LLDPE, one containing 1.12 vol. % untreated $Ti_3C_2T_z$ and another with 1.12 vol. % DHT-$Ti_3C_2T_z$.

Representative stress strain curves are shown in FIG. 8, with maximum curves shown. Full plot is shown in FIG. 16. Injection moulded NC samples with 1.12 vol. % DHT-$Ti_3C_2T_z$ were found to have an 11% increase in tensile modulus and 32% increase in maximum tensile strength. The untreated MLs specimens had a 2% decrease in tensile modulus and 9.2% increase in maximum tensile strength.

Thermogravimetric analysis revealed that the DHT content in DHT-$Ti_3C_2T_z$ powders was around 25 wt. %, after adjusting for residual water content. Additionally, both treated and untreated MXene containing samples were found to have the same final MXene load and increased thermal stability (FIG. 17), where the degradation temperature (taken as the temperature at which the derivative of weight loss with respect to temperature is maximized) was increased from 464.5° C. in neat LLDPE to 477.2° C. and 478.4° C. in untreated and treated specimens, respectively (FIG. 18). Digital photographs of composite pellets can be found in FIG. 19.

Figure 20:
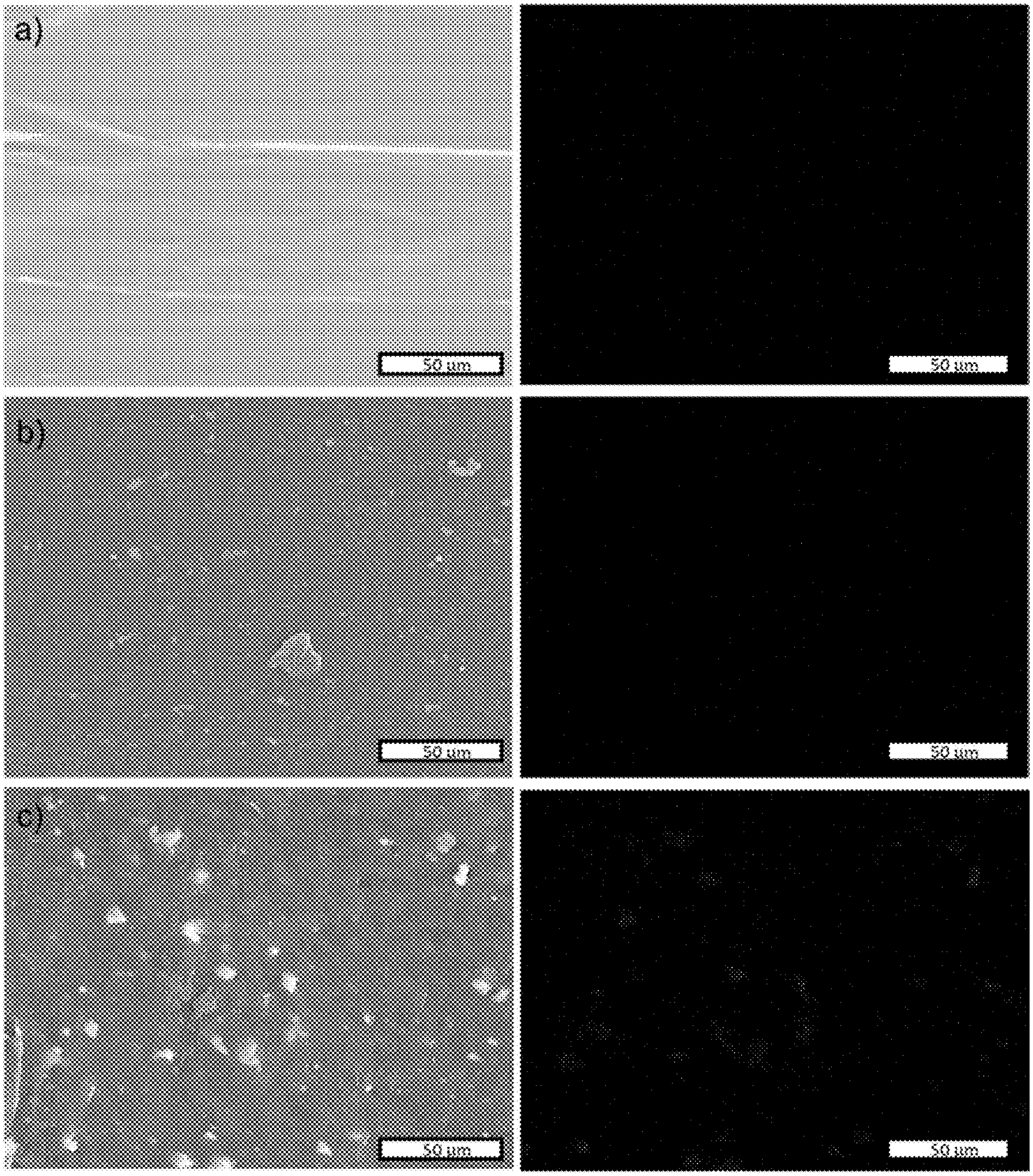

Melt rheology was used to further probe the effects of DHT treatment on the MXene-LLDPE nanocomposites. The master curves of storage (G') and loss (G") moduli as well as complex (measured in oscillatory shear) viscosity as shown in FIG. 9*a-b* as a function of angular frequency at a reference temperature of 200° C. For the untreated MXene, the response is nearly identical to the neat LLDPE. This is expected as the low volume fraction of particles has very little contribution to stress in the aggregated (low aspect ratio) state. However, the DHT treated MXene-LLDPE melt shows a noticeably increased magnitude of G', G", and complex viscosity at low frequencies and equivalent magnitudes at high frequencies. This indicates a slowed chain reptation for DHT-MXene-LLDPE melts. This likely arises from one or more of the following mechanisms: decrease of the characteristic length scale of particles which hinder reptation or increased particle-polymer contacts or DHT-polymer interaction at or near the MXene surfaces.[26] This occurs without the typical indication of percolation (0.1 vol %)[27], which may indicate DHT inhibits percolation, possibly due to repulsive forces between the alkyl chains as seen with other grafted nanoparticles.[26] Dispersion of DHT-MXene in LLDPE is supported by the lack of signature Ti $K_\alpha$ EDS signal of DHT-$Ti_3C_2T_z$ containing LLDPE specimens (FIG. 20)

The present disclosure advances the field of MXene research. The first generation of $Ti_3C_2T_z$ that was HF etched, was only dispersible after intercalating the MLs with DMSO or TBAOH.[28,29] The second breakthrough occurred when we showed that if the etching solution is LiF/HCl instead of HF, then it was possible to disperse MXenes in water without any other additives.[11] Given the stability in water, it was not long before it was discovered that $Ti_3C_2T_z$ was dispersible and stable in other polar solvents.[2] What has to date been lacking, however, was a facile, scalable, rapid and inexpensive method to disperse $Ti_3C_2T_z$ in nonpolar solvents, which is provided herein.

Conclusions

Multilayers (MLs) of $Ti_3C_2T_z$ were dispersed and stabilized in nonpolar solvents, namely chloroform, decalin, hexane, cyclohexane, toluene and p-xylene by first cation-exchanging with di(hydrogenated tallow)benzyl methyl ammonium chloride, DHT, a low-cost, long shelf life quaternary alkylammonium surfactant. The organophilic $Ti_3C_2T_z$ suspensions were stable in these solvents for at least 10 d. A solution of DHT-$Ti_3C_2T_z$ in decalin over deionized water was stable for up to 31 d. Not only were the suspensions stable, but they also appeared to be shielded from oxidation.

Analysis by SEM, TEM, XRD and ATR-FTIR reveal that the nature of $Ti_3C_2T_z$ is preserved, and this method can allow for the use of MXene in applications where nonpolar solvents are required or preferred. As an example, this method was utilized to make solution processed linear low density polyethylene nanocomposites, starting with MXene multilayers. It was found that mechanical reinforcement of the host LLDPE loaded with only 1.12 vol. % DHT functionalized $Ti_3C_2T_z$ resulted in an 11% increase in elastic moduli and 32% increase in the maximum tensile strength. For untreated MXene composites, a 2% decrease in moduli and 9.2% increase in maximum tensile strength were observed. Additionally, the rheological properties of LLDPE were significantly modified by the presence of DHT-$Ti_3C_2T_z$ at low filler volume fraction.

Additional Disclosure—Energy Storage

The following disclosure pertains to a further aspect of the present disclosure, which further aspect can be used for energy storage applications.

MXenes are a class of two-dimensional (2D) carbides and/or nitrides discovered in 2011 by Naguib et al.[13] These 2D materials are so-called because they are derived by selectively etching A (group 13 or 14 elements) from the parent MAX phase in aqueous acid and organic solvents[14].

MXenes have a general formula $M_{n+1}X_nT_z$, where M stands for an early transition metal, X stands for C or N and $T_z$ stands for chemical terminations such as —O, —OH, and —F surface groups that replace the Al atoms upon etching[15]. $Ti_3C_2T_z$ MXene obtained by etching $Ti_3AlC_2$ has shown unique properties such as high metallic conductivity (>5000 $S\cdot cm^{-1}$), chemical durability, and are environmentally friendly[16]. Furthermore, the developed MXene can be tuned with various surface functional groups as required for its applications adding to its versatility[17, 18]. (Exemplary MXene compositions are also described in, e.g., PCT/US2012/043273, U.S. 62/913,866, and PCT/US2020/054912, which are incorporated herein in their entireties for any and all purposes.)

This unique surface environment with tunable functional groups renders MXene surfaces sensitive to LiPs. Nazar and co-workers have shown that the LiPs bind to MXene host surfaces via Lewis-acid base interaction[19]. Besides, the terminal groups form a thiosulfate/polythionate complex providing better entrapment of LiPs and enabling improved electrochemical performance[20]. Incorporating MXenes as host material has shown to significantly enhance the charge storage capacity in Li—S batteries. For example, Liang et al. demonstrated the use of MXene/S composite with a high initial capacity of ~1200 $mAh\cdot g^{-1}$ at ~1.5 $mg\cdot cm^{-2}$ S loading [20]. Also, Bao et al. showed $Ti_3C_2T_x$/S delivered a capacity of ~1000 $mAh\cdot g^{-1}$ with a 1.5 $mg\cdot cm^{-2}$ S loading[21]. However, this performance dropped to ~400 $mAh\cdot g^{-1}$ within 200 cycles. This low capacity was attributed to a lack of porosity due to intrinsic sheet-like morphology.

To increase capacity retention over cycling, Wang and co-workers used a facile strategy to develop crumpled nitrogen-doped MXenes to improve the porosity of the MXene sheets enabling a capacity of 900 $mAh\cdot g^{-1}$ at 0.2 C for 200 cycles[21]. Similarly, Song et al. developed porous MXene·rGO aerogels facilitating better ion transport channels with efficient LiPs adsorption resulting in cycling stability of 500 cycles with a deliverable capacity of 600 $mAh\cdot g^{-1}$[22, 23]. Interestingly, employing MXene sheets alone yields in low electrochemical performance with the S loadings of ~1 mg[21, 23, 24]. The better electrochemical performance was observed with the crumpling of MXene nanosheets, composite aerogel, and nanodot formation. Such architecture resulted in better ionic transport and a higher accessible surface area. However, the performance impeded with improvement in sulfur loading. For example, Wang and co-workers developed rGO MXene aerogel composites delivering cycling stability for 500 cycles at low S loadings and 30 cycles with ~6 $mg\cdot cm^{-2}$ S loading[22]. Similarly, Xiao et al. developed MXene nanodots which demonstrated cycling stability of 400 cycles at low loadings. Increasing the loading to 9.2 $mg\cdot cm^{-2}$ resulted in stability for only 100 cycles[25]. This reduction in capacity retention can be attributed to lower exposure of active surface terminations and under-utilization of the conductive MXene sheet surface itself. In addition, the development of such morphology/surface architecture is a multi-step process involving time-consuming high temperature and pressure treatments.

During the fabrication of S electrodes, a common strategy employed is slurry mixing[21, 24, 25]. However, since the MXenes surfaces are hydrophilic (—O/—OH terminations) and S is hydrophobic, the former tends to re-stack without S depositing on their surfaces. As a result, the overall usable area is reduced, rendering most of the MXene surface area and functional groups redundant for S binding and re-deposition. Due to which during the charge-discharge process only the exterior surface of re-stacked MXene sheets might contribute towards LiPs binding reducing the deliverable capacity in every cycle. Furthermore, most of the previous work employed a heat melt diffusion strategy at ~150-160° C. usually for 12 h for temperature-sensitive oxidation-prone MXene surfaces[21, 24]. Therefore, the ideal host structure model of MXene-S host cathodes should involve the dispersion of single-layered MXene nanosheets in an S-saturated environment. This architecture can provide efficient diffusion of S within the sheets without temperature treatment, improving the effective utilization of surface groups to bind LiPs in the final cathode.

Herein, for the first time, is provided a design strategy for employing MXenes as host materials in, e.g., uLi-S batteries. The MXene nanosheets were first surface engineered allowing them to be dispersed in non-polar solvents using an inexpensive and industrially relevant di(hydrogenated tallow)benzyl methyl ammonium chloride (DHT) surfactant molecule as previously shown by Carey et all[18]. These DHT treated MXene nanosheets, henceforth referred to as DMX, were in turn easily dispersed into single to few-layer MXenes in carbon-disulfide ($CS_2$) forming a stable colloidal solution. The purpose of this work is to demonstrate a simple single-step strategy for efficient utilization of the MXene sheet surface enabling higher S utilization with improved binding ability boosting cycling performance. Therefore, the developed DMX cathode delivers a high initial capacity of 1220 $mAh \cdot g^{-1}$ at 0.1 C. At a higher rate of 0.5 C, these cathodes stabilize at 880 mAh/g after the first 5 cycles, 85% of which is still retained post 500 cycles. Additionally, to demonstrate practical value, we developed cathodes with high sulfur loading of ~10.7 $mg \cdot cm^{-2}$ that exhibits an initial capacity of ~1000 $mAh \cdot g^{-1}$ and a stable areal capacity of ~7 mAh $cm^{-2}$ for 150 cycles at 0.1 C. For comparison, the highest areal capacity exhibited by state-of-the-art Li-ion battery devices is less than 4 mAh $cm^{-2}$. Furthermore, at a high current rate of 1 C, the cathode delivers an initial capacity of ~720 $mAh \cdot g^{-1}$ and retains around 80% of its capacity after 500 cycles. Additionally, such architecture improved sulfur utilization even at high sulfur loading of 83.33 wt % and demonstrated stable cycling for 300 cycles. Postmortem analysis of cycled cathodes further shows the nature of interactions exhibited between LiPs and MXene nanosheets. Also, ex-situ XRD and SEM analysis demonstrate phase stability and better deposition of the active material.

It should be understood that although the attached results relate to sulfur, the disclosed technology is applicable to chalcogens in general. Accordingly, the disclosed technology should not be understood as limited to sulfur.

Results and Discussion

Material Characterization

A schematic for the preparation of MXene (UMX) from the parent $Ti_3AlC_2$ phase and its subsequent functionalization using DHT is shown in FIG. 21A. The MXene etched using LiF and HCl results in the intercalation of $Li^+$ ions between the MXene layers[26]. When the Li-containing multilayers, MLs, are exposed to DHT they are replaced with DHT molecules via ion exchange[18]. This surface modification procedure results in better colloidal dispersions in non-polar solvents as shown by Carey et al[18]. The DHT-treated MXenes and untreated MXenes will be referred to as DMX and UMX, respectively.

Figure 28:
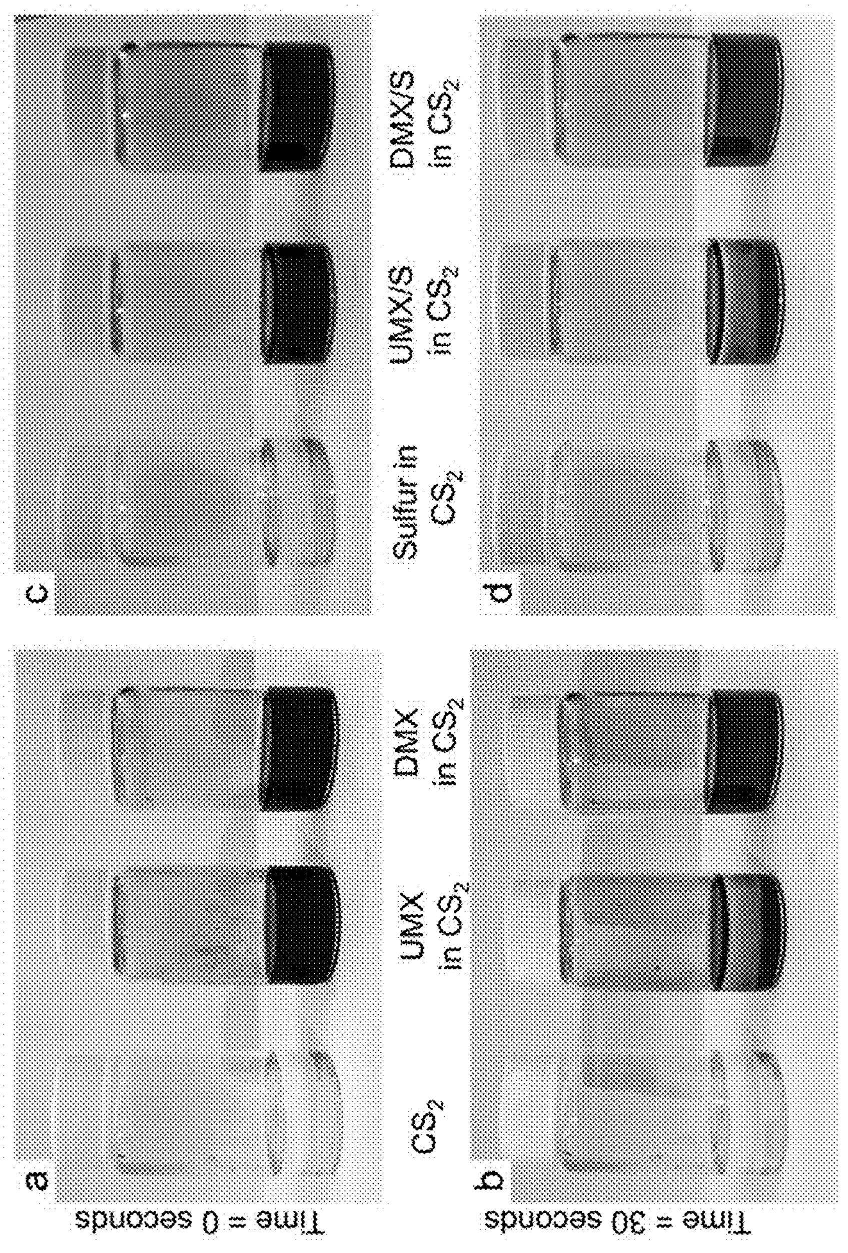

FIG. 28 shows the dispersion stability of untreated and DHT-treated MXenes in an organic solvent, carbon disulfide ($CS_2$). $CS_2$ is chosen as it is known to be a good solvent with high S solubility of at room temperature, RTE[27]. The dispersions were made by probe sonicating both MXenes in $CS_2$ for 15 mins under an ice bath. The colloidal suspensions were then allowed to sit and monitored. The UMX sheets started to settle down within 30 s as evidenced by the $CS_2$ starting to become transparent and clear. Meanwhile, the DHT-MXene suspension was stable even after 90 d. This stability is attributed to the organophilic nature of DMX, as long alkyl chains of DHT enhance the chemical stability in the non-polar $CS_2$ solvent[15, 18]. To confirm if the addition of S would alter the stability, UMX and DMX flakes were sonicated in saturated S—$CS_2$ solutions (FIG. 28). Here again, the former sheets readily settled while the latter were quite stable. FIG. 21B depicts the fabrication strategy of MXene (UMX and DMX) and sulfur composites. Typically, a known quantity of sulfur and MXene (UMX and DMX) were probe sonicated and the solvent was evaporated and dried using inert gas to yield UMX/S and DMX/S composites.

SEM micrographs of as-synthesized UMX (FIG. 29A-29B) and DMX (FIG. 30C, 30D) powders before sonication in $CS_2$ show that both have a stacked ML structure. Further, SEM micrographs of the UMX/S powders (FIG. 22A-22B) recovered after the evaporation of $CS_2$ display ML morphologies confirming negligible delamination. On the other hand, SEM images of DMX/S powders show single, to few-layer, sheets with clear evidence of delamination (FIG. 22D-22E). To understand sulfur deposition over the DMX, we mapped the S-distribution using EDS. FIGS. 22C, 22F show the EDS maps of UMX/S and DMX/S, respectively. In the UMX/S case, S is found in regions where no elemental Ti was detected. Conversely, in the DMX/S case, the Ti and S maps coincide suggesting a uniform deposition of S onto the surface of the DMX sheets.

To further characterize the dispersion and deposition of S on the MXene surfaces we imaged drop cast and dried suspensions of UMX/S and DMX/S using Transmission Electron Microscopy (TEM). Typical TEM images of UMX/S (FIG. 30A) show only nanosheets with little to negligible S deposition on the surface. It should also be noted that because the UMX MLs do not delaminate in $CS_2$, they are not electron transparent due to which finding areas in the sample with appropriate magnification for imaging is difficult. This was also observed in SEM-EDS mapping on the bulk scale (FIG. 22C).

On the other hand, TEM images (FIG. 31A-31B) of the DMX/S composite confirm the surface deposition of S on mostly single nanosheets. The selected area electron diffraction (SAED) patterns of DMX/S samples confirm the presence of diffuse rings in addition to the hexagonal $Ti_3C_2T_z$ crystal structure. These rings are most probably due to the presence of polycrystalline S. To further confirm S deposition, we carried high-resolution TEM analysis with a Fast Fourier Transform (FFT) filter to analyze the fringe distances. FIG. 31D shows a fringe distance of 0.204 nm corresponding to orthorhombic S, confirming the presence of S on the 2D DMX nanosheets. At this stage, it is reasonable to conclude that we obtained a uniform S deposition onto the MXene sheets upon $CS_2$ evaporation.

X-ray diffraction (XRD) patterns of DMX (Blue), DMX/S (Green), UMX (purple), and UMX/S (Red) are compared in FIG. 32A. The XRD pattern of pure S (black) is also plotted in this figure. The presence of the (002) peak around 6° 2 q, corresponding to an interlayer spacing of 15 Å is evidence for the presence of 2D MXene sheets[15]. Treating them with DHT, increases the d-spacing to 35 Å, confirming the successful exchange of $Li^+$ with DHT molecules[18]. After introducing the S, for both the DMX and UMX samples a second 002 peak at a higher 2 q is observed, implying that some species were leached out of the interlayer space. The reason for this is unknown at this stage and more work needs to be carried out to understand this phenomenon. Overall, the DMX/S and UMX/S composites show the presence of S peaks in addition to the original MXene peaks indicating no reaction between the MXene and S but just physical mixing. No titanium dioxide peaks were observed confirming that the nanolayers are non-oxidized. To quantify the amount of S in the DMX/S composite, TGA measurements were carried out. A single-stage mass loss event in the 120° C. to 250° C. temperature range was observed that is due to S evaporation (FIG. 32B). The content of the S was determined to be ~53 wt %.

Electrochemical

The electrochemical performance evaluation of DMX/S cathodes was examined in coin cell configuration. The redox behavior was first evaluated using cyclic voltammetry and galvanostatic charge-discharge tests. To be able to compare the performances of the various electrodes the electrolyte-to-sulfur ratio ($mL \cdot g^{-1}$) in all coin cells was kept constant at 20. FIG. 23A displays cyclic voltammograms (CV) for DMX/S and UMX/S electrodes in the 1.8-2.6 V (wrt $Li/Li^+$) range at a scan rate of 0.1 mV $s^{-1}$. The CV curves of the former show two sharp and distinct cathodic peaks and one anodic peak. The first cathodic peak at 2.3 V is ascribed to S reduction ($S_8$) to long-chain LiPs, while the second peak is related to a subsequent reduction of LiPs to $Li_2S_2/Li_2S$[28]. FIG. 33A shows the first five cycles of DMX/S, displaying almost no peak shifts after the first anodic cycle, indicating good electrochemical stability and better active material utilization. The peak shifts after the first anodic peak might be attributed to nucleation/reorganization during the redeposition of LiPs back to S. Meanwhile, the CV curves of the UMX/S electrodes display a similar peak pattern, with broader and slightly shifted anodic and cathodic peaks. This can be attributed to an overpotential for the redox reaction to occur, most likely due to poor connectivity of S with the MXene nanosheets. Furthermore, the second cathodic peak has a lower contribution denoting a low nucleating site for the deposition of $Li_2S_2/Li_2S$[34]. The lower conversion characteristics might be attributed to the reduced active surface area of ML UMX compared to delaminated DMX.

Further, galvanostatic charge-discharge tests were carried out at various current rates (1 C=1,675 $mAh \cdot g^{-1}$) for the DMX/S and UMX/S electrodes. Both display typical two discharge plateaus. Consistent with the CV results, FIG. 23B displays a higher voltage plateau at 2.3 V and a lower one at 2.0 V, which we relate to the conversion of S to LiPs and LiPs to $Li_2S_2/Li_2S$, respectively (FIG. 23A). Benefitting from improved S-MXene interaction, DMX/S delivers an initial capacity of ~1300 $mAh \cdot g^{-1}$ compared to ~605 $mAh \cdot g^{-1}$ from UMX/S. The lower initial capacity form UMX/S composite might arise from lower utilization of active materials as seen from the prior CV curves. Also, it is interesting to note that the polarization potential of the DMX/S electrodes has a smaller voltage gap of 0.28 V as compared to 0.31 V of UMX/S (FIG. 33B). Lower polarization potential is beneficial for better utilization of S at higher loadings since it correlates the kinetics of charge transfer with activation energies for LiPs conversion[29]. Hence the lower polarization potential of DMX/S might indicate better electrocatalytic activity that enhances the kinetics during the conversion of LiPs. This behavior is probably associated with the improved local conductivity from delaminated MXene sheets coupled with the use of higher functionally active groups on DMX nanosheet compared to UMX.

To evaluate the long-term stability, DMX/S and UMX/S electrodes were cycled at 0.5 C as shown in FIG. 23C. As noted above, the former delivers a high initial capacity of ~1300 $mAh \cdot g^{-1}$ which stabilizes to ~900 $mAh \cdot g^{-1}$ after the first 5 cycles. This initial drop is associated with the redistribution of S in the electrode during the first few electrochemical cycles. Once the cathode stabilizes, it delivers a high specific capacity of ~860, ~850, ~800, ~780, and ~750 $mAh \cdot g^{-1}$ after 100, 200, 300, 400, and 500 cycles, respectively. Said otherwise, the electrode retains around 750 $mAh \cdot g^{-1}$, accounting for ~85% of its initial stable capacity after 500 cycles with a 0.003% decay rate per cycle. The above results indicate that DMX/S can efficiently utilize active material owing to their improved delaminated structure and possibly bind LiPs effectively thereby enhancing capacity and cycling stability.

Meanwhile, UMX/S electrode delivers an initial capacity of ~605 $mAh \cdot g^{-1}$ which stabilizes to ~350 $mAh \cdot g^{-1}$ after the first 5 cycles and then remains stable at 300 $mAh \cdot g^{-1}$ after 500 cycles. This lower capacity can be attributed to a lower active electrochemical area which is unable to utilize S efficiently during the redox reactions. Furthermore, the formed LiPs are probably repelled by the hydrophilic UMX sheets enhancing the shuttling and reducing the blocking of LiPs. Since the $Ti_3C_2T_z$ sheets are expected to bind to LiPs via polar-polar and Lewis acid-base interactions, the active surface area of DMX/S is significantly larger than UMX/S, possibly due to improved delamination, improving the capacity of the former but keeping cycling stability similar. FIG. 33B shows the discharge capacity of DMX/S electrodes at various current rates. The high capacities of 1380, 1250, 850 and 780 $mAh \cdot g^{-1}$ at 0.05, 0.1, 0.2, 0.5 and 1 C, respectively, were obtained.

High current cycling is one of the key parameters for most batteries, in general, and Li—S batteries, in particular. To evaluate these parameters for the DMX/S electrodes, we performed a galvanostatic charge-discharge test at a relatively high rate of 1 C. At this rate, the electrode initial capacity was ~1100 $mAh \cdot g^{-1}$, which stabilized to 720 $mAh \cdot g^{-1}$ after 5 cycles (FIG. 24A). The electrode delivered ~700, 600, and 450 $mAh \cdot g^{-1}$ after 250, 500, and 1000 cycles, thus retaining ~97, 85, and 62% of its initial capacity, respectively. FIG. 24B shows the rate capability evaluated at various current rates. The successive current increment from 0.1, 0.2, 0.5 and 1 C for 5 cycles delivers a stable capacity of ~1000, ~850, ~780, and ~700 $mAh \cdot g^{-1}$, respectively. When the current rates were returned to 0.1 C and 0.5 C the cathode recovered back the capacity, delivering ~1000 and ~770 $mAh \cdot g^{-1}$, respectively. Although the overpotentials between the charge-discharge curves increased with the improvement in the current rate, they all demonstrated the two-plateau behavior, indicating stability and utilization at different current rates.

To explore the effect of S-loading we performed the galvanostatic charge-discharge test at 0.5 C at loadings >5 $mg \cdot cm^{-2}$. The initial capacity is reduced to 1000 $mAh \cdot g^{-1}$ for 5.5 $mg \cdot cm^{-2}$ compared to 1300 $mAh \cdot g^{-1}$ at 1.8 $mg \cdot cm^{-2}$ at a current rate of 0.5 C (FIG. 24C). These high loading cathodes deliver a stable capacity of ~500 $mAh \cdot g^{-1}$ after 250 cycles (FIG. 24C). This cycling performance at such high mass loadings with a high C rate is noteworthy. This response can be related to the combined effect of better utilization of the active material, increased nucleating sites for LiPs deposition, higher LiPs trapping sites mitigating shuttle effects, and the metallic conductivity of $Ti_3C_2T_z$-nanosheets allowing for efficient electron transfer during the redox reactions.

To observe the effect of shuttling in the DMX/S electrode we conducted a charge-discharge test at the harsh low current rate of 0.1 C with a high loading of 10.7 mg·cm$^{-2}$ (FIG. 24D). This low current increases the time for LiPs shuttling and can be used as an indirect measure of the binding effect of the DMX/S electrodes with the LiPs. The initial capacity was 925 mAh·g$^{-1}$ (9.25 mAh cm$^{-2}$), which stabilizes (~800 mAh·g$^{-1}$) and delivers 600 mAh·g$^{-1}$ after 150 cycles still retain 75% of stabilized capacity (FIG. 24D). This result indicates an improvement in utilization at high S loadings while delivering stable capacity. This performance enhancement can be attributed to better utilization of the MXene nanosheet surface for efficiently binding LiPs and faster conversion/reduction of the same helping to extend the cycle life.

Along the same lines, the next-generation high energy density Li—S cells will require higher weight loadings of active material to improve the areal capacity. Hence, DHT/S cathodes were fabricated with 83% mass S loading, henceforth referred to as DMX/83S. FIG. 34A shows the charge-discharge profile of cathodes at a 2.4 mg·cm$^{-2}$ loading. The composite displays the two-plateau discharge behavior with slightly higher polarization compared to prior tests (FIG. 34A). The higher polarization potential indicates reduced composite conductivity due to improvement in insulating sulfur content, increasing the voltage for a redox reaction. Overall, the DMX/83S electrode delivers a capacity of 450 mAh·g$^{-1}$ after 5 cycles and 80% of its initial capacity (~400 mAh·g$^{-1}$) after 300 cycles, (FIG. 5A). FIG. 5B plots the rate capability of the DMX/83.335 electrode that delivers a capacity of 580, 520, 430, and 380 mAh·g$^{-1}$ at 0.05, 0.1, 0.2, 0.5, and 1 C, respectively. When the current is increased back to 0.1 C, the capacity rebounds to ~515 mAh·g$^{-1}$. This performance at the high S loading and with high S wt % (83.33) should be ascribed to the convoluted effect of the highly active surface area of conductive delaminated DMX sheets and its LiPs trapping ability. It is important to note, the sulfur wt % loading is highest reported in MXene/S literature further suggesting the importance of the host-sulfur architecture in the utilization of active material.

It is evident that high specific capacity, good cycling stability, and utilization of sulfur at high wt % loadings can be attributed to, 1. Metallic sheet conductivity of MXenes in DMX/S composites. 2. Higher utilization of individual sheet surface area rendering better utilization of sulfur, 3. Improved accessibility of functional groups and LiPs trapping sites enabling Lewis acid-base interactions. Due to the aforementioned advantages, DMX/S cathodes bestow better advantages compared to the other $Ti_3C_2T_z$-MXene hosts reported in the literature, the electrodes demonstrate better performance metrics. FIG. 35A compares the delivered capacity of all MXene/S composite hosts at specific S loading and the current rate reported in the literature. DMX/S cathode delivers superior capacity in all current and areal loading regimes in addition to improved cycling stability.

Redox Kinetics of LiPs on DMX Surfaces

The Li-ion diffusion coefficients can be used to estimate the relative concentration of LiPs in the electrolyte. A lower concentration of LiPs in the electrolyte results in faster Li-ion diffusion and vice versa[30]. To investigate the Li-ion diffusion kinetics, CVs, at scan rates ranging from 0.1 mV s$^{-1}$ to 0.5 mV s$^{-1}$ between 1.8 V and 2.6 V vs. Li/Li$^+$, were obtained (FIG. 36A, 36B). The cathodic and anodic current peaks (labeled a, b and c in FIG. 36A, 36B) of the DMX/S and UMX/S electrodes scale linearly with the square root of the scan rates as shown in FIGS. 27C-27D. This indicates a diffusion-limited process.

As reported previously, the Li-ion diffusion process can be described by the Randles-Sevcik equation[30, 31] given by:

$$Ip=(2.69\times10^5)n^{1.5}AD^{0.5}Cu^{0.5}$$

where Ip is the peak current (A), n is the charge transfer number, A is the active electrode area (cm$^2$), DU is the lithium-ion diffusion coefficient (cm$^2$·s$^{-1}$), C is the concentration of Li ions (mol cm$^{-3}$), and u is the scan rate (V s$^{-1}$). Since n, A, C in a given cell can be regarded as constants, the slope of Ip vs. u$^{0.5}$ plots are proportional to $D_{Li}$. FIG. 36 shows that the UMX/S and DMX/S electrodes exhibit similar DU values in the "a" region, where the S to LiPs conversion is occurring. However, as shown in FIGS. 27C and 27D, we see a striking difference in the conversion of LiPs to $Li_2S$ and LiPs back to S. We see low Li diffusion for UMX/S compared to DMX/S. Such behavior might be arising from lower nucleating sites for LiPs on the hydrophilic UMX surface. Meanwhile, the hydrophobic surface of DMX/S might contribute towards better deposition which further results in improved current response as seen from CV curves.

Postmortem Studies

Finally, to fundamentally understand the nature of interactions exhibited between LiPs and $Ti_3C_2T_z$, we performed postmortem XPS analysis. The Li—S cells were stopped after completely discharging it after 500 cycles at 0.5 C. The cycled cells were de-crimped inside the Ar-filled glove box and transferred to the XPS chamber using an Ar-purged XPS assembly. For reference, we conducted similar experiments on normal UMX/S cycled cathode. Simultaneously, we performed postmortem SEM and XRD analysis to evaluate the surface morphology and stability of MXenes in the system, post cycling.

FIG. 27A-27B shows the core level S 2p spectra of the cycled UMX/S and DMX/S electrodes, respectively. The S 2p spectra of both the hosts show a multitude of peaks corresponding to various sulfur species. Table 1 shows the binding energies of various species and the corresponding peak contribution of UMX/S and NMX/S cycled cathodes. The peak positioned at 162.3 eV is attributed to elemental S, possibly due to incomplete reaction and or the disproportionation of metastable LiPs[32]. Furthermore, DMX/S shows the lower intensity of elemental S peak denoting better utilization of the S. Meanwhile, the dominant contribution from elemental S species in UMX might probably be arising through unreacted S. The peak positioned at a binding energy of ~160.2 eV is due to the formation of final $Li_2S$ product after the discharge[8, 32]. It is worth noting that the contribution of the $Li_2S$ peak is dominant in DMX/S cathode suggesting better interaction with LiPs with higher nucleating sites for $Li_2S$ deposition[36, 37]. The occurrence of an additional peak at a relatively lower binding energy of 158.7 eV can be attributed to the formation of the Ti—S bond due to the interaction of unsaturated metallic Ti centers with LiPs[10, 20]. Etched MXene surface tends to have defects/incomplete vacancies within its sheet-like morphology probably making it lewis acid[10]. On the other hand, LiPs carry lone pairs of electrons bearing a weak negative charge making them lewis base, therefore contributing towards Lewis acid-base coordinate covalent bond with the MXene host. Lewis acid-base interactions are dominant exhibiting the highest energies between the host and LiPs (B.E 3.5-7.0 eV) therefore allowing us to improve cycling performance in batteries[10]. Even though both the MXene nanosheets have similar intrinsic properties, lower $Li_2S$ peak contribution in UMX/S might be related to incompatibility/repulsion of the host with LiPs. Moreover, peaks centered at 165.40 eV and 167.38 eV are attributed to thiosulfate and polythionate species, respectively[20]. The surface terminal hydroxyl groups on the MXene surface are consumed by LiPs to form thiosulfate/polythionate complex which is followed by a reaction that exposes more Ti atoms to form Ti—S bonds[9]. The domination of these species in the DMX/S electrode shows improved thiosulfate/polythionate complex formation via increased available active surface area for binding from delaminated DMX sheets. This indicates better capability of the DMX nanosheets to utilize the S compared to normal UMX nanosheets. This dual mechanism of LiPs binding improves cycling by mitigating the shuttle reaction.

We also performed postmortem XRD for the cycled cathodes (DMX/S and UMX/S) after discharge (FIG. 37). In the XRD pattern of the cycled UMX/S and DMX/S cathodes, the presence of the (002) peak around 6 2 q° (d=15 Å) confirms the presence of 2D MXene sheets. This suggests the formed lewis acid-base Ti—S bond is reversible and does not hamper MXene structure enabling it to continue binding LiPs. However, since the electrode was dissembled in a completely discharged state and was exposed to air during XRD measurements, the $Li_2S$ being air sensitive might have converted to $H_2S$ and amorphous LiOH demonstrating no peak pattern.

Finally, to understand the effect of cycling on the MXene cathodes we performed SEM analysis of DMX/S and UMX/S on cycled cells. The motive behind this study was to understand if UMX sheets delaminated and/or DMX sheets restacked during cycling processes. FIG. 38A-38B shows sulfur is completely deposited on the surface and the outer surface of UMX supporting our initial hypothesis of this work. Simultaneously, in DMX/S cathodes (FIG. 38C, 38D) we still see single to few flakes of MXene nanosheets without aggregation denoting good adherence of material and suggesting cycling does not have any effect on cathode morphology. Furthermore, EDS data of the cycled UMX/S cathode show negligible titanium signal compared to S (FIG. 38E). This can be attributed to thick and non-uniform sulfur deposition of the surface of UMX/S. On the contrary, in FIG. 38F we see orderly Ti and S signal from DMX/S cathode due to the uniform deposition of sulfur by taking an advantage of numerous active area/nucleating sites on few to single DMX nanosheets.

TABLE 1

Postmortem XPS peak fitting results for S 2p regions of DMX/S and UMX/S cathodes. The numbers in bracket indicate peak location for Binding Energy (B.E) in column 2 for ($S2p_{3/2}$) and for full width at half maximum (FWHM) values column 3 for S $2p_{3/2}$.

| Species | B.E | FWHM | Area % | B.E | FWHM | Area % |
|---|---|---|---|---|---|---|
| | UMX/S | | | DMX/S | | |
| Ti—$S_y$ | 158.70 (159.88) | 1.0 (1.0) | 7 | 158.70 (159.88) | 1.1 (1.1) | 22 |
| $Li_2S$ | 160.20 (161.38) | 1.7 (1.7) | 29 | 160.20 (161.38) | 1.2 (1.2) | 13 |
| $S_8$ | 162.35 (163.53) | 2.2 (2.2) | 42 | 162.10 (163.28) | 1.6 (1.6) | 17 |
| Thiosulfate | 165.40 (166.58) | 1.7 (1.7) | 11 | 165.36 (166.58) | 1.8 (1.8) | 30 |
| Polythionate | 167.38 (168.56) | 2.2 (2.2) | 11 | 167.38 (168.56) | 2.0 (2.0) | 18 |

Conclusions

In summary, we developed a new and facile design strategy in which $Ti_3C_2T_z$ nanosheets surfaces are engineered to fabricate S electrodes. The MXene surfaces are first modified using an inexpensive organic molecule, DHT, that results in easy dispersion of MXene sheets in S dissolved $CS_2$. Upon evaporation of the solvent, S conformally and uniformly deposits on the 2D layer surfaces. This method eliminates the use of energy extensive high-temperature treatment method for S diffusion and results in efficient deposition of S on the MXene surface. In principle the $CS_2$ used can be recycled after its evaporation, further reducing the synthesis cost. The DMX/S electrodes deliver a stable capacity of ~750 $mAh \cdot g^{-1}$ after 500 cycles at 0.5 C retaining ~85% capacity after the first 5 cycles. Furthermore, at a high current rate of 1 C the cathode delivers an initial capacity of ~720 $mAh \cdot g^{-1}$ and retains around 80% of its capacity after 500 cycles. The electrode also can operate at a high loading of 10.7 $mg \cdot cm^{-2}$ with an initial areal capacity of ~8 mAh $cm^{-2}$ and a stable capacity of ~600 $mAh \cdot g^{-1}$ for 150 cycles. In addition, we have shown the electrode to be operational at high weight loading, 83.3 wt. % sulfur retaining stability after 300 cycles at 0.5 C. The developed cathode outweighs performance characteristics in all current and sulfur loading regimes compared to other MXene/S hosts in literature. Post-mortem XPS studies reveal the presence of strong Lewis-acid base bonds (Ti—S) between DMX/S and LiPs. In addition, the XPS study also reveals the presence of thiosulfate/polythionate complex formation. We attribute the strong electrochemical performance to unique electrode design coupled with the metal-like conductivity of $Ti_3C_2T_z$ flakes. Our design strategy paves a new path for the development of high loading and long cycle life Li—S batteries.

Experimental Section A

Preparation of $Ti_3AlC_2$ and $Ti_3C_2T_z$

Materials: To make the $Ti_3AlC_2$ MAX phase powders, Ti, Al and titanium carbide, TiC, powders (−325 mesh, 99.5%, Alfa Aesar, Ward Hill, Mass.) were used. Di(hydrogenated tallow)benzyl methyl ammonium chloride (80%, Alfa Chemistry, Ronkonkoma, N.Y.) DHT, was used for treating the MLs. De-ionized water, ethanol, dimethylsulfoxide, decahydronaphthalene, chloroform, hexane, cyclohexane, toluene and p-xylene (>99% MilliporeSigma, Burlington, Mass.) were used as received.

$Ti_3AlC_2$ Synthesis: Powders of TiC, Al and Ti in a 2:1.05:1 molar ratio were balled milled with zirconia milling balls for 24 h. This mixture was then separated from the milling balls, placed in an alumina, $Al_2O_3$, boat and heated in an $Al_2O_3$ tube furnace at a rate of 5° C./min under continuous argon, Ar, flow to 1350° C. After holding for 2 h at temperature, the sample was allowed to cool passively. The resulting sintered porous brick was milled and sieved with a 400 mesh sieve to a particle size of <38 μm.

$Ti_3C_2T_z$ Synthesis and Treatment: The $Ti_3C_2T_z$ used in this study was prepared as follows: three grams of the sieved MAX powder was immersed in a 30 mL mixture of 10 wt. % hydrofluoric acid, HF, and 3.24 g lithium chloride, LiCl, for a $LiCl/Ti_3AlC_2$ molar ratio of 5:1. This mixture, was stirred for 24 h with a PTFE coated magnetic stir bar at RT at 300 rpm. After etching, the contents were equally divided into six centrifuge tubes so that the mass of each tube was within +0.01 g of each other. In order to obtain 1 g of untreated MXene and 1 g of each treatment, out of the six tubes, two were left untreated, two were treated with ALA and two with DHT.

To separate the sediment, these tubes were centrifuged at 3500 rpm (or 2301 rcf) for 60 s. The supernatant was discarded and replaced with deionized (DI) water, for a total volume of about 40 mL in each centrifuge tube. The tubes were again centrifuged for 60 s at 3500 rpm. After decanting the supernatant and refilling with 40 mL of DI water, this procedure was repeated until a pH of 5-6, as measured by pH paper, was obtained.

After the final wash, 40 mL of a 20 mM pre-prepared solution of DHT in a 50:50 (v:v) of water and ethanol were added to the appropriate isolated sediments—comprised of multilayers—and allowed to mix for 12 h at RT. After mixing, all powders were washed simultaneously with distilled water until no chlorine was detected by the $AgNO_3$ method.[30] The product was then vacuum filtered through a polypropylene film (Celgard LLC, Charlotte, N.C.) and dried in vacuum at 100° C. for 12 h. The resulting fine powders are hereafter referred to as DHT-MX or simply MXene in the case of untreated powders.

Dispersion of DHT-$Ti_3C_2T_z$ in various solvents: 200 mg of dried DHT-MX MLs was dispersed in 10 mL of deionized water, ethanol, DMSO, chloroform, decalin, hexane, cyclohexane, toluene or p-xylene. These suspensions were briefly shaken by hand to mix. In the case of DHT-$Ti_3C_2T_z$, dark suspensions were obtained in all solvents except for water and DMSO after initial mixing by hand. Samples were then fitted with a rubber septum and degassed for 600 s under flowing argon, Ar, before sonication in a bath sonicator for 1 h. These vials were then placed on a lab bench and left undisturbed. The stability of the various suspensions were then monitored by digital photography for 240 h (10 days). After this period, samples were transferred to 50 mL centrifuge tubes and centrifuged for 60 s at 3500 rpm (2301 rcf). The obtained supernatant and isolated sediments were collected, and the former were vacuum filtered for concentration analysis and subsequent characterization of resulting films. The same procedure was repeated with untreated $Ti_3C_2T_z$ MXene for comparison.

Synthesis of LLDPE samples: 20 g of linear low density polyethylene (LLDPE) pellets (MilliporeSigma, Burlington, Mass.) were added to 150 mL of p-xylene in a three necked separable flask and degassed in a sonication bath with flowing argon for 1 h. The reaction vessel was then heated at 125° C. under reflux and mechanically stirred for 1 h before casting in petri dishes and drying in vacuum at 100° C. for 12 h. This was repeated with the addition of 1.05 g of either treated or untreated $Ti_3C_2T_z$ to obtain composite samples. After drying in vacuum, the samples were extruded at 140° C. with a Filabot EX2 and the filament was collected using a Filabot Spooler. This filament was then cut by hand into pellets to be used for injection molding.

Characterization Methods:

Dynamic light scattering: DLS measurements were done using a NanoBrook Omni (Brookhaven Instruments Corporation, Long Island, N.Y.) system. Colloids were placed inside a quartz cuvette, which was loaded inside the machine. Each sample was allowed to stabilize for 30 s before measurement. 3 measurements were taken for each sample and data was then averaged before reporting X-ray diffraction: X-ray diffraction, XRD, patterns were obtained with a Rigaku MiniFlex x-ray diffractometer with an incident Cu $K_\alpha$ wavelength of 1.54 Å in the range of 2-10° 2 θ with a minimum step-size of 0.02° and dwell time of 1.75 s.

Scanning electron microscopy: Images and EDS maps were taken using a scanning electron microscope (Zeiss Supra 50VP, Oberkochen Germany) with EDS (Oxford Instruments, Abington, U.K.) in secondary electron detection mode with an acceleration voltage of 20 kV and a working distance of 15.3 mm at 500× magnification.

Transmission electron microscopy: TEM images were taken using a JEOL JEM2100 transmission electron microscope.

FTIR-ATR: Near infrared spectra were obtained on samples with a Thermo Nicolet Nexus 870 FT-IR Spectrometer in the range of 4000-400 $cm^{-1}$ at room temperature. A background was taken and droplets of either pure solvent or DHT-MX in solvent were placed onto the ATR crystal. 32 scans were taken with a scan average of 4 for a data spacing of 0.482 $cm^{-1}$.

Thermogravimetric analysis: Neat and composite LLDPE pellets were testing by thermogravimetric analysis on a TA Instruments (New Castle, Del.) Q50. The samples were heated at a rate of 10° C. $min^{-1}$ to 800° C. under flowing argon and held for 0.5 h at 800° C. For the DHT-$Ti_3C_2T_z$ powder sample, the heating rate was reduced to 2° C. $min^{-1}$.

Injection moulding and tensile testing of LLDPE samples: Neat and composite ASTM D638 Type IV specimens were injection molded with a Long River desktop injection molding machine at a barrel temperature of 200° C. and mold temperature of 60° C. These samples were tested in tension at room temperature on an Instron 8872 Servohydraulic Testing System (Norwood, Mass., USA) by following ASTM D638-14. Samples were tested at a crosshead speed of 60 mm/s for a nominal strain rate of 0.04 $s^{-1}$.

Rheology: Neat and composite LLDPE pellets were moulded into 25 mm disks using a heated hydraulic press at 140° C. Samples were then loaded between the parallel plates of the rheometer (DHR-3, TA Instruments, New Castle, Del.) and relaxed at the maximum testing temperature of 220° C. Frequency sweeps from 0.1 rad/s to 100 rad/s were performed at 20° C. increments down to the crystallization point. Samples remained under nitrogen for the duration of the testing. Master curves were created using time-temperature superposition.

Experimental Section-B

Experimental

Materials

Material for Synthesis

Titanium carbide (TiC) (99.5%, 2 μm), aluminum (Al) (99.5%, 325 mesh), and titanium (Ti) (99.5%, 325 mesh) and LiF (99.5%, 325 mesh) were purchased from Alfa Aesar.12 M HCl was purchased from Fisher Scientific and DHT (80%) was purchased from Alfa Chemistry.

Materials for Electrochemistry:

Lithium trifluoromethanesulfonate (99.995% trace metals basis, product number 481548), 2-dimethoxyethane (DME, anhydrous, septum-sealed bottle DriSolv®, product number DX1531) and 1,3-dioxolane (DOL, anhydrous, contains ~75 ppm BHT as inhibitor, 99.8%, SureSeal, product number 271020) were purchased from Sigma-Aldrich. Sulfur (99.5%, sublimed, catalog number AC201250025), Carbon Disulfide (Reagent grade, catalog number C184-500), Lithium Nitrate (anhydrous, 99.98%, catalog number AA1098503) were purchased from Fisher scientific.

Synthesis

Synthesis of MAX Powder ($Ti_3AlC_2$)

Parent $Ti_3AlC_2$ powders were synthesized by mixing titanium carbide (TiC), aluminum (Al), and titanium (Ti) powders in a molar ratio of 2:1.05:1, respectively. The mixed powders were ball milled at 100 rpm for 24 h and then heated under argon (Ar) flow at 1350° C. for 2 h. It should be noted that the ball milling at slow speed was only for homogenous mixing no particle size reduction or reactions are occurring. The heating and cooling rates were set at 5° C./min. The resulting blocks were ground to powders using a milling bit on a drill press. The milled powders were passed through a 400-mesh (particle size <38 μm) sieve for further experiments.

Synthesis of MXene ($Ti_3C_2T_z$) and DHT Treatment

First, 1 g of LiF was dissolved in 10 mL of 12 M HCl after which 1 g of the $Ti_3AlC_2$ powder was slowly added to the solution. Then it was stirred for 24 h at 35° C. and 300 rpm. The resulting solution was later transferred into a 50 mL centrifuge tube, and deionized (DI) water was added to completely fill the remaining volume. It was then centrifuged at 3500 rpm/2300 rcf for 1 min, and the resulting clear supernatant was discarded. This washing was repeated several times until the pH of the solution was 7. Afterwards the sediment was divided into 2 equal parts. One part was dried in vacuum at 100° C. for 12 h and is labelled as normal untreated Mxene or UMX. In the second part 40 mL of a 20-mM pre-prepared solution of DHT in a 50:50 (v:v) of water and ethanol was added and allowed to mix for 12 h at RT. After mixing, all of the powders were washed with DI water 3 times. The resulting DHT-MXene or DMX dried in vacuum at 100° C. for 12 h.

Synthesis of MXene-Sulfur Composite

Moderate weight percentage electrodes, 50 wt %

In a typical synthesis, 1 gram of sulfur was added to 5 ml of carbon disulfide ($CS_2$) solution in a glass vial. The glass vial was kept in an ice bath and the vial was hand-shaken until sulfur dissolved and the solution turned clear. 1 gram of DHT-MXene (DMX) was added to this solution and was probe sonicated (250 watts) for 15 mins in an ice bath. After probe sonication, argon was slowly blown on top of this solution while magnetically stirred (320 rpm) until the $CS_2$ completely evaporated. Once $CS_2$ has been visibly evaporated, the solid mixture was vacuum dried at room temperature for 12 hours to yield DMX/S powder. Similar strategy was employed for normal MXene (UMX/S).

High weight percentage electrodes, 83.33 wt %

A similar procedure was adopted for low weight percentage electrodes, except, 5 grams of sulfur was added to 20 ml of $CS_2$ solution with 1 gram of MXenes.

Synthesis of DMX/S and UMX/S Composite Electrode

A cathode was fabricated using a slurry method. Briefly, the slurry was prepared by mixing 70 wt % of vacuum-dried DMX/S with 20 wt % conductive carbon (Alfa Aesar, Super P) and 10 wt % battery grade PVDF binder (MTI corp, USA). DMX/S, conductive carbon, and PVDF were hand-ground with mortar and pestle till the composite turned uniform. Later N—N dimethylpyrrodlone (TCI, USA) was slowly added until required visible consistency and uniformity were achieved (~1 hour). The slurry was later cast on battery grade aluminum foil coated with 1-micron thick conductive carbon for better adhesion using a doctor blade (MTI corp, USA). For improving sulfur loading the thickness of the slurry was increased by changing dial gauges of the doctor blade. Once cast, the slurry was kept under a closed fume hood for 2 hours before transferring to a vacuum oven where it was dried at 50 degrees for 24 hours.

Characterization

Material Characterization

The morphological analysis of the materials was conducted using a SEM (Zeiss Supra 50VP, Germany) with an inlens detector and 30 mm aperture was used to examine the morphology and obtain micrographs of the samples. To analyze the surface elemental composition, EDS (Oxford Instruments) in secondary electron detection mode was used. To analyze the sulfur deposition on the surface TEM measurements were conducted. High resolution transmission electron microscope, HR-TEM, analyses were performed in a bright field mode operated at 200 kV on a JEOL JEM2100F equipped with an energy dispersive spectroscope, EDS, with an 80 $mm^2$ SSD detector (Oxford X-MaxN 80 T EDS system). X-ray diffraction (XRD) patterns were acquired on a diffractometer (Rigaku Miniflex, Tokyo, Japan) using Cu $K_\alpha$ radiation (40 kV and 40 mA) with a step size of 0.02° and dwell time of 5 s, in the 2°-65° 2θ range. The surface of the composites was analyzed with X-ray photoelectron spectroscopy (XPS). To collect XPS spectra, Al-Ka X-rays with a spot size of 200 mm and pass energy of 23.5 eV were used to irradiate the sample surface. A step size of 0.05 eV was used to gather the high-resolution spectra. CasaXPS Version 23.19PR1.0 software was used for spectra analysis. The sulfur in the composited were determined using Thermogravimetric analysis (TGA).

Electrochemical Characterization

Coin Cell Fabrication

The dried electrodes were cut using a hole punch (ϕ=½ inch (12.72 mm)) to form disk sized electrodes. The electrodes were then weighed and transferred to argon-filled glove box (MBraun Lab star, $O_2$<1 ppm, and $H_2O$<1 ppm). The CR2032 (MTI Corporation and Xiamen TMAX Battery Equipment) coin-type Li—S cells were assembled using DMX/S and UMX/S (ϕ=12 mm), lithium disk anodes (Xiamen TMAX Battery Equipment's; 15 mm diameter and 450 μm thick), a tri-layer separator (Celgard 2325; ϕ=19 mm), and stainless steel spring and spacers along with an electrolyte. The electrolyte with 1 M LiTFSi with 1 wt % $LiNO_3$ in a mixture of 1,2-dimethoxyethane and 1,3-dioxolane at a 1:1 volume ratio were purchased from TMAX Battery equipment, China with $H_2O$<6 ppm and $O_2$<1 ppm. The assembled coin cells were rested at their open-circuit potential for 12 hours to equilibrate them before performing electrochemical experiments. Cyclic voltammetry was performed at various scan rates (0.1 $mV \cdot s^{-1}$ to 0.5 $mV \cdot s^{-1}$) between voltages 1.8 and 2.6 V wrt Li/Li+ and electrochemical impedance spectroscopy in the frequency range of 1 mHz to 100 kHz with an alternating current perturbation of 10 mV amplitude were performed using a potentiostat (Biologic VMP3). Prolonged cyclic stability tests were carried out with a MACCOR (4000 series) and Neware BTS 4000 battery cycler at different C-rates (where 1 C=1675 mAh·$g^{1}$) between voltages 1.8 and 2.6 V. Li—S cells were conditioned during the first cycle at the 0.1 C and second cycle at 0.2 C rate before cycling them at the 0.5 C rate.

Additional Disclosure

In addition to solution deposition using carbon disulfide ($CS_2$), we have also focused on other sulfur incorporation techniques such as vapor deposition and cross-linking. The following data shows material characterization after sulfur vapor deposition on DHT-MXene (DMX) substrate (DMX/S).

Experimental Synthesis Procedure

Typically, Sulfur and DMX were mixed in a weight ratio of 1:1 and subjected to heat treatment in a horizontal tube furnace. The initial experiments were conducted by adding the mixture to a test tube and inserting it inside a metal pipe fitting. The pipe fitting was subjected to 180° C. for 12 hours and 350° C. for 5 hours at a ramp rate of 1° C./min under the flow of Argon gas. Finally, it was cooled to room temperature (RT) at a ramp rate of 2° C./min to get DMX/S and was stored under vacuum.

Electrochemical characterization procedure: A typical slurry process was employed by mixing DMX/S, Super-P (C-65, Timcal), and PVDF (MTI, battery grade) in a weight ratio of 8:1:1 in NMP. The slurry was vacuum dried at 50° C. for 12 hours. The electrodes were punched out, weighed, and were transferred in the glove box. The batteries were assembled with an appropriate amount of electrolyte with Li/Na/K anodes.

Material Characterization

Figure 39:
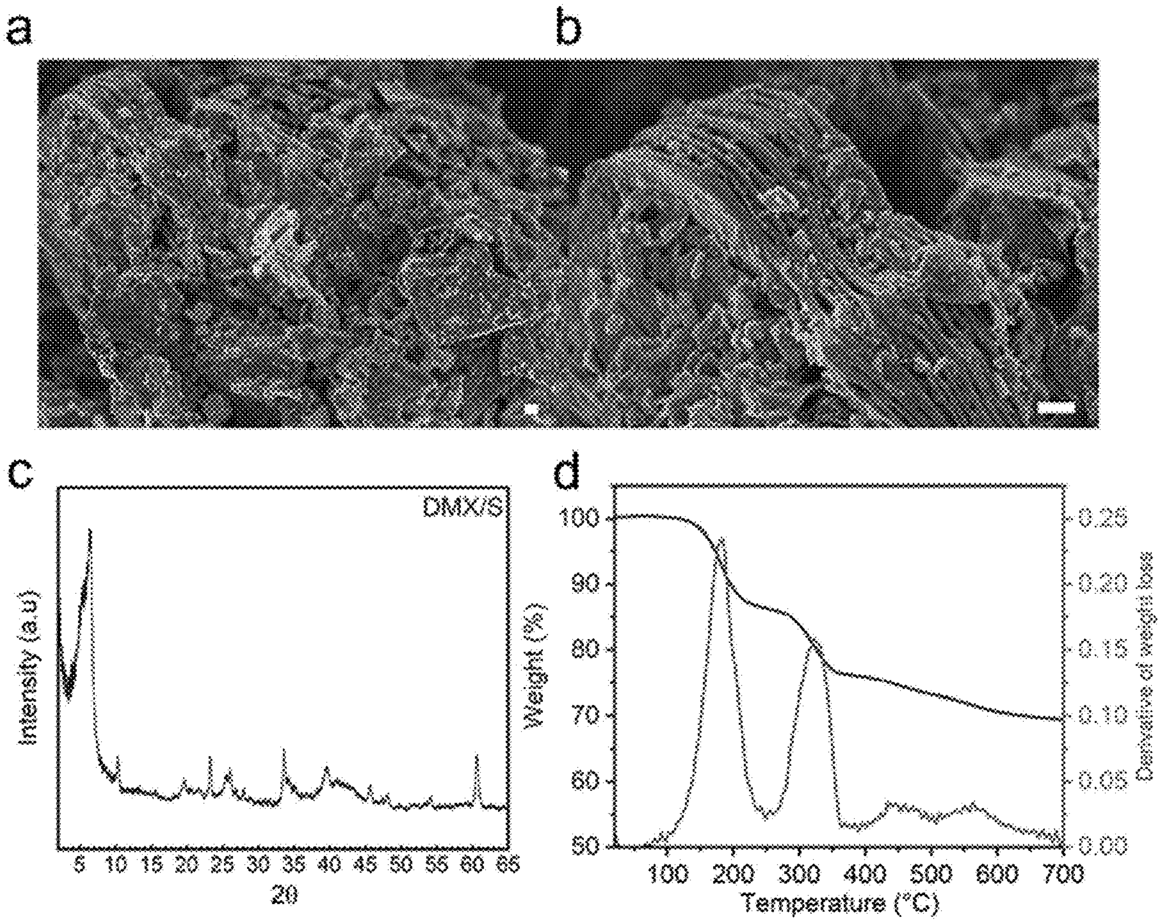

FIG. 39A-39B shows scanning electron microscopy images of DMX/S. We can see the multilayer (ML) structure of MXene nanosheets with the surface covered with some particles. The particles on the surface can be sulfur aggregates and/or oxidized spots. We then conducted XRD analysis to understand the phase contribution in the composite. We presence of 002 peak at around 5° 2θ compared to 6° 2θ (DMX) is evidence of 2D MXene nanosheets with reduced interlayer spacing. The reduction in interlayer spacing might be due to heat treatment which might decompose some organic DHT molecules and removal of interlayer water. The high-intensity peak present ~23° 2 θ suggests the presence of outside sulfur in addition to $TiO_2$ peaks at ~26° 2 θ. To understand the amount of sulfur in the composite TGA analysis was carried out. FIG. 21D shows the weight loading of sulfur in the DMX/S composite. We observe a 2-zone mass loss with the first zone (100-200° C.) suggesting the outside sulfur and second zone (200-350° C.) suggesting either intercalated/encapsulated sulfur. The total sulfur loading observed is 25 wt %.

EMBODIMENTS

The following embodiments are illustrative only and do not limit the scope of the present disclosure or the appended claims.

Embodiment 1. A method, comprising: with a layered MXene material that comprises an exchangeable first cation between layers, effecting cation exchange so as to replace the first cation with a second cation and give rise to an enhanced MXene material, the second cation being characterized as an organic cation.

Although ALA and DHT are shown as exemplary cation source materials, it should be understood that the disclosed technology is not limited to ALA and DHT. The disclosed technology can be practiced using a variety of materials. General classes of surfactants can be used. N-alkyl quaternary ammonium salts are considered especially suitable.

An exemplary structure is provided below:

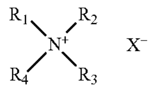

Any one or more of R1-R4 can be an alkyl group or an aryl group; each of R1-R4 can be different, although this is not a requirement. The cation can include one or more carbon chains of at least 12 carbons in length. A cation can have, e.g., two of R1-R4 being carbon chains of 12-18 carbons in length. One or more of the remaining R1-R4 can be a methyl group ($CH_3$); one or more of R1-R4 can also be a benzyl group. X can be a halogen (e.g., chloride). Some cations can have only a single carbon chain having a length of 12 or more carbons. Some cations may include two or more methyl groups.

Embodiment 2. The method of Embodiment 1, wherein the organic cation comprises or is derived from 12-aminolauric acid or di(hydrogenated tallow)benzyl methyl ammonium chloride.

Embodiment 3. The method of any one of Embodiments 1-2, further comprising dispersing the enhanced MXene material in a nonpolar solvent.

Embodiment 4. The method of any one of Embodiments 1-3, further comprising dispersing the enhanced MXene material in a polymer.

Embodiment 5. A composition, comprising: a layered MXene material that comprises an organic cation between layers.

Embodiment 6. The composition of Embodiment 5, wherein the layered MXene material is dispersed in a nonpolar solvent.

Embodiment 7. The composition of Embodiment 6, wherein the nonpolar solvent comprises one or more of $CS_2$, decahydronaphthalene, chloroform, hexane, cyclohexane, toluene and p-xylene.

Embodiment 8. The composition of any one of Embodiments 5-7, wherein the layered MXene material is dispersed in a polymer.

Embodiment 9. A method, comprising forming a coating of a composition according to any one of Embodiments 5-8.

Embodiment 10. An article, the article comprising a composition according to any one of Embodiments 5-8.

Embodiment 11. A composite, comprising: a MXene composition comprising a chalcogen disposed thereon, the MXene composition further optionally comprising a quaternary ammonium halide disposed thereon.

A quaternary ammonium halide can have the structure above, wherein each R represents a substituent group (which groups can be the same or different from one another), and X— represents a halogen. Suitable substituents are described elsewhere herein.

For example, any one or more of R1-R4 can be an alkyl group or an aryl group; each of R1-R4 can be different, although this is not a requirement. The cation can include one or more carbon chains of at least 12 carbons in length. A cation can have, e.g., two of R1-R4 being carbon chains of 12-18 carbons in length. One or more of the remaining R1-R4 can be a methyl group ($CH_3$); one or more of R1-R4 can also be a benzyl group. X can be a halogen (e.g., chloride). Some cations can have only a single carbon chain having a length of 12 or more carbons. Some cations may include two or more methyl groups.

For the example of DHT, X is chlorine, one of the R groups is a methyl group, one of the Rs is a benzyl group and two of the Rs are long chain alkyl (C12-C18) groups. R can, however, be a hydrogen, alkyl, alkenyl, alkynyl, benzyl, or other substituent.

Embodiment 12. The composition of Embodiment 11, wherein the quaternary ammonium halide comprises di(hydrogenated tallow)benzyl methyl ammonium chloride (DHT). As explained elsewhere herein, DHT is an example quaternary ammonium halide, and other quaternary ammonium halides can also be used and will be known to those of ordinary skill in the art.

Embodiment 13. The composite of any one of Embodiments 11-12, wherein the composite is in the form of flakes.

Embodiment 14. The composite of any one of Embodiments 11-13, wherein the chalcogen comprises sulfur present at a loading at from about 0.05 to about 150 mg sulfur per $cm^2$, e.g., from about 0.05 to about 150, from about 0.1 to about 100, from about 0.5 to about 75, from about 0.75 to about 50, from about 1 to about 40, or even from about 2 to about 25 mg sulfur/$cm^2$.

Embodiment 15. The composite of any one of Embodiments 11-14, wherein the composite retains at least 50% of its areal capacity (e.g., from 50 to 90%, from 55 to 85%, from 60 to 80%, from 65 to 75%, or even about 70%) over 500 charge-discharge cycles.

Embodiment 16. The composite of any one of Embodiments 11-15, wherein the chalcogen comprises sulfur and represents up to about 90 wt % (e.g., from 1 to 90 wt %, from 5 to 85 wt %, from 10 to 80 wt %, from 15 to 75 wt %, from 20 to 70 wt %, from 30 to 60 wt %, or from 40 to 50 wt %) of the combined weight of the sulfur and the hydrophobic MXene composition.

Embodiment 17. A cathode, the cathode comprising a composite according to any one of Embodiments 11-16, the cathode optionally comprising a binder material, the binder material optionally comprising a ceramic matrix composite (CMC), styrene-butadiene rubber (SBR), polyacrylic acid (PAA), polyvinyl alcohol (PVA), polyethylene glycol (PEG), sodium carboxymethyl chitosan (CCTS), sodium alginate (SA), styrene-butadiene rubber (SBR), or any combination thereof.

Embodiment 18. An electrochemical cell, the electrochemical cell comprising a cathode according to Embodiment 17 and comprising an anode, the anode optionally comprising an alkali metal, an alkaline metal, a transition metals, graphite, an alloy, and a composite.

Embodiment 19. The electrochemical cell of Embodiment 18, wherein anode comprises at least one of lithium, sodium, potassium, magnesium, calcium, zinc, copper, titanium, nickel, cobalt, iron, and aluminum. Lithium is considered especially suitable.

Embodiment 20. A method, the method comprising operating an electrochemical cell according to any one of Embodiments 18-19.

Embodiment 21. An electronic device, the electronic device comprising a composite according to any one of Embodiments 11-16.

Embodiment 22. A hydrophobic MXene composite, the composite comprising a MXene composition having a quaternary ammonium halide disposed thereon.

Embodiment 23. A method, comprising contacting a MXene composition with a quaternary ammonium halide so as to dispose a coating of the quaternary ammonium halide on the MXene composition to form a hydrophobic MXene composite. Suitable quaternary ammonium halides are described elsewhere herein, and will be known to those of ordinary skill in the art.

Embodiment 24. The method of Embodiment 23, further comprising placing a chalcogen onto the hydrophobic MXene composite.

Embodiment 25. The method of Embodiment 24, wherein the placing comprises contacting the hydrophobic MXene composite with $CS_2$.

Embodiment 26. The method of Embodiment 24, wherein the placing comprises vapor deposition of the chalcogen. Without being bound to any particular theory, the presence of the quaternary ammonium halide may alter (e.g., increase) the spacing between adjacent MXene sheets so as to make the surfaces of the sheets more accessible to vapor phase and other deposition processes.

REFERENCES

1. Verger, L., Natu, V., Carey, M. & Barsoum, M. W. MXenes: An Introduction of Their Synthesis, Select Properties, and Applications. Trends Chem. In Press, (2019).
2. Maleski, K., Mochalin, V. N. & Gogotsi, Y. Dispersions of Two-Dimensional Titanium Carbide MXene in Organic Solvents. Chem. Mater. 29, 1632-1640 (2017).
3. Natu, V. et al. Edge Capping of 2D-MXene Sheets with Polyanionic Salts to Mitigate Oxidation in Aqueous Colloidal Suspensions. Angew. Chemie Int. Ed. In Press, (2019).
4. Zhao, X. et al. Antioxidants Unlock Shelf-Stable Ti3C2T (MXene) Nanosheet Dispersions. Matter (2019). doi: 10.1016/j.matt.2019.05.020
5. Konios, D., Stylianakis, M. M., Stratakis, E. & Kymakis, E. Dispersion behaviour of graphene oxide and reduced graphene oxide. J. Colloid Interface Sci. 430, 108-112 (2014).
6. Hamilton, C. E., Lomeda, J. R., Sun, Z., Tour, J. M. & Barron, A. R. High-yield organic dispersions of unfunctionalized graphene. Nano Lett. 9, 3460-3462 (2009).
7. Cao, Y., Feng, J. & Wu, P. Alkyl-functionalized graphene nanosheets with improved lipophilicity. Carbon N. Y. 48, 1683-1685 (2010).
8. Tessonnier, J. P. & Barteau, M. A. Dispersion of alkyl-chain-functionalized reduced graphene oxide sheets in nonpolar solvents. Langmuir 28, 6691-6697 (2012).
9. Choudhary, S., Mungse, H. P. & Khatri, O. P. Dispersion of alkylated graphene in organic solvents and its potential for lubrication applications. J. Mater. Chem. 22, 21032-21039 (2012).
10. Lim, S., Park, H., Yang, J., Kwak, C. & Lee, J. Stable colloidal dispersion of octylated $Ti_3C2$-MXenes in a nonpolar solvent. Colloids Surfaces A Physicochem. Eng. Asp. 579, (2019).
11. Ghidiu, M., Lukatskaya, M. R., Zhao, M. Q., Gogotsi, Y. & Barsoum, M. W. Conductive two-dimensional titanium carbide ‘clay’ with high volumetric capacitance. Nature 516, 78-81 (2014).

12. Ghidiu, M. et al. Alkylammonium cation intercalation into Ti3C2 (MXene): Effects on properties and ion-exchange capacity estimation. Chem. Mater. 29, 1099-1106 (2017).
13. Ghidiu, M., Kota, S., Drozd, V. & Barsoum, M. W. Pressure-induced shear and interlayer expansion in Ti3C2 MXene in the presence of water. Sci. Adv. 4, eaao6850-eaao6850 (2018).
14. Ghidiu, M. et al. Ion-exchange and cation solvation reactions in Ti3C2 MXene. Chem. Mater. 28, 3507-3514 (2016).
15. Verger, L., Natu, V., Ghidiu, M. & Barsoum, M. W. Effect of Cationic Exchange on the Hydration and Swelling Behavior of Ti3C2$T_z$ MXenes. J. Phys. Chem. C 123, 20044-20050 (2019).
16. Natu, V., Sokol, M., Verger, L. & Barsoum, M. W. Effect of Edge Charges on Stability and Aggregation of Ti3C2$T_z$ MXene Colloidal Suspensions. J. Phys. Chem. C 122, 27745-27753 (2018).
17. Lukatskaya, M. R. et al. Cation intercalation and high volumetric capacitance of two-dimensional titanium carbide. Science (80-). 341, 1502-1505 (2013).
18. Voigt, C. A., Ghidiu, M., Natu, V. & Barsoum, M. W. Anion Adsorption, Ti3C2$T_z$ MXene Multilayers, and Their Effect on Clay-like Swelling. J. Phys. Chem. C 122, 23172-23179 (2018).
19. Gunstone, F. D. & Hamilton, R. J. Oleo chemical manufacture and applications. 4, (CRC Press, 2001).
20. Halim, J. et al. X-ray photoelectron spectroscopy of select multi-layered transition metal carbides (MXenes). Appl. Surf. Sci. 362, 406-417 (2016).
21. Carey, M., Hinton, Z., Sokol, M., Alvarez, N. J. & Barsoum, M. W. Nylon-6/Ti3C2$T_z$ MXene Nanocomposites Synthesized by In Situ Ring Opening Polymerization of ε-caprolactam and their Water Transport Properties. ACS Appl. Mater. Interfaces 11, 20425-20436 (2019).
22. Carey, M. S., Sokol, M., Palmese, G. R. & Barsoum, M. W. Water Transport and Thermomechanical Properties of Ti3C2$T_z$ MXene Epoxy Nanocomposites. ACS Appl. Mater. Interfaces In Press, (2019).
23. Stretz, H. A., Paul, D. R., Li, R., Keskkula, H. & Cassidy, P. E. Intercalation and exfoliation relationships in melt-processed poly (styrene-co-acrylonitrile)/montmorillonite nanocomposites. Polymer (Guildf). 46, 2621-2637 (2005).
24. Halim, J. et al. Variable range hopping and thermally activated transport in molybdenum-based MXenes. Phys. Rev. B 98, 104202 (2018).
25. Coleman, J. N. Liquid-phase exfoliation of nanotubes and graphene. Adv. Funct. Mater. 19, 3680-3695 (2009).
26. Chevigny, C. et al. Polymer-grafted-nanoparticles nanocomposites: dispersion, grafted chain conformation, and rheological behavior. Macromolecules 44, 122-133 (2010).
27. Akuzum, B. et al. Rheological characteristics of 2D titanium carbide (MXene) dispersions: a guide for processing MXenes. ACS Nano 12, 2685-2694 (2018).
28. Mashtalir, O. et al. Intercalation and delamination of layered carbides and carbonitrides. Nat. Commun. 4, 1716 (2013).
29. Naguib, M., Unocic, R. R., Armstrong, B. L. & Nanda, J. Large-scale delamination of multi-layers transition metal carbides and carbonitrides "MXenes". Dalt. Trans. 44, 9353-9358 (2015).
30. Yoder, L. Adaptation of the Mohr Volumetric Method to General Determinations of Chlorine. Ind. Eng. Chem. 11, 755 (1919).

[1] M. Armand, J. M. Tarascon, Nature 2008, 451, 652.
[2] A. Manthiram, Y. Fu, S. H. Chung, C. Zu, Y. S. Su, Chem Rev 2014, 114, 11751; P. G. Bruce, S. A. Freunberger, L. J. Hardwick, J. M. Tarascon, Nat Mater 2011, 11, 19.
[3] Y. X. Yin, S. Xin, Y. G. Guo, L. J. Wan, Angew Chem Int Ed Engl 2013, 52, 13186.
[4] M. Wild, L. O'Neill, T. Zhang, R. Purkayastha, G. Minton, M. Marinescu, G. J. Offer, Energy & Environmental Science 2015, 8, 3477.
[5] X. B. Cheng, R. Zhang, C. Z. Zhao, Q. Zhang, Chem Rev 2017, 117, 10403.
[6] X. B. Cheng, J. Q. Huang, Q. Zhang, Journal of The Electrochemical Society 2017, 165, A6058.
[7] G. Li, J. Sun, W. Hou, S. Jiang, Y. Huang, J. Geng, Nat Commun 2016, 7, 10601; G. He, S. Evers, X. Liang, M. Cuisinier, A. Garsuch, L. F. Nazar, ACS Nano 2013, 7, 10920; N. Jayaprakash, J. Shen, S. S. Moganty, A. Corona, L. A. Archer, Angew Chem Int Ed Engl 2011, 50, 5904; L. Ji, M. Rao, S. Aloni, L. Wang, E. J. Cairns, Y. Zhang, Energy & Environmental Science 2011, 4.
[8] H. J. Peng, J. Q. Huang, X. B. Cheng, Q. Zhang, Advanced Energy Materials 2017, 7.
[9] S. H. Chung, A. Manthiram, Adv Mater 2019, 31, e1901125.
[10] Q. Pang, X. Liang, C. Y. Kwok, L. F. Nazar, Nature Energy 2016, 1.
[11]X. Tao, J. Wang, Z. Ying, Q. Cai, G. Zheng, Y. Gan, H. Huang, Y. Xia, C. Liang, W. Zhang, Y. Cui, Nano Lett 2014, 14, 5288.
[12] H. J. Peng, G. Zhang, X. Chen, Z. W. Zhang, W. T. Xu, J. Q. Huang, Q. Zhang, Angew Chem Int Ed Engl 2016, 55, 12990.
[13] M. Naguib, M. Kurtoglu, V. Presser, J. Lu, J. Niu, M. Heon, L. Hultman, Y. Gogotsi, M. W. Barsoum, Adv Mater 2011, 23, 4248.
[14] M. Sokol, V. Natu, S. Kota, M. W. Barsoum, Trends in Chemistry 2019, 1, 210; V. Natu, R. Pai, M. Sokol, M. Carey, V. Kalra, M. W. Barsoum, Chem 2020, 6, 616; B. Anasori, M. R. Lukatskaya, Y. Gogotsi, Nature Reviews Materials 2017, 2.
[15] L. Verger, V. Natu, M. Carey, M. W. Barsoum, Trends in Chemistry 2019, 1, 656.
[16] C. J. Zhang, B. Anasori, A. Seral-Ascaso, S. H. Park, N. McEvoy, A. Shmeliov, G. S. Duesberg, J. N. Coleman, Y. Gogotsi, V. Nicolosi, Adv Mater 2017, 29; Z. Ling, C. E. Ren, M. Q. Zhao, J. Yang, J. M. Giammarco, J. Qiu, M. W. Barsoum, Y. Gogotsi, Proc Natl Acad Sci USA 2014, 111, 16676.
[17] K. Hantanasirisakul, M. Q. Zhao, P. Urbankowski, J. Halim, B. Anasori, S. Kota, C. E. Ren, M. W. Barsoum, Y. Gogotsi, Advanced Electronic Materials 2016, 2.
[18] M. Carey, Z. Hinton, V. Natu, R. Pai, M. Sokol, N. J. Alvarez, V. Kalra, M. W. Barsoum, Cell Reports Physical Science 2020, 1.
[19] X. Liang, A. Garsuch, L. F. Nazar, Angew Chem Int Ed Engl 2015, 54, 3907.
[20] X. Liang, Y. Rangom, C. Y. Kwok, Q. Pang, L. F. Nazar, Adv Mater 2017, 29.
[21] W. Bao, L. Liu, C. Wang, S. Choi, D. Wang, G. Wang, Advanced Energy Materials 2018, 8.
[22] J. Song, X. Guo, J. Zhang, Y. Chen, C. Zhang, L. Luo, F. Wang, G. Wang, Journal of Materials Chemistry A 2019, 7, 6507.
[23] J. Song, D. Su, X. Xie, X. Guo, W. Bao, G. Shao, G. Wang, ACS Appl Mater Interfaces 2016, 8, 29427.
[24] W. Bao, X. Xie, J. Xu, X. Guo, J. Song, W. Wu, D. Su, G. Wang, Chemistry 2017, 23, 12613.

[25]Z. Xiao, Z. Li, P. Li, X. Meng, R. Wang, ACS Nano 2019, 13, 3608.

[26] M. Ghidiu, J. Halim, S. Kota, D. Bish, Y. Gogotsi, M. W. Barsoum, Chemistry of Materials 2016, 28, 3507.

[27] B. Meyer, J. M. Austin, D. Jensen, Journal of Chemical & Engineering Data 1971, 16, 364.

[28] F. Y. Fan, W. C. Carter, Y. M. Chiang, Adv Mater 2015, 27, 5203.

[29] Y. Yang, Y. Zhong, Q. Shi, Z. Wang, K. Sun, H. Wang, Angew Chem Int Ed Engl 2018, 57, 15549.

[30] G. Zhou, H. Tian, Y. Jin, X. Tao, B. Liu, R. Zhang, Z. W. Seh, D. Zhuo, Y. Liu, J. Sun, J. Zhao, C. Zu, D. S. Wu, Q. Zhang, Y. Cui, Proc Natl Acad Sci USA 2017, 114, 840.

[31] L. R. F. Allen J. Bard, Wiley, New York 2001, 231; D. Zhang, S. Wang, R. Hu, J. Gu, Y. Cui, B. Li, W. Chen, C. Liu, J. Shang, S. Yang, Advanced Functional Materials 2020, 30; L. Jiao, C. Zhang, C. Geng, S. Wu, H. Li, W. Lv, Y. Tao, Z. Chen, G. Zhou, J. Li, G. Ling, Y. Wan, Q. H. Yang, Advanced Energy Materials 2019, 9; D. Liu, C. Zhang, G. Zhou, W. Lv, G. Ling, L. Zhi, Q. H. Yang, Adv Sci (Weinh) 2018, 5, 1700270.

[32] M. Fantauzzi, B. Elsener, D. Atzei, A. Rigoldi, A. Rossi, RSC Advances 2015, 5, 75953.

What is claimed:

1. A method, comprising: exchanging an exchangeable first cation of a layered MXene material with a second cation so as to give rise to an enhanced MXene material, the second cation comprising 12-aminolauric acid or di(hydrogenated tallow) benzyl methyl ammonium chloride.

2. The method of claim 1, wherein the second cation comprises di(hydrogenated tallow)benzyl methyl ammonium chloride.

3. The method of claim 1, further comprising dispersing the enhanced MXene material in a nonpolar solvent.

4. The method of claim 1, further comprising dispersing the enhanced MXene material in a polymer.

* * * * *